US012797732B2

(12) United States Patent
Toyofuku et al.

(10) Patent No.: US 12,797,732 B2
(45) Date of Patent: Nov. 17, 2026

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Kenta Toyofuku, Tokyo (JP); Yusuke Takeda, Tokyo (JP); Toshiki Sakamoto, Tokyo (JP); Yujiro Deguchi, Tokyo (JP); Yuka Tanaka, Tokyo (JP)

(73) Assignee: CYGAMES, INC., Tokyo (JP)

( * ) Notice: Subject to any disclaimer, the term of this patent is extended or adjusted under 35 U.S.C. 154(b) by 189 days.

(21) Appl. No.: 18/755,009

(22) Filed: Jun. 26, 2024

(65) Prior Publication Data

US 2024/0359097 A1 Oct. 31, 2024

Related U.S. Application Data

(63) Continuation of application No. PCT/JP2022/046385, filed on Dec. 16, 2022.

(30) Foreign Application Priority Data

Dec. 28, 2021 (JP) ................................ 2021-214030

(51) Int. Cl.
*A63F 13/537* (2014.01)
*A63F 13/45* (2014.01)
(Continued)

(52) U.S. Cl.
CPC ............ *A63F 13/537* (2014.09); *A63F 13/45* (2014.09); *A63F 13/533* (2014.09);
(Continued)

(58) Field of Classification Search
CPC ...... A63F 13/537; A63F 13/45; A63F 13/533; A63F 13/5375; A63F 13/58; A63F 13/69; A63F 13/79; A63F 13/825; A63F 13/35
See application file for complete search history.

(56) References Cited

U.S. PATENT DOCUMENTS

| | | | | |
|---|---|---|---|---|
| 6,368,210 B1 * | 4/2002 | Toyohara | ............. | A63F 13/577 463/43 |
| 11,451,617 B2 * | 9/2022 | Nomura | .............. | G06Q 10/109 |

(Continued)

FOREIGN PATENT DOCUMENTS

| | | | |
|---|---|---|---|
| JP | 5932876 | B2 | 6/2016 |
| JP | 2017086923 | A | 5/2017 |
| JP | 6709421 | B1 | 6/2020 |

OTHER PUBLICATIONS

Dragon Age: Origins. Wikipedia.org. Online. Apr. 23, 2020. Accessed via the Internet. Accessed Feb. 20, 2026. <URL: https://en.wikipedia.org/w/index.php?title=Dragon_Age:_Origins&oldid=952674976> (Year: 2020).*

(Continued)

*Primary Examiner* — Carl V Larsen
(74) *Attorney, Agent, or Firm* — Osha Bergman Watanabe & Burton LLP

(57) ABSTRACT

A non-transitory computer readable medium stores a program for causing a computer to carry out: processing for making it possible to register a plurality of items of reservation selection information each indicating a specific option selected by a player from among specific options included in a plurality of options presented in a prescribed game; processing for proceeding with the prescribed game, including processing for presenting the plurality of options in the prescribed game and processing for updating a parameter on the basis of the option selected by the player from among the plurality of options presented in the prescribed (Continued)

game; and processing for acquiring the registered reservation selection information and making it possible to identify, on the basis of the reservation selection information acquired, the specific option included in the reservation selection information during the prescribed game.

6 Claims, 51 Drawing Sheets

(51) Int. Cl.

| | |
|---|---|
| ***A63F 13/533*** | (2014.01) |
| ***A63F 13/5375*** | (2014.01) |
| ***A63F 13/58*** | (2014.01) |
| ***A63F 13/69*** | (2014.01) |
| ***A63F 13/79*** | (2014.01) |
| *A63F 13/825* | (2014.01) |

(52) U.S. Cl.

CPC .......... *A63F 13/5375* (2014.09); *A63F 13/58* (2014.09); *A63F 13/69* (2014.09); *A63F 13/79* (2014.09); *A63F 13/825* (2014.09)

(56) References Cited

U.S. PATENT DOCUMENTS

| | | | | |
|---|---|---|---|---|
| 11,559,747 | B1 * | 1/2023 | Hirsch | A63F 13/795 |
| 2009/0077463 | A1 * | 3/2009 | Koster | A63F 13/12 715/234 |
| 2009/0215538 | A1 * | 8/2009 | Jew | A63F 13/30 463/42 |
| 2012/0270617 | A1 * | 10/2012 | Reed | A63F 13/57 463/8 |
| 2016/0184712 | A1 * | 6/2016 | Colenbrander | A63F 13/49 463/29 |
| 2017/0050111 | A1 * | 2/2017 | Perry | H04L 67/131 |
| 2019/0022529 | A1 * | 1/2019 | Shimizu | A63F 13/493 |
| 2021/0402292 | A1 * | 12/2021 | Chow | G02B 27/017 |

OTHER PUBLICATIONS

Imported saves and pre-built histories. Dragonage.fandom.com. Online. Mar. 16, 2020. Accessed via the Internet. Accessed Feb. 20, 2026. <URL: https://dragonage.fandom.com/wiki/Imported_saves_and_pre-built_histories?oldid=862873> (Year: 2020).*

Save game editing. Dragonage.fandom.com. Online. Mar. 8, 2020. Accessed via the Internet. Accessed Feb. 20, 2026. <URL: https://dragonage.fandom.com/wiki/Save_game_editing?oldid=862621> (Year: 2020).*

Dragon Age: Origins—Character Creation. Youtube.com. Online. Aug. 10, 2009. Accessed via the Internet. Accessed Feb. 20, 2026. <URL: https://www.youtube.com/watch?v=7vhPq7UqKmk> (Year: 2009).*

Turn-based mode. pillarsofeternity.fandom.com. Online. Aug. 5, 2019. Accessed via the Internet. Accessed Feb. 20, 2026. <URL: https://pillarsofeternity.fandom.com/wiki/Turn-based_mode?oldid=149826> (Year: 2019).*

The Dragon Age Keep. Blog.bioware.com. Online. Aug. 28, 2013. Accessed via the Internet. Accessed Feb. 20, 2026. <URL: https://blog.bioware.com/2013/08/28/the-dragon-age-keep/> (Year: 2013).*

Calendar. Megami Tensei Wiki. Online. Mar. 2, 2021. Accessed via the Internet. Accessed Aug. 7, 2026. <URL:https://megamitensei.fandom.com/wiki/Calendar?oldid=404916> (Year: 2021).*

* cited by examiner

| KIND OF CHARACTER | ABILITY PARAMETERS (INITIAL VALUES) | | | | |
|---|---|---|---|---|---|
| | SPEED | STAMINA | POWER | SPIRIT | WISDOM |
| A | 90 | 65 | 60 | 102 | 105 |
| B | 102 | 63 | 73 | 105 | 100 |
| C | 92 | 98 | 109 | 100 | 101 |
| D | 80 | 72 | 110 | 112 | 64 |
| E | 100 | 102 | 62 | 65 | 71 |

FIG.7A

| KIND OF CHARACTER | APTITUDE PARAMETERS (INITIAL VALUES) | | | | | | | | | |
|---|---|---|---|---|---|---|---|---|---|---|
| | TRACK APTITUDES | | DISTANCE APTITUDES | | | | RUNNING-STYLE APTITUDES | | | |
| | TURF | DIRT | SHORT | MILE | INTER-MEDIATE | LONG | EARLY SPEED | FRONT RUNNING | STRETCH RUNNING | CLOSING |
| A | A | G | G | E | A | A | C | A | A | D |
| B | A | F | A | B | D | E | A | A | F | F |
| C | A | F | E | A | A | C | C | A | A | A |
| D | E | A | A | B | C | C | G | F | A | D |
| E | A | B | B | A | A | B | B | A | A | E |

FIG.7B

| KIND OF CHARACTER | ACQUIRED SKILLS AND POSSESSED SKILLS | | | | | | | | | | |
|---|---|---|---|---|---|---|---|---|---|---|---|
| | a | b | c | d | e | f | g | h | i | j | k |
| A | | | | | | ○ | ○ | ◎ | | ○ | |
| B | | | ○ | ◎ | ○ | | ○ | | ○ | | |
| C | ◎ | ○ | ○ | ○ | ○ | ○ | ○ | ○ | | | |
| D | | | | | ◎ | ○ | ○ | ○ | | ○ | |
| E | | | | | | ◎ | | | ○ | | ○ |

FIG.7C

| KIND OF CHARACTER | EXCLUSIVE EVENTS | | | | | | | | | | |
|---|---|---|---|---|---|---|---|---|---|---|---|
| | a | b | c | d | e | f | g | h | i | j | k |
| A | | | | | | ○ | | ○ | | ○ | |
| B | | | ○ | | | | ○ | | | | |
| C | | | | | ○ | | | | | | |
| D | | | | | | ○ | | ○ | | ○ | |
| E | | | | | | | | | | | ○ |

FIG.7D

| KIND OF SUPPORT CARD | SUPPORT CHARACTER | RARITY | LEVEL | FAVORITE TRAINING |
|---|---|---|---|---|
| A1 | CHARACTER A | SSR | 50 | SPEED |
| A2 | CHARACTER A | SR | 45 | STAMINA |
| A3 | CHARACTER A | R | 40 | WISDOM |
| B1 | CHARACTER B | SR | 1 | POWER |
| B2 | CHARACTER B | R | 15 | SPIRIT |

FIG.10A

| KIND OF SUPPORT CARD | SUPPORT EFFECTS | | | | | | |
|---|---|---|---|---|---|---|---|
| | SUBJECT a | SUBJECT b | SUBJECT c | SUBJECT d | SUBJECT e | SUBJECT f | SUBJECT g |
| A1 | +60% | | +40% | | +30% | +2pt | |
| A2 | +50% | +40% | | | | | |
| A3 | +40% | | | +25% | | +1pt | |
| B1 | +10% | | | | +5% | | +1pt |
| B2 | +15% | | | | | | +1pt |

FIG.10B

| KIND OF SUPPORT CARD | POSSESSED SKILLS | | | | | | | | | | |
|---|---|---|---|---|---|---|---|---|---|---|---|
| | a | b | c | d | e | f | g | h | i | j | k |
| A1 | | | ○ | | | ○ | ○ | | | ○ | ○ |
| A2 | | | | ○ | | | ○ | | ○ | | |
| A3 | | | | | ○ | | | ○ | | | |
| B1 | | | | | ○ | ○ | | | | ○ | ○ |
| B2 | | | | | | | | | ○ | | |

FIG.10C

| KIND OF SUPPORT CARD | SUPPORT EVENTS | | | | | | | | | | |
|---|---|---|---|---|---|---|---|---|---|---|---|
| | a | b | c | d | e | f | g | h | i | j | k |
| A1 | | | ○ | | | | ○ | | | ○ | ○ |
| A2 | | | | ○ | | ○ | ○ | | | | |
| A3 | | | | | ○ | | | | | | |
| B1 | | ○ | | | ○ | ○ | | | | | |
| B2 | | | | | | | | | ○ | | |

FIG.10D

| KIND OF CHARACTER | CHARACTER IDENTIFICATION INFORMATION | | | | |
|---|---|---|---|---|---|
| | MAIN CHARACTER | SUPPORT CHARACTER | SPECIFIC CHARACTER | TEAM MEMBER | SUB-MEMBER |
| CHARACTER A | | | | | ○ |
| CHARACTER B | | | | | ○ |
| CHARACTER C | ○ | | | ○ | |
| CHARACTER D | | | | | ○ |
| CHARACTER E | | ○ | | ○ | |
| CHARACTER F | | | ○ | ○ | |
| CHARACTER G | | | | | ○ |
| CHARACTER H | | | | | ○ |
| CHARACTER I | | ○ | | ○ | |
| CHARACTER J | | | ○ | ○ | |
| CHARACTER K | | | | | ○ |
| CHARACTER L | | ○ | | ○ | |
| CHARACTER M | | ○ | | ○ | |
| CHARACTER N | | | ○ | ○ | |
| CHARACTER P | | | | | ○ |
| CHARACTER Q | | ○ | | ○ | |
| CHARACTER R | | | ○ | ○ | |
| CHARACTER S | | | | | ○ |
| CHARACTER T | | ○ | | ○ | |
| CHARACTER U | | | | | ○ |
| CHARACTER V | | | | | ○ |
| CHARACTER W | | | | | ○ |
| CHARACTER X | | | | | ○ |
| CHARACTER Y | | | | | ○ |
| CHARACTER Z | | | | | ○ |

FIG.12

| KIND OF CHARACTER | CHARACTER IDENTIFICATION INFORMATION | | | | |
|---|---|---|---|---|---|
| | MAIN CHARACTER | SUPPORT CHARACTER | SPECIFIC CHARACTER | TEAM MEMBER | SUB-MEMBER |
| CHARACTER A | | | | | ○ |
| CHARACTER B | | | | | ○ |
| CHARACTER C | | | | | ○ |
| CHARACTER D | | | | | ○ |
| CHARACTER E | | ○ | | ○ | |
| CHARACTER F | ○ | | ○ | ○ | |
| CHARACTER G | | | | | ○ |
| CHARACTER H | | | | | ○ |
| CHARACTER I | | | | | ○ |
| CHARACTER J | | ○ | ○ | ○ | |
| CHARACTER K | | | | | ○ |
| CHARACTER L | | ○ | | ○ | |
| CHARACTER M | | ○ | | ○ | |
| CHARACTER N | | | ○ | ○ | |
| CHARACTER P | | | | | ○ |
| CHARACTER Q | | ○ | | ○ | |
| CHARACTER R | | | ○ | ○ | |
| CHARACTER S | | | | | ○ |
| CHARACTER T | | ○ | | ○ | |
| CHARACTER U | | | | | ○ |
| CHARACTER V | | | | | ○ |
| CHARACTER W | | | | | ○ |
| CHARACTER X | | | | | ○ |
| CHARACTER Y | | | | | ○ |
| CHARACTER Z | | | | | ○ |

FIG.13

| PERIOD | NUMBER OF TURNS | SELECTION ITEMS | | | | SKILL ACQUISITION |
|---|---|---|---|---|---|---|
| | | Rest | Training | Going Out | Race | |
| junior | 1ST TURN | ○ | ○ | ○ | ○ | ○ |
| | 2ND TURN | ○ | ○ | ○ | ○ | |
| | 3RD TURN | ○ | ○ | ○ | ○ | |
| | 4TH TURN | ○ | ○ | ○ | ○ | |
| | ⋮ | ⋮ | ⋮ | ⋮ | ⋮ | |
| | 19TH TURN | ○ | ○ | ○ | ○ | |
| | 20TH TURN | × | × | × | ○ | |
| | 21ST TURN | ○ | ○ | ○ | ○ | |
| | 22ND TURN | ○ | ○ | ○ | ○ | |
| | 23RD TURN | ○ | ○ | ○ | ○ | |
| | 24TH TURN | ○ | ○ | ○ | ○ | |
| classic | 25TH TURN | ○ | ○ | ○ | ○ | |
| | ⋮ | ⋮ | ⋮ | ⋮ | ⋮ | |
| | 29TH TURN | ○ | ○ | ○ | ○ | |
| | 30TH TURN | × | × | × | ○ | |
| | 31ST TURN | ○ | ○ | ○ | ○ | |
| | ⋮ | ⋮ | ⋮ | ⋮ | ⋮ | |
| | 34TH TURN | ○ | ○ | ○ | ○ | |
| | 35TH TURN | × | × | × | ○ | |
| | ⋮ | ⋮ | ⋮ | ⋮ | ⋮ | |
| | 48TH TURN | ○ | ○ | ○ | ○ | |
| senior | 49TH TURN | ○ | ○ | ○ | ○ | |
| | ⋮ | ⋮ | ⋮ | ⋮ | ⋮ | |
| | 57TH TURN | × | × | × | ○ | |
| | 58TH TURN | ○ | ○ | ○ | ○ | |
| | 59TH TURN | × | × | × | ○ | |
| | 60TH TURN | ○ | ○ | ○ | ○ | |
| | ⋮ | ⋮ | ⋮ | ⋮ | ⋮ | |
| | 72ND TURN | ○ | ○ | ○ | ○ | |
| final | 73RD TURN | ○ | ○ | ○ | ○ | |
| | 74TH TURN | × | × | × | ○ | |
| | 75TH TURN | ○ | ○ | ○ | ○ | |
| | 76TH TURN | × | × | × | ○ | |
| | 77TH TURN | ○ | ○ | ○ | ○ | |
| | 78TH TURN | × | × | × | ○ | |

FIG. 14

| CHARACTER IDENTIFICATION INFORMATION | | ASSIGN/ DO NOT ASSIGN | |
|---|---|---|---|
| SUPPORT CHARACTER | SPECIFIC CHARACTER | ASSIGN | DO NOT ASSIGN |
| ○ | ○ | 80% | 20% |
| — | ○ | 60% | 40% |
| ○ | — | 40% | 60% |
| — | — | 10% | 90% |

FIG.24

| TEAM RANKING | TRAINING LEVEL | | | | |
|---|---|---|---|---|---|
| | SPEED | STAMINA | POWER | SPIRIT | WISDOM |
| ~100 | Lv.1 | Lv.1 | Lv.1 | Lv.1 | Lv.1 |
| 99~60 | Lv.2 | Lv.2 | Lv.2 | Lv.2 | Lv.2 |
| 59~30 | Lv.3 | Lv.3 | Lv.3 | Lv.3 | Lv.3 |
| 29~10 | Lv.4 | Lv.4 | Lv.4 | Lv.4 | Lv.4 |
| 9~1 | Lv.5 | Lv.5 | Lv.5 | Lv.5 | Lv.5 |

FIG.25A

| TRAINING LEVEL | FIXED RAISING VALUES (SPEED) | | | | |
|---|---|---|---|---|---|
| | SPEED | STAMINA | POWER | SPIRIT | WISDOM |
| Lv.1 | 8 | 0 | 6 | 0 | 0 |
| Lv.2 | 10 | 0 | 8 | 0 | 0 |
| Lv.3 | 12 | 0 | 10 | 0 | 0 |
| Lv.4 | 14 | 0 | 12 | 0 | 0 |
| Lv.5 | 20 | 0 | 18 | 0 | 0 |

FIG.25B

| TRAINING LEVEL | FIXED RAISING VALUES (POWER) | | | | |
|---|---|---|---|---|---|
| | SPEED | STAMINA | POWER | SPIRIT | WISDOM |
| Lv.1 | 0 | 6 | 8 | 0 | 0 |
| Lv.2 | 0 | 8 | 10 | 0 | 0 |
| Lv.3 | 0 | 10 | 12 | 0 | 0 |
| Lv.4 | 0 | 12 | 14 | 0 | 0 |
| Lv.5 | 0 | 18 | 20 | 0 | 0 |

FIG.25C

| CHARACTER IDENTIFICATION INFORMATION | | BONUS ADDITION RATE | | |
|---|---|---|---|---|
| SUPPORT CHARACTER | SPECIFIC CHARACTER | NONE | 10% UP | 20% UP |
| ○ | ○ | 50% | 0% | 50% |
| ○ | — | 50% | 50% | 0% |
| — | ○ | 50% | 50% | 0% |
| — | — | 80% | 20% | 0% |

FIG.25D

| KIND OF EVENT | EVENT CLASS | | | | |
|---|---|---|---|---|---|
| | HINT | ABILITY | APTITUDE | STORY | SPECIAL TRAINING |
| SCENARIO EVENT | ○ | ○ | ○ | ○ | — |
| EXCLUSIVE EVENT FOR MAIN CHARACTER | ○ | ○ | — | — | — |
| SUPPORT EVENT | ○ | ○ | — | — | — |
| TEAM MEMBER EVENT | — | — | — | ○ | ○ |

FIG.26

| NUMBER OF TURNS | SCENARIO EVENT | EXCLUSIVE EVENT | SUPPORT EVENT | TEAM MEMBER EVENT |
|---|---|---|---|---|
| 1ST TURN | 0001 | — | — | — |
| 2ND TURN | — | 1001 | LOTTERY | LOTTERY |
| 3RD TURN | — | LOTTERY | LOTTERY | LOTTERY |
| 4TH TURN | 0002 | LOTTERY | LOTTERY | CHANGEABLE |
| 5TH TURN | 0003 | LOTTERY | LOTTERY | CHANGEABLE |
| 6TH TURN | 0004 | LOTTERY | LOTTERY | CHANGEABLE |
| 7TH TURN | 0005 | LOTTERY | LOTTERY | CHANGEABLE |
| 8TH TURN | — | 1002 | LOTTERY | LOTTERY |
| 9TH TURN | — | LOTTERY | LOTTERY | LOTTERY |
| 10TH TURN | 0006 | — | — | — |
| 11TH TURN | — | LOTTERY | LOTTERY | LOTTERY |
| 12TH TURN | LOTTERY | LOTTERY | LOTTERY | LOTTERY |
| ⋮ | ⋮ | ⋮ | ⋮ | ⋮ |

FIG.27

| VALUE OF BOND PARAMETER | WHETHER OR NOT SPECIAL TRAINING EVENT HAS BEEN EXECUTED | |
|---|---|---|
| | EXECUTED | NOT EXECUTED |
| 0〜19 | 20% | 80% |
| 20〜39 | 22% | 78% |
| 40〜59 | 24% | 76% |
| 60〜79 | 26% | 74% |
| 80〜99 | 28% | 72% |
| 100 | 30% | 70% |

| | UPON OCCURRENCE OF SUCCESS | | | | | AFTER OCCURRENCE OF GREAT SUCCESS |
|---|---|---|---|---|---|---|
| | NUMBER OF TIMES OF EXECUTION OF SPECIAL TRAINING EVENT | | | | | |
| | 0 | 1 | 2 | 3 | 4 | |
| SPECIAL ICON |  | | | | | |

| PARAMETER RAISE | 0〜19 | 20〜39 | 40〜 |
|---|---|---|---|
| BONUS ICON | +○○ | +○○ | +○○ |

| TRAINING PERFORMED | NUMBER OF CHARACTERS | BONUS FIXED VALUES (MAIN CHARACTER) | | | | | |
|---|---|---|---|---|---|---|---|
| | | SPEED | STAMINA | POWER | SPIRIT | WISDOM | SKILL P |
| SPEED | 1 | | | | | | |
| | 2 | | | | | | +5 |
| | 3 | +6 | | +2 | | | +5 |
| | 4 | +8 | | +4 | | | +7 |
| | 5 | +10 | | +6 | | | +9 |
| STAMINA | 1 | | | | | | |
| | 2 | | | | | | +5 |
| | 3 | | +6 | | +2 | | +5 |
| | 4 | | +8 | | +4 | | +7 |
| | 5 | | +10 | | +6 | | +9 |
| POWER | 1 | | | | | | |
| | 2 | | | | | | +5 |
| | 3 | | +2 | +6 | | | +5 |
| | 4 | | +4 | +8 | | | +7 |
| | 5 | | +6 | +10 | | | +9 |
| SPIRIT | 1 | | | | | | |
| | 2 | | | | | | +5 |
| | 3 | | +1 | +1 | +6 | | +5 |
| | 4 | | +2 | +2 | +8 | | +7 |
| | 5 | | +3 | +3 | +10 | | +9 |
| WISDOM | 1 | | | | | | |
| | 2 | | | | | | +5 |
| | 3 | +2 | | | | +6 | +5 |
| | 4 | +4 | | | | +8 | +7 |
| | 5 | +6 | | | | +10 | +9 |

FIG.30A

| FAVORITE TRAINING | BONUS ADDITIONAL VALUES (MAIN CHARACTER) | | | | | |
|---|---|---|---|---|---|---|
| | SPEED | STAMINA | POWER | SPIRIT | WISDOM | SKILL P |
| SPEED | +20 | | +10 | | | |
| STAMINA | | +20 | | +10 | | |
| POWER | | +10 | +20 | | | |
| SPIRIT | +5 | | +5 | +20 | | |
| WISDOM | | | | | +20 | +10 |

FIG.30B

| TRAINING EXECUTED | FIXED RAISING VALUES (SPECIAL TRAINING SUBJECTS) | | | | |
|---|---|---|---|---|---|
| | SPEED | STAMINA | POWER | SPIRIT | WISDOM |
| SPEED | +50~70 | +10~20 | +30~40 | +10~20 | +10~20 |
| STAMINA | +10~20 | +50~70 | +10~20 | +30~40 | +10~20 |
| POWER | +10~20 | +30~40 | +50~70 | +10~20 | +10~20 |
| SPIRIT | +20~30 | +10~20 | +20~30 | +50~70 | +10~20 |
| WISDOM | +30~40 | +10~20 | +10~20 | +10~20 | +50~70 |

FIG.31A

| FAVORITE TRAINING | BONUS RAISING VALUES (SPECIAL TRAINING SUBJECTS) | | | | |
|---|---|---|---|---|---|
| | SPEED | STAMINA | POWER | SPIRIT | WISDOM |
| SPEED | +180 | +50 | +140 | +50 | +50 |
| STAMINA | +50 | +180 | +100 | +50 | +50 |
| POWER | +50 | +140 | +180 | +50 | +50 |
| SPIRIT | +90 | +50 | +90 | +180 | +50 |
| WISDOM | +140 | +50 | +50 | +50 | +180 |

FIG.31B

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2022/046385, filed on Dec. 16, 2022, which claims priority to Japanese Patent Application No. 2021-214030, filed on Dec. 28, 2021, the entire contents of which are incorporated by reference herein.

BACKGROUND ART

Technical Field

The present invention relates to information processing programs, information processing methods, and information processing systems.

There has hitherto been a known type of game in which the proceeding of the game is controlled by a player selecting one of a plurality of kinds of selection items, as disclosed in Patent Literature 1.

CITATION LIST

Patent Literature

Patent Literature 1: JP 5932876 B

SUMMARY OF INVENTION

Technical Problem

In the type of game described above, since the game proceeds on the basis of selection items selected by the player, it is possible to advantageously proceed with the game by selecting suitable options. However, as the kinds of options increase, since it becomes necessary to determine which option is suitable each time, there is a problem in that the motivation of the player to play the game is reduced.

It is an object of the present invention to provide an information processing program, an information processing method, and an information processing system that make it possible to improve convenience for players, thereby alleviating the reduction in the motivation of the player to play a game.

Solution to Problem

In order to solve the problem described above, an information processing program causes a computer to carry out:

processing for making it possible to register a plurality of items of reservation selection information each indicating a specific option selected by a player from among specific options included in a plurality of options presented in a prescribed game;

processing for proceeding with the prescribed game, including processing for presenting the plurality of options and processing for updating a parameter on the basis of the option selected by the player from among the plurality of options presented in the prescribed game; and processing for acquiring the registered reservation selection information and making it possible to identify, on the basis of the reservation selection information acquired, the specific option included in the reservation selection information during the prescribed game.

The prescribed game may be configured to include a plurality of turns; and in the processing for proceeding with the prescribed game, the options may be presented in each of the turns.

In the processing for making it possible to register a plurality of items of reservation selection information, it may be made possible to register the reservation selection information during the execution of the prescribed game.

In the processing for making it possible to register a plurality of items of reservation selection information, it may be made possible to register the reservation selection information in the case where the prescribed game is not being executed.

In order to solve the problem described above, an information processing method is an information processing method that is carried out by one or more computers, the information processing method including:

processing for making it possible to register a plurality of items of reservation selection information each indicating a specific option selected by a player from among specific options included in a plurality of options presented in a prescribed game;

processing for proceeding with the prescribed game, including processing for presenting the plurality of options and processing for updating a parameter on the basis of the option selected by the player from among the plurality of options presented in the prescribed game; and processing for acquiring the registered reservation selection information and making it possible to identify, on the basis of the reservation selection information acquired, the specific option included in the reservation selection information during the prescribed game.

In order to solve the problem described above, an information processing system is an information processing system including one or more computers, wherein the computers carry out:

processing for making it possible to register a plurality of items of reservation selection information each indicating a specific option selected by a player from among specific options included in a plurality of options presented in a prescribed game;

processing for proceeding with the prescribed game, including processing for presenting the plurality of options and processing for updating a parameter on the basis of the option selected by the player from among the plurality of options presented in the prescribed game; and processing for acquiring the registered reservation selection information and making it possible to identify, on the basis of the reservation selection information acquired, the specific option included in the reservation selection information during the prescribed game.

Effects of Disclosure

The present invention makes it possible to improve convenience for players.

BRIEF DESCRIPTION OF DRAWINGS

FIG. 7A is a figure for explaining an ability parameter (initial values) table. FIG. 7B is a figure for explaining an aptitude parameter (initial values) table. FIG. 7C is a figure for explaining a skill table. FIG. 7D is a figure for explaining an exclusive-event table.

FIG. 10A is a figure for explaining a support card table.

FIG. 10B is a figure for explaining a support effect table.

FIG. 10C is a figure for explaining a possessed skill table.

FIG. 10D is a figure for explaining a support event table.

FIG. 12 is a first illustration for explaining a character identification information table.

FIG. 13 is a second illustration for explaining the character identification information table.

FIG. 14 is a figure for explaining a selection item table.

FIG. 24 is a figure for explaining an assign/do-not-assign table.

FIG. 25A is a figure for explaining a training level table. FIG. 25B is a figure for explaining a fixed raising-value (speed) table. Furthermore, FIG. 25C is a figure for explaining a fixed raising-value table (power). FIG. 25D is a figure for explaining a bonus addition rate table.

FIG. 26 is a figure for explaining the kinds of events and event classes.

FIG. 27 is a figure for explaining the relationships between the kinds of events and the numbers of turns.

FIG. 30A is a figure for explaining a bonus fixed-value (main character) table. FIG. 30B is a figure for explaining a bonus additional-value (main character) table.

FIG. 31A is a figure for explaining a fixed raising-value (special training subjects) table. FIG. 31B is a figure for explaining a bonus raising-value (special training subjects) table.

DESCRIPTION OF EMBODIMENTS

An aspect of an embodiment of the present invention will be described below in detail with reference to the accompanying drawings. The numerical values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
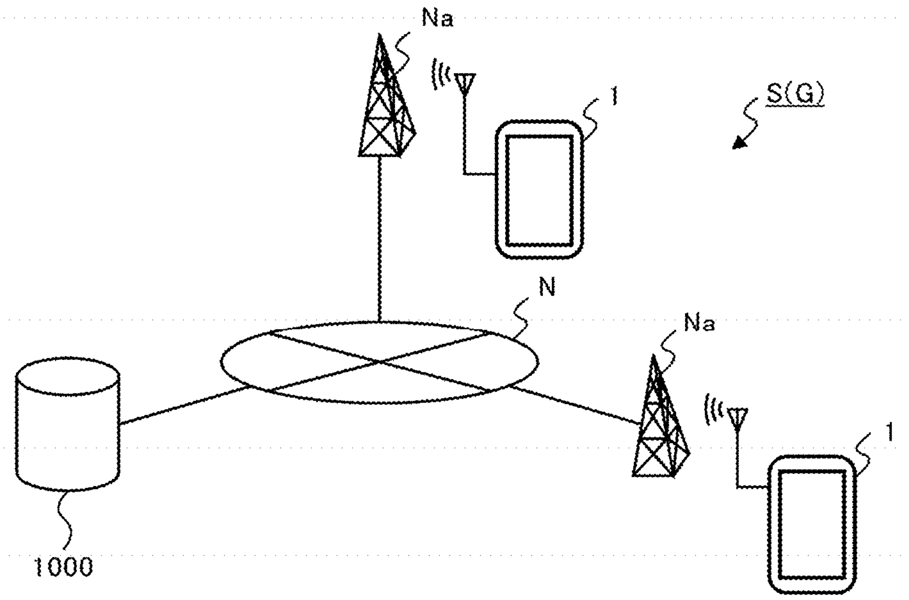
FIG. 1 is an illustration schematically showing the configuration of an information processing system.

FIG. 1 is an explanatory illustration schematically showing the configuration of an information processing system S. The information processing system S is what is called a client-server system including player terminals 1, which function as clients, i.e., as game terminals, a server 1000, and a communication network N having communication base stations Na.

In the information processing system S in this embodiment, the player terminals 1 and the server 1000 function as game devices G. The player terminals 1 and the server 1000 individually share roles for controlling the proceeding of a game, and it becomes possible to proceed with the game through cooperation between the player terminals 1 and the server 1000.

The player terminals 1 can establish communication with the server 1000 via the communication network N. The player terminals 1 include a wide range of electronic appliances that are capable of communicatively connecting to the server 1000 in a wireless or wired manner. Examples of the player terminals 1 include smartphones, mobile phones, tablet devices, personal computers, and game machines. This embodiment will be described in the context of the case where smartphones are used as the player terminals 1.

The server 1000 is communicatively connected to the plurality of player terminals 1. The server 1000 accumulates various kinds of information for each player who plays the game. Furthermore, the server 1000 mainly carries out processing such as updating the accumulated information and allowing the player terminals 1 to download images and various kinds of information on the basis of operations input from the player terminals 1.

The communication base stations Na are connected to the communication network N, and send information to and receive information from the player terminals 1 in a wireless manner. The communication network N is implemented by a mobile phone network, an Internet network, a local area network (LAN), a special circuit, or the like, and realizes wireless or wired communicative connection between the player terminals 1 and the server 1000.

(Hardware Configurations of Player Terminals 1 and Server 1000)

Figure 2A:
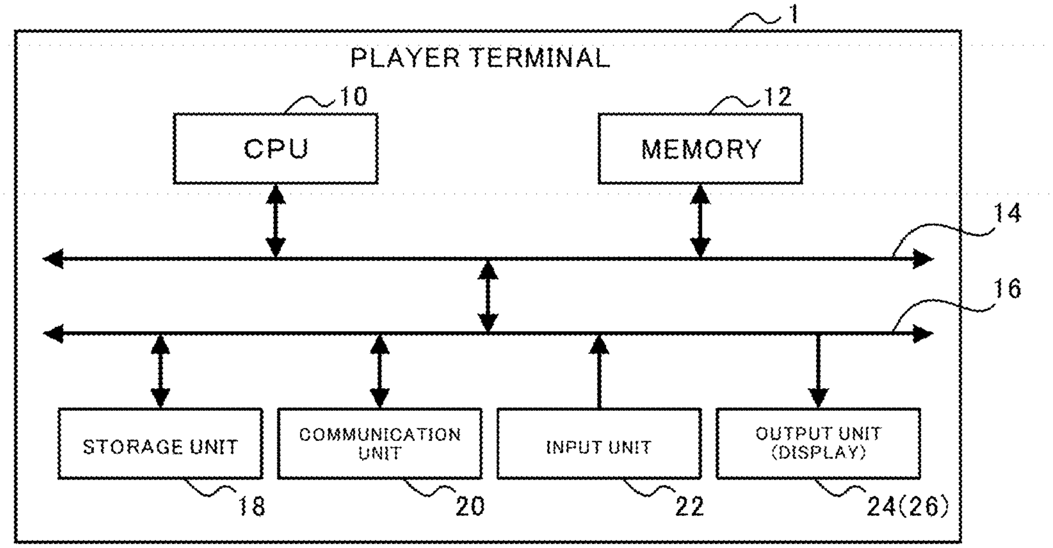
FIG. 2A is a diagram for explaining the hardware configuration of a player terminal.
Figure 2B:
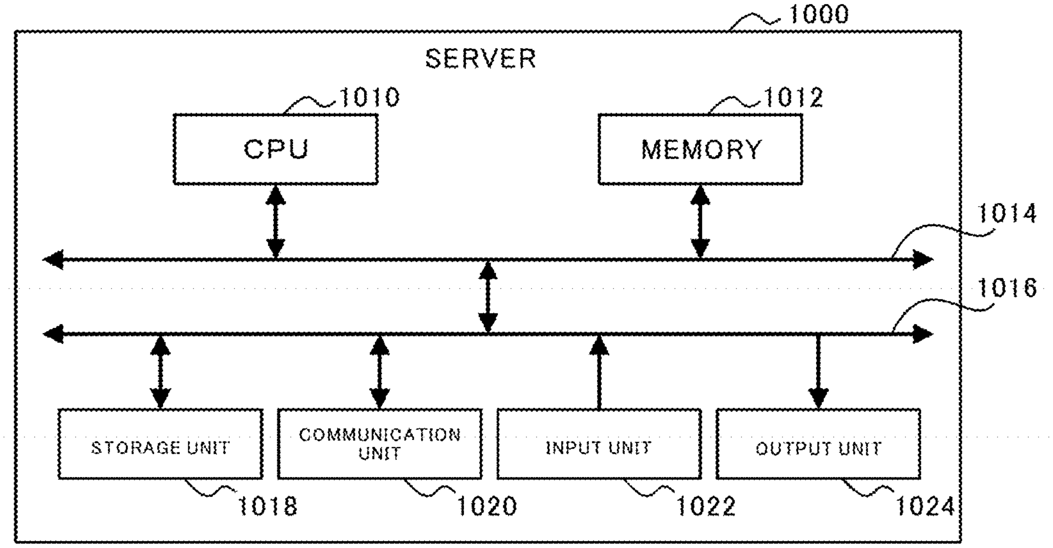
FIG. 2B is a diagram for explaining the hardware configuration of a server.

FIG. 2A is a diagram for explaining the hardware configuration of each of the player terminals 1. Furthermore, FIG. 2B is a diagram for explaining the hardware configuration of the server 1000. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 1000 is configured to include a CPU 1010, a memory 1012, a bus 1014, an input/output interface 1016, a storage unit 1018, a communication unit 1020, an input unit 1022, and an output unit 1024.

Note that the configurations and functions of the CPU 1010, the memory 1012, the bus 1014, the input/output interface 1016, the storage unit 1018, the communication unit 1020, the input unit 1022, and the output unit 1024 of the server 1000 are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminal 1, while omitting a description of the server 1000.

The CPU 10 runs a program stored in the memory 12 to control the proceeding of the game. The memory 12 is configured of a read only memory (ROM) or a random access memory (RAM), and stores the program and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM), and stores various kinds of programs and data. In the player terminal 1, the programs and data stored in the storage unit 18 are loaded into the memory 12 (RAM) by the CPU 10.

The communication unit 20 is communicatively connected to one of the communication base stations Na in a wireless manner, and sends information to and receives information from the server 1000 via the communication network N, such as various kinds of data and programs. In the player terminal 1, programs, etc. received from the server 1000 are stored in the memory 12 or the storage unit 18.

The input unit 22 is configured of a unit via which player operations are input (operations are accepted), such as a touch panel, buttons, a keyboard, a mouse, a cross keypad, or an analog controller. Alternatively, the input unit 22 may be a special controller provided at the player terminal 1 or connected (externally connected) to the player terminal 1. Alternatively, the input unit 22 may be configured of an acceleration sensor that detects tilting or movement of the player terminal 1 or a microphone that detects player's voice. That is, examples of the input unit 22 include a wide range of devices that enable the input of player's intents in distinguishable manners.

The output unit 24 is configured to include a display device and a speaker. Note that the output unit 24 may be an appliance connected (externally connected) to the player terminal 1. In this embodiment, the player terminal 1 includes a display 26 as the output unit 24 and includes a touch panel as the input unit 22, the touch panel being provided so as to be stacked on the display 26.

(Game Specifics)

Next, the game provided by the information processing system S and the game devices G in this embodiment will be described. Each player can possess characters acquired through lotteries called gacha, as well as characters distributed from the administration side. Furthermore, each player can possess support cards acquired through lotteries as well as support cards distributed from the administration side.

As will be described later in detail, a nurturing game is provided in the game according to this embodiment. In the nurturing game, each player can nurture a character that is possessed by the player. Furthermore, the nurturing game in this embodiment is designed such that a character is nurtured while letting the character participate in races simulating horse racing.

Figure 3A:
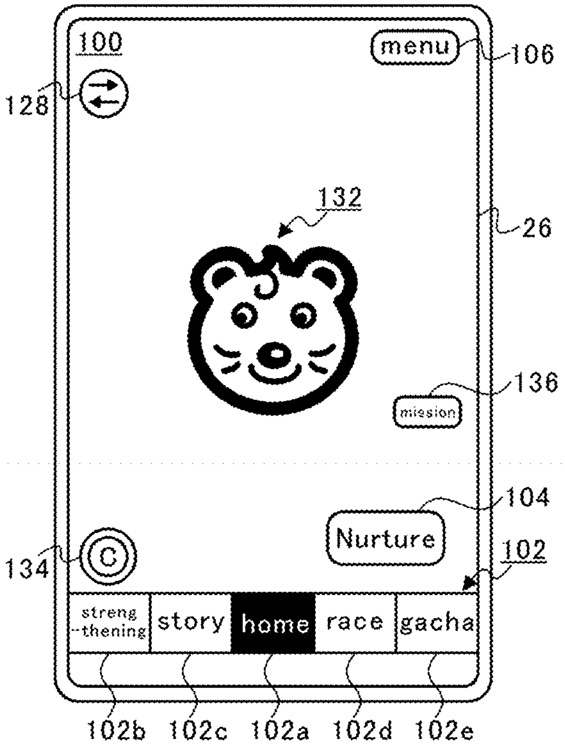
FIG. 3A is an illustration for explaining an example home screen.

FIG. 3A is an illustration for explaining an example home screen 100. When a game application is started at the player terminal 1, the home screen 100 is displayed on the display 26. A menu bar 102 is displayed in a lower part of the home screen 100. In the menu bar 102, a plurality of operating parts that can be operated (tapped) by the player are provided.

Here, the following operating parts are provided in the menu bar 102: a home-screen selection operating part 102*a*; a strengthening-screen selection operating part 102*b*; a story-screen selection operating part 102*c*; a team-stadium-screen selection operating part 102*d*; and a gacha-screen selection operating part 102*e*. Note that in the menu bar 102, the operating part corresponding to the screen displayed on the display 26 is indicated in a highlighted manner so that the screen displayed can be identified.

When the home-screen selection operating part 102*a* is tapped, the home screen 100 shown in FIG. 3A is displayed on the display 26.

When the strengthening-screen selection operating part 102*b* is tapped, a strengthening screen 140 (FIG. 4A), which will be described later, is displayed.

When the story-screen selection operating part 102*c* is tapped, a story screen, which is not shown, is displayed. Here, story images are provided for individual characters that appear in the game. The player can view the story screen while selecting a character and a story image.

When the team-stadium-screen selection operating part 102*d* is tapped, a team stadium screen, which is not shown, is displayed. In the team stadium screen, the player can play a team competition game in which a battle is played between a team formed by the player himself or herself and a team of another player selected by a computer. The team competition game is designed such that the player competes with another player for ranking.

When a gacha-screen selection operating part 102*e* is tapped, a gacha screen, which is not shown, is displayed. In the gacha screen, the player can perform what is called a gacha lottery, with which the player can acquire a character or a support card through a lottery by consuming an in-game currency.

Furthermore, in the home screen 100, a nurturing-game operating part 104 is provided above the menu bar 102. When the nurturing-game operating part 104 is tapped, a nurturing game screen is displayed, and a nurturing game, which will be described later, is started. The nurturing game is broadly classified into a preparation stage and a nurturing stage. First, in the preparation stage, the player selects one of the characters possessed by the player himself or herself and sets the character as a main character, which is the character to be nurtured. Furthermore, in the preparation stage, the player sets a deck to be used when nurturing the main character. The deck is constituted of a plurality of characters to inherit and a plurality of support cards, which will be described later in detail. Therefore, in the nurturing game, the characters to inherit and the support cards included in the deck are used.

When the setting of the main character and the deck (characters to inherit and support cards) is finished, a transition from the preparation stage to the nurturing stage occurs, and a game for nurturing the main character is started. The player can possess the character nurtured in the nurturing game as a nurtured character. As mentioned earlier, the player can include the possessed nurtured character in a team and can use the possessed nurtured character in the team competition game.

As described above, the main aims of the game in this embodiment are to nurture a character to be nurtured through the nurturing game and to advance the ranking for the team competition game by using the nurtured character.

Furthermore, this embodiment is provided with a function for sharing a character to be nurtured or support cards among players as well as a function for sharing information among a plurality of players. The player can set a character to be nurtured and support cards that can be used by another player in the nurturing game. Specifically, as shown in FIG. 3A, a setting operating part 106 is provided in an upper right part of the home screen 100. When the setting operating part 106 is tapped, an option setting screen 110 is displayed.

Figure 3B:
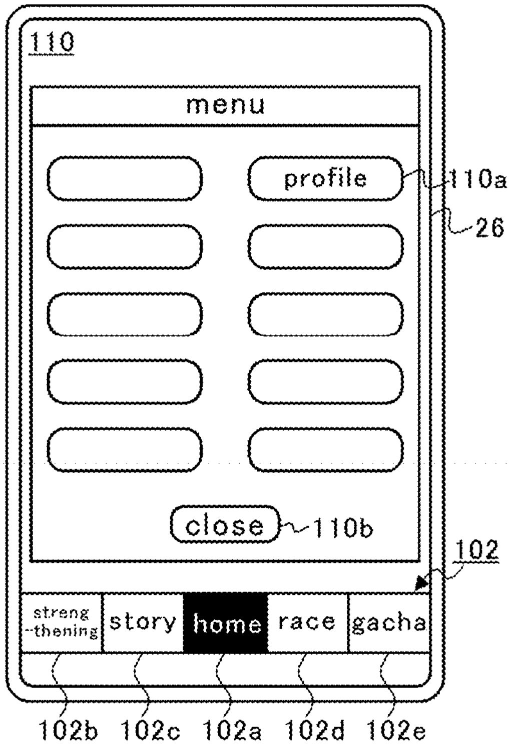
FIG. 3B is an illustration for explaining an example option setting screen.

FIG. 3B is an illustration for explaining an example of the option setting screen 110. The option setting screen 110 is a screen that makes it possible to confirm and set various kinds of information. The option setting screen 110 has a plurality of operating parts provided therein, and when one of the operating parts is tapped, it becomes possible to confirm or set information corresponding to the operating part.

The operating parts in the option setting screen 110 include a profile setting operating part 110*a* and a close operating part 110*b*. When the close operating part 110*b* is tapped, the option setting screen 110 is closed, and the home screen 100 is displayed. When the profile setting operating part 110*a* is tapped, a profile setting screen 120 is displayed.

Figure 3C:
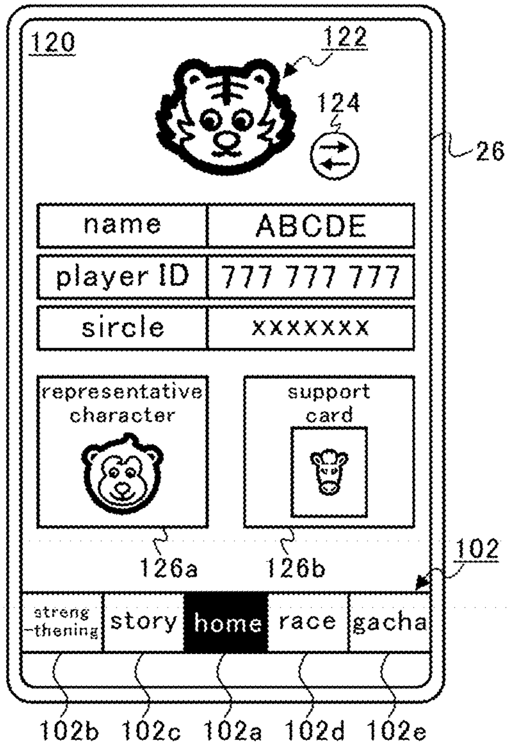
FIG. 3C is an illustration for explaining an example profile setting screen.

FIG. 3C is an illustration for explaining an example of the profile setting screen 120. In the profile setting screen 120, the player can confirm or set profile information of the player himself or herself. The profile information includes a profile character, a player name, a player ID, a circle to which the player belongs, a representative character, and rental cards.

The profile character functions as a character that is displayed when information concerning the player is viewed by other players. For example, the profile character is displayed when a circle function, which provides a field for sharing information with other players, is being used. In the profile setting screen 120, a profile character image 122 that is currently set is displayed. A change button 124 is provided in the proximity of the profile character image 122. When the change button 124 is tapped, a profile character changing screen, which is not shown, is displayed. The player can change the profile character in the profile character changing screen.

Furthermore, in the profile setting screen 120, a player name set by the player, a player ID assigned to the player, and the name of the circle to which the player belongs are displayed. Furthermore, in the profile setting screen 120, a representative-character setting operating part 126*a* and a rental-card setting operating part 126*b* are provided.

When the representative-character setting operating part 126*a* is tapped, a representative-character setting screen, which is not shown, is displayed. The player can set one of the nurtured characters nurtured by the player himself or herself as a representative character in the representative-character setting screen. In the representative-character setting operating part 126*a*, an icon image indicating the currently set representative character is displayed. As will be described later in detail, the representative character can be included in decks as a character to inherit in nurturing games that are played by other players.

When the rental-card setting operating part 126*b* is tapped, a rental-card setting screen, which is not shown, is displayed. In the rental-card setting screen, the player can set one of the support cards possessed by the player himself or herself as a rental card. In the rental-card setting operating part 126*b*, an icon image indicating the currently set rental card is displayed. As mentioned earlier, the support card set as a rental card can be included in decks by other players and are used in nurturing games that are played by other players.

Although not described in detail, when a change is made to the setting of the profile information in the profile setting screen 120, setting change information is transmitted to the server 1000. In the server 1000, profile information is saved on a per-player basis.

Furthermore, as shown in FIG. 3A, a setting icon 128 is displayed in the home screen 100. When the setting icon 128 is tapped, a home setting screen 130 is displayed.

Figure 3D:
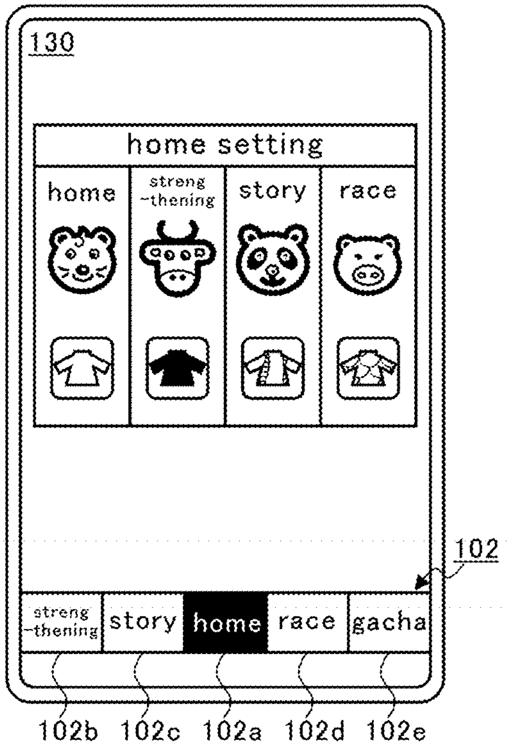
FIG. 3D is an illustration for explaining an example home setting screen.

FIG. 3D is an illustration for explaining an example of the home setting screen 130. In the home setting screen 130, the player can set home-screen setting characters 132 that are displayed in the home screen 100. The player can set four home-screen setting characters 132 that are displayed in the home screen 100.

Although not shown, when a flick operation in the horizontal direction is input in the home screen 100, what is displayed in the screen displayed on the display 26, i.e., the home screen 100, is switched. In the home screen 100, the four currently set home-screen setting characters 132 are displayed. The home-screen setting characters 132 have assigned thereto functions as the individual operating parts displayed in the menu bar 102. Therefore, when one of the home-screen setting characters 132 displayed in the home screen 100 is tapped, the screen is switched like when one of the operating parts in the menu bar 102 is tapped.

In the home setting screen 130, character images individually corresponding to the four currently set home-screen setting characters 132, as well as corresponding operating parts, are displayed in a distinguishable manner. When one of the character images displayed in the home setting screen 130 is tapped, a character selection screen, which is not shown, is displayed. The player can select one of the home-screen setting characters 132 in the character selection screen. Furthermore, the player can set a costume for the home-screen setting character 132 in the home setting screen 130.

Furthermore, as shown in FIG. 3A, a circle icon 134 is displayed in the home screen 100. When the circle icon 134 is tapped, a circle screen is displayed. In the circle screen, the player can exchange information with other players belonging to the same circle.

Furthermore, as shown in FIG. 3A, a mission icon 136 is displayed in the home screen 100. When the mission icon 136 is tapped, a mission screen, which is not shown, is displayed. In this embodiment, the player is given prescribed missions. Each time the player accomplishes a mission to be cleared, the player can acquire an amount of in-game currency or a prescribed item as a reward.

In the mission screen, a list of the content of missions assigned to the player and the content of rewards that can be acquired in the case when the missions are accomplished is displayed. Note that, for example, the amounts of in-game currency or prescribed items that can be acquired as reward may vary depending on the difficulty levels of missions. Furthermore, for example, the amount of in-game currency or a prescribed item that can be acquired as a reward may be more advantageous as the difficulty level of a mission becomes higher. Furthermore, as missions, missions having limited periods set therefor and missions not having limited periods set therefor may be provided. Furthermore, in the mission screen, a list of missions may be displayed on the basis of whether or not a limited period is set or for each limited period that is set.

Furthermore, in this embodiment, as missions having limited periods set therefor, daily missions, for which limited periods are repeatedly set on a daily basis, and period-specific missions, for which limited periods are set to prescribed periods (e.g., one week or one month), are provided.

When the limited period (one day) of a daily mission expires, a mission having the same content is set again. Thus, the player can accomplish a mission set as a daily mission every day and can acquire a reward each time.

Meanwhile, a period-specific mission vanishes when a prescribed period set as a limited period expires, and is not set again. Thus, it is possible to accomplish a period-specific mission only once during the prescribed period. For example, a reward that is set for a period-specific mission may be more advantageous than a reward that is set for a daily mission.

When the nurturing-game operating part 104 is tapped in the home screen 100, a nurturing game screen is displayed, and the nurturing game is started.

Figure 4A:
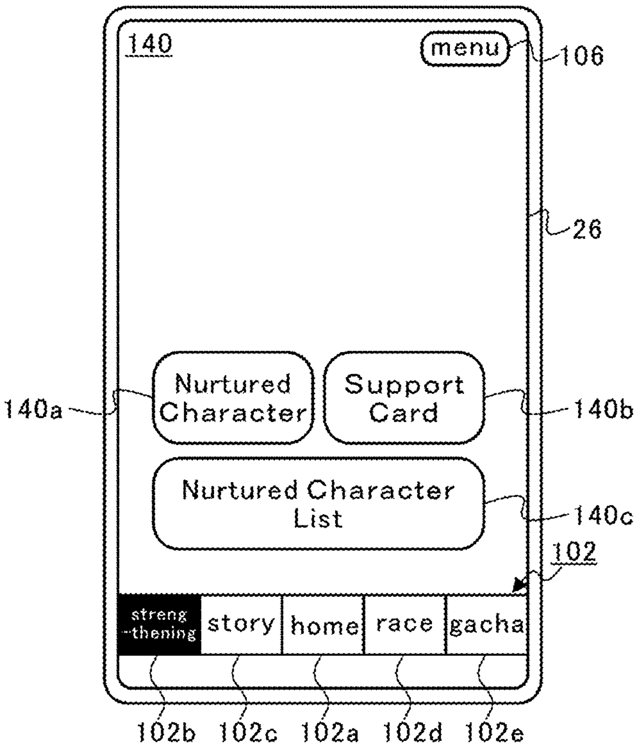
FIG. 4A is an illustration for explaining an example strengthening screen.

FIG. 4A is an illustration for explaining an example strengthening screen 140. As described earlier, when the strengthening-screen selection operating part 102*b* in the menu bar 102 is tapped, the strengthening screen 140 shown in FIG. 4A is displayed. In the strengthening screen 140, a nurtured-character-screen selection operating part 140*a*, a support-card-screen selection operating part 140*b*, and a nurtured-character-list-screen selection operating part 140*c* are provided.

Figure 4B:
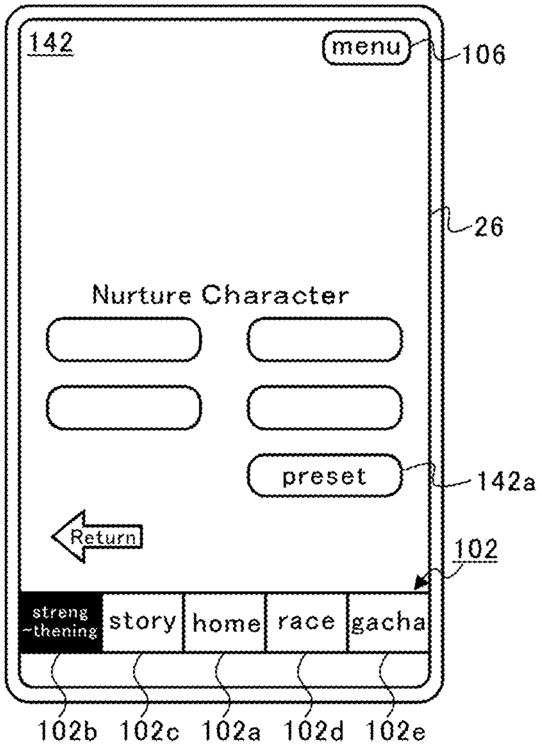
FIG. 4B is an illustration for explaining an example nurtured-character screen.

FIG. 4B is an illustration for explaining an example nurtured-character screen 142. When the nurtured-character-screen selection operating part 140*a* is tapped in the strengthening screen 140 shown in FIG. 4A, the nurtured-character screen 142 shown in FIG. 4B is displayed.

In the nurtured-character screen 142, an operating part for displaying a screen for strengthening a character possessed by the player is provided. By operating this operating part, it is possible to strengthen the character possessed by the player. By strengthening the character, the player can advance the level set for the character. Each character has various kinds of parameters set therefor, and the parameters are advanced as the level is raised. By raising the parameters of the character, the player can nurture a character having a stronger status in the nurturing game.

Furthermore, in the nurtured-character screen 142, operating parts for displaying a list of characters possessed by the player and for displaying a list of items for strengthening the characters possessed by the player are provided.

Furthermore, a preset-screen selection operating part 142*a* is provided in the nurtured-character screen 142. When the preset-screen selection operating part 142*a* is tapped, a preset screen, which is not shown, is displayed.

In the preset screen, it is possible to set in advance, as a preset (reservation selection information), a reservation for one or more races to participate in among individual races in the nurturing game, which will be described later. Specifically, for example, it is possible to set in advance, as a preset (reservation selection information), a reservation for one or more races to participate in among individual races in the nurturing game, which will be described later, in a manner similar to a reservation for an individual race during the execution of the nurturing game, which will be described later. In this embodiment, since it is possible to set a plurality of presets, the player can carefully examine in advance which races are suitable depending on the type of the character to be nurtured, etc. and can set those characters as presets. In other words, it is possible to register a plurality of items of reservation selection information indicating specific options selected by the player from among specific options included in a plurality of options presented in a prescribed game. Furthermore, it is possible to register reservation selection information in the case where the prescribed game is not being executed.

When the support-card-screen selection operating part 140*b* is tapped in the strengthening screen 140 shown in FIG. 4A, a support card screen, which is not shown, is displayed. In the support card screen, it is possible to strengthen support cards possessed by the player. By strengthening support cards, the player can advance the levels set for the support cards. Each support card has various kinds of parameters set therefor, and the parameters are raised as the levels are raised. By raising the parameters of support cards, the player can nurture a character having a stronger status in the nurturing game.

When the nurtured-character-list-screen selection operating part 140*c* is tapped in the strengthening screen 140 shown in FIG. 4A, a nurtured-character list screen, which is not shown, is displayed. In the nurtured-character list screen, it is possible to display a list of characters nurtured by the player himself or herself (hereinafter referred to as nurtured characters) and to check the status of each of the nurtured characters. Next, the nurturing game will be described in detail.

(Nurturing Game)

Figure 5:
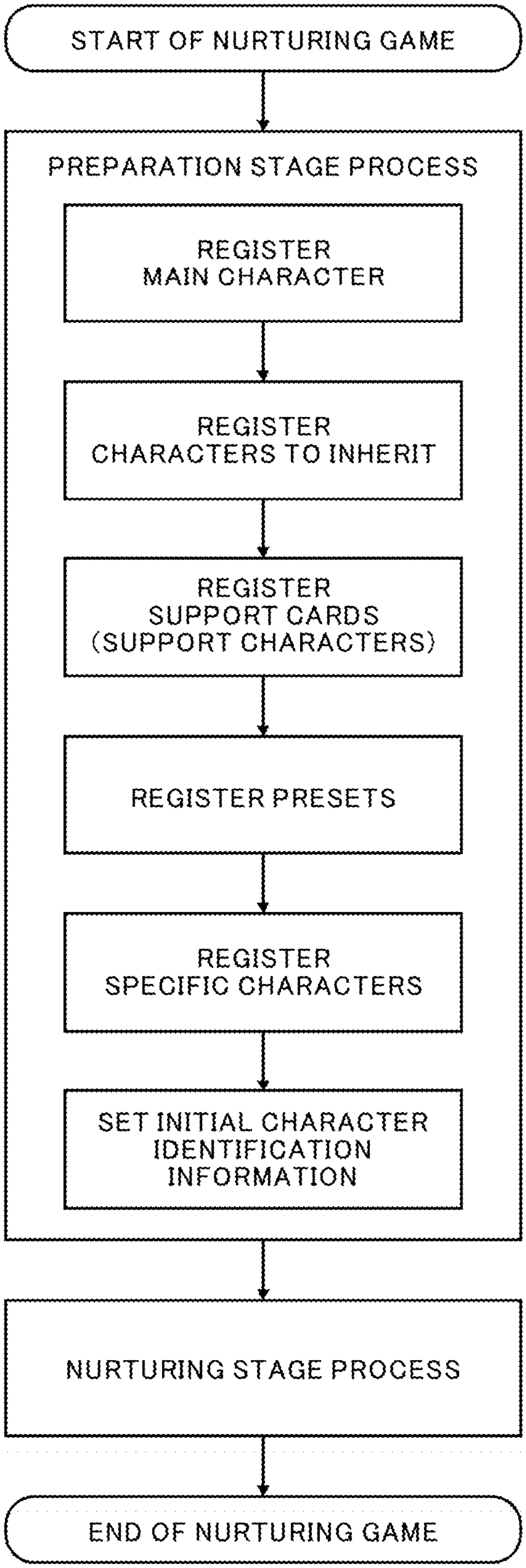
FIG. 5 is a figure for explaining a rough flow of a nurturing game.

FIG. 5 is a figure for explaining a rough flow of the nurturing game. The nurturing game is broadly classified into a setting game and a main nurturing game. As will be described later in detail, the main nurturing game is a game in which one main character selected from among the characters possessed by the player is nurtured as a character to be nurtured.

Furthermore, the setting game is a game in which the player registers a main character and a deck (characters to inherit and support cards) and that corresponds to the preparation stage of the nurturing game. In the following, processing that is carried out in the setting game will be referred to as a preparation stage process, and processing that is carried out in the main nurturing game will be referred to as a nurturing stage process. Here, in order to facilitate understanding, the rough flows in the preparation stage process and the nurturing stage process will be described first.

<Preparation Stage Process>

In the preparation stage process, registration of a main character, registration of a deck (characters to inherit and support cards), selection of presets, registration of specific characters, and setting of initial character identification information are mainly performed. Note that the support cards serve as aids for nurturing the main character. Each of the support cards necessarily has one character associated therewith, and the character associated with the support card, registered in the preparation stage process, aids nurturing of the main character. Characters associated with support cards will hereinafter be referred to as support characters.

<Registration of Main Character>

When the nurturing-game operating part 104 is tapped by the player in the home screen 100, a scenario selection screen, which is not shown, is displayed. In this embodiment, a plurality of scenarios for the main nurturing game are provided. Each of the scenarios for the main nurturing game has set therein a final goal, goals in the middle of the game, etc., and the player has to sequentially clear the set goals. The individual goals, the periods before accomplishing the goals, etc. vary among the individual scenarios. The player can select one of the plurality of scenarios in the scenario selection screen. Here, the case where a prescribed scenario is selected will be described.

Figure 6A:
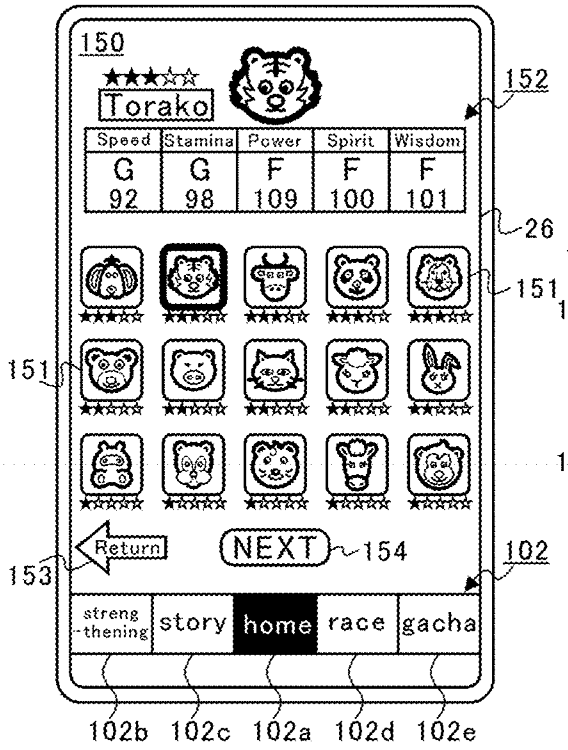
FIG. 6A is an illustration for explaining a main-character selection screen.

FIG. 6A is an illustration for explaining a main-character selection screen 150. In a central part of the main-character selection screen 150, a plurality of character icons 151 are displayed to display a list of characters possessed by the player. Furthermore, a parameter displaying part 152 is displayed in an upper part of the main-character selection screen 150. Furthermore, a return operating part 153 labeled as “Return” and a next operating part 154 labeled as “NEXT” are displayed in a lower part of the main-character selection screen 150.

In this embodiment, initial values of ability parameters are set for each character, and initial values of the ability parameters of the character corresponding to the character icon 151 selected by the player are displayed in the form of numerical values in the parameter displaying part 152. In this embodiment, greater numerical values of ability parameters indicate higher abilities.

FIG. 7A is a figure for explaining an ability parameter (initial value) table. In this embodiment, as shown in FIG. 7A, initial values of ability parameters for each character are stored in the ability parameter (initial value) table. Initial values of ability parameters are displayed in the parameter displaying part 152 on the basis of the initial values of ability parameters stored in the ability parameter (initial value) table.

In this embodiment, initial values of ability parameters are set individually for a plurality of kinds of abilities for each character. Specifically, the following ability parameters are provided. A speed ability parameter labeled as “Speed” in the parameter displaying part 152 is provided. Furthermore, a stamina ability parameter labeled as “Stamina” in the parameter displaying part 152 is provided. Furthermore, a power ability parameter labeled as “Power” in the parameter displaying part 152 is provided. Furthermore, a spirit ability parameter labeled as "Spirit" in the parameter displaying part 152 is provided. Furthermore, a wisdom ability parameter labeled as "Wisdom" in the parameter displaying part 152 is provided.

Note that the initial values of ability parameters for each character may be raised by player operations or the like. For example, five levels may be provided for each character, and the player may be allowed to advance the level of the character by consuming an in-game currency or a prescribed item. In this case, the initial values of ability parameters should be raised as the character level becomes advanced. Note that the player can raise the values of ability parameters in the main nurturing game. That is, the aim of the main nurturing game is to nurture a character having greater numerical values of ability parameters.

Furthermore, in this embodiment, aptitude parameters (initial values) are set for each character. FIG. 7B is a figure for explaining an aptitude parameter (initial value) table. In this embodiment, as shown in FIG. 7B, initial values of aptitude parameters for each character are stored in the aptitude parameter (initial value) table. The initial values of aptitude parameters are each set to one of seven levels in the form of alphabetic characters A to G. A indicates the highest aptitude, while G indicates the lowest aptitude. Note that the initial values of aptitude parameters may be displayed in the parameter displaying part 152 on the basis of the initial values of aptitude parameters stored in the aptitude parameter (initial value) table.

In this embodiment, initial values of aptitude parameters are set individually for a plurality of kinds of aptitudes for each character. Specifically, as aptitude parameters, aptitude parameters concerning individual track aptitudes for turf and dirt are provided. Furthermore, as aptitude parameters, aptitude parameters for individual distance aptitudes for short distance, mile, intermediate distance, and long distance are provided. Furthermore, as aptitude parameters, aptitude parameters for individual running style aptitudes for early speed, front running, stretch running, and closing are provided.

Note that it may be allowed to raise the initial values of aptitude parameters for each character by consuming an in-game currency. Furthermore, the values of aptitude parameters may be changed in the main nurturing game. Note that there may be cases where an aptitude parameter is set to S, which indicates an aptitude higher than A.

Figure 6B:
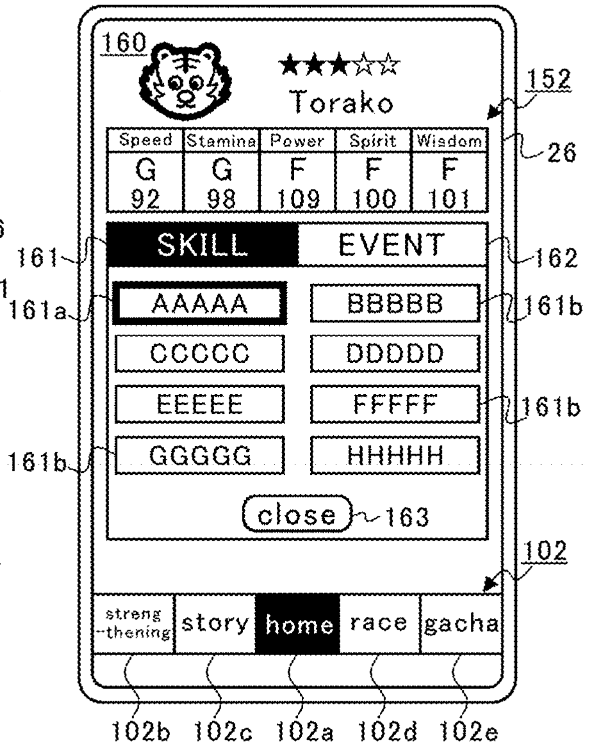
FIG. 6B is a first illustration for explaining a character detail screen.
Figure 6C:
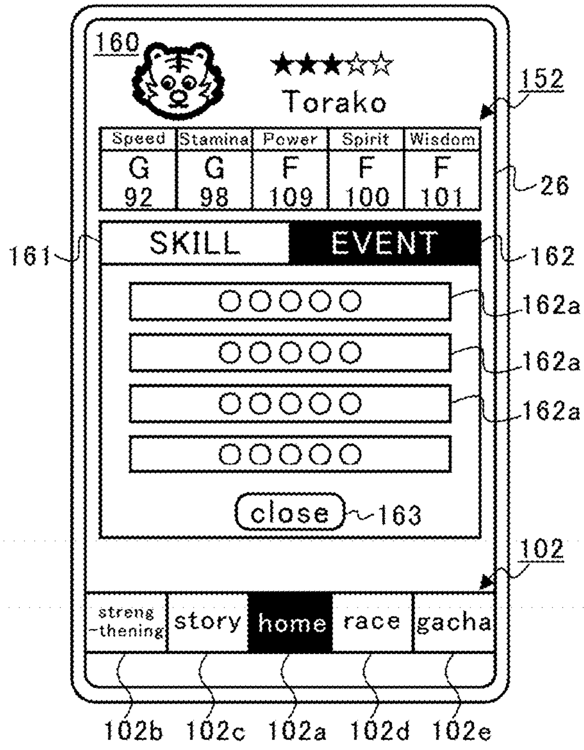
FIG. 6C is a second illustration for explaining the character detail screen.

FIG. 6B is a first illustration for explaining a character detail screen 160. Furthermore, FIG. 6C is a second illustration for explaining the character detail screen 160. When one of the character icons 151 in the main-character selection screen 150 is held, the character detail screen 160 is displayed on the display 26. In the character detail screen 160, details of the abilities of the character corresponding to the character icon 151 held in the main-character selection screen 150 are displayed.

In a central part of the character detail screen 160, a skill operating part 161 and an event operating part 162 are displayed. As shown in FIG. 6B, when the character detail screen 160 is displayed, the skill operating part 161 is initially displayed in a highlighted manner, and skills provided for each character are displayed. A skill refers to an ability that may be invoked in the case where a prescribed condition is satisfied during the execution of individual racing or team racing, which will be described later. A race proceeds advantageously for each character when a skill is invoked.

FIG. 7C is a figure for explaining a skill table. As shown in FIG. 7C, skills of each character possessed by the player are stored in the skill table. As shown in FIG. 6B, skills are displayed in the character detail screen 160 on the basis of the skills stored in the skill table. Note that a skill is not invoked just by being possessed, and it becomes possible for a skill to be invoked for the first time when the skill is acquired. In the following, a skill in the state where a character is able to invoke that skill is referred to as an acquired skill.

From the beginning of the main nurturing game, each character has one acquired skill 161*a* set thereto. Furthermore, apart from the acquired skill 161*a*, each character has a plurality of possessed skills 161*b* set thereto. The possessed skills 161*b* are skills that can be acquired after the start of the main nurturing game by consuming skill points, which will be described later. That is, the possessed skills 161*b* may become acquired skills 161*a* in exchange for skill points.

In this embodiment, each skill corresponding to a double circle symbol in the skill table shown in FIG. 7C is displayed as an acquired skill 161*a* in the character detail screen 160 in FIG. 6B. Furthermore, each skill corresponding to a single circle symbol in the skill table shown in FIG. 7C is displayed as a possessed skill 161*b* in the character detail screen 160 in FIG. 6B. In this embodiment, as shown in the character detail screen 160 in FIG. 6B, the acquired skill 161*a* is displayed in a highlighted manner so that the acquired skill 161*a* and the possessed skills 161*b* can be readily distinguished from each other.

Note that although the case where one acquired skill 161*a* and seven possessed skills 161*b* are displayed as skills provided for each character is shown in FIG. 6B in the context of this embodiment, there is no limitation thereto. For example, the number of acquired skills 161*a* and the number of possessed skills 161*b* may vary among individual characters. Furthermore, the number of acquired skills 161*a* and the number of possessed skills 161*b* of each character may be increased, for example, when the character level is advanced or when an in-game currency or an item is consumed.

Furthermore, when the event operating part 162 in the character detail screen 160 is tapped by the player, as shown in FIG. 6C, the content of the character detail screen 160 is switched, and exclusive events 162*a* provided for each character are displayed. In this case, as shown in FIG. 6C, the event operating part 162 is displayed in a highlighted manner. An exclusive event 162*a* occurs in the case where a prescribed condition is satisfied in the main nurturing game, with which a story relating to a character that appear in the nurturing game is displayed, or the value of an ability character is changed.

FIG. 7D is a figure for explaining an exclusive-event table. As shown in FIG. 7D, in the exclusive-event table, exclusive events 162*a* are stored for each character possessed by the player. Furthermore, as shown in FIG. 6C, exclusive events 162*a* are displayed in the character detail screen 160 on the basis of the exclusive events 162*a* stored in the exclusive-event table. Note that the exclusive events 162*a* may include hint events that make it possible to possess or acquire skills, ability events that increase or decrease the numerical values of ability parameters of a character, etc.

Note that the exclusive events 162*a* displayed in the character detail screen 160 shown in FIG. 6C may be arranged such that all the exclusive events 162*a* are executed during the execution of the main nurturing game. Alternatively, the exclusive events 162*a* displayed in the character detail screen 160 shown in FIG. 6C may be arranged such that at least some of the exclusive events 162*a* are executed during the execution of the main nurturing game. Alternatively, the exclusive events 162*a* displayed in the character detail screen 160 shown in FIG. 6C may be arranged such that none of the exclusive events 162*a* are executed during the execution of the main nurturing game in the case where the prescribed condition is not satisfied. Furthermore, the number of exclusive events 162*a* provided for each character may be increased, for example, when the character level is advanced, when an in-game currency or an item is consumed, or the like. Furthermore, exclusive events 162*a* that are not displayed as exclusive events 162*a* may be executed during the main nurturing game in the case where the prescribed condition is satisfied.

Furthermore, as shown in FIGS. 6B and 6C, in a lower part of the character detail screen 160, a close operating part 163 labeled as "close" is displayed. When the close operating part 163 of the character detail screen 160 is tapped, the displaying of the character detail screen 160 is terminated, and the main-character selection screen 150 is displayed on the display 26.

Furthermore, when the return operating part 153 is tapped in the main-character selection screen 150 shown in FIG. 6A, the home screen 100 shown in FIG. 3A is displayed on the display 26. Furthermore, when the next operating part 154 is tapped in the main-character selection screen 150 shown in FIG. 6A, the selected character is set as the main character, and a character-to-inherit selection screen 170 is displayed on the display 26.

<Registration of Characters to Inherit>

Figure 8A:
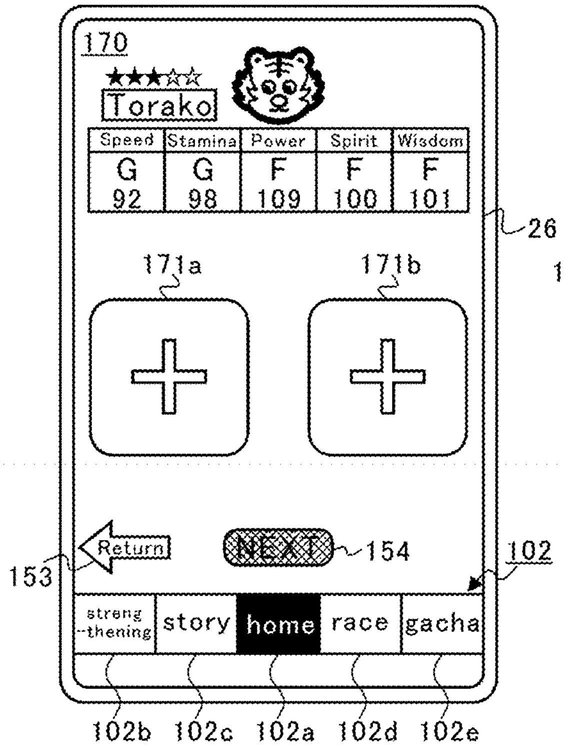
FIG. 8A is a first illustration for explaining a character-to-inherit selection screen.
Figure 8B:
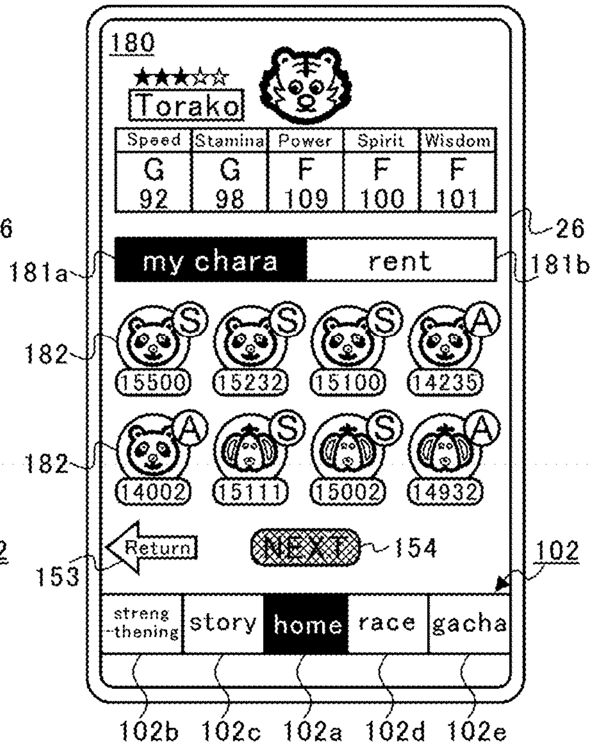
FIG. 8B is a first illustration for explaining a nurtured-character list screen.
Figure 8C:
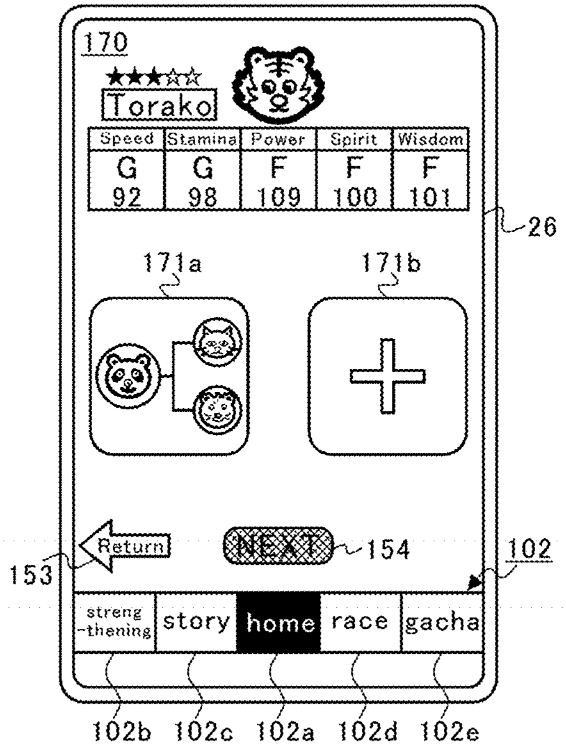
FIG. 8C is a second illustration for explaining the character-to-inherit selection screen.
Figure 8D:
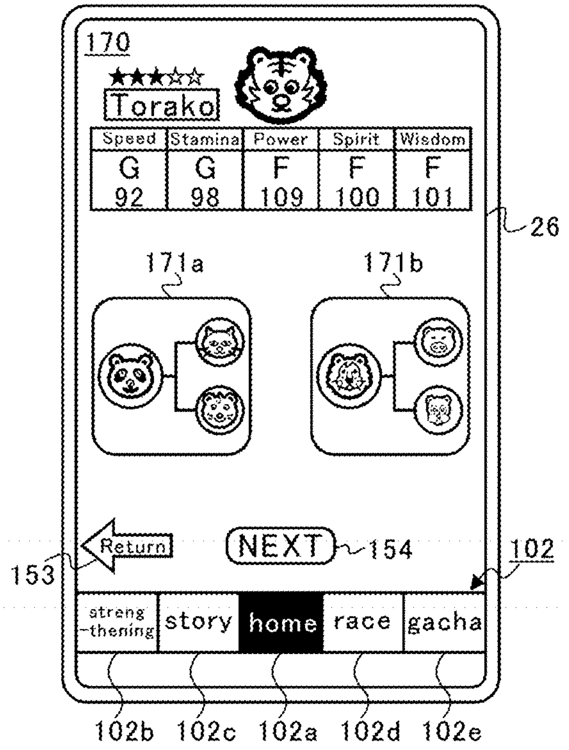
FIG. 8D is a third illustration for explaining the character-to-inherit selection screen.

FIG. 8A is a first illustration for explaining a character-to-inherit selection screen 170. FIG. 8B is an illustration for explaining a nurtured-character list screen 180. FIG. 8C is a second illustration for explaining the character-to-inherit selection screen 170. FIG. 8D is a third illustration for explaining the character-to-inherit selection screen 170. The character-to-inherit selection screen 170 is a screen for the player to register characters to inherit. A character to inherit refers to a character whose ability values, skills, etc. are to be inherited by the main character. The player can select two characters to inherit from among nurtured characters possessed by the player himself or herself and representative characters of other players, extracted according to a prescribed extraction condition, e.g., representative characters of friends such as followers, and can incorporate the two characters to inherit in the deck and register the characters. Note that in each single occasion of the nurturing game, it is possible to incorporate only one representative character of another player in the deck as a character to inherit.

In the character-to-inherit selection screen 170, a first character-to-inherit selection area 171*a* and a second character-to-inherit selection area 171*b* are provided. Upon a screen transition from the main-character selection screen 150 to the character-to-inherit selection screen 170, as shown in FIG. 8A, the first character-to-inherit selection area 171*a* and the second character-to-inherit selection area 171*b* are displayed as being blank.

When the first character-to-inherit selection area 171*a* or the second character-to-inherit selection area 171*b* is tapped, the nurtured-character list screen 180 shown in FIG. 8B is displayed. In the nurtured-character list screen 180, a my character tab 181*a* and a rental tab 181*b* are provided. Furthermore, a nurtured-character-list display area is provided under the my character tab 181*a* and the rental tab 181*b*. Nurtured-character icons 182 are displayed in the nurtured-character-list display area.

In the state where the my character tab 181*a* is selected, as shown in FIG. 8B, nurtured-character icons 182*a* corresponding to the nurtured characters possessed by the player himself or herself are displayed. Furthermore, although not shown, in the state where the rental tab 181*b* is selected, representative characters of friends, i.e., nurtured-character icons 182 corresponding to nurtured characters nurtured by friends are displayed. When one of the nurtured-character icons 182 is held, detailed information concerning the nurtured character corresponding to the nurtured-character icon 182 is displayed.

Furthermore, when one of the nurtured-character icons 182 is tapped, the nurtured character corresponding to the nurtured-character icon 182 becomes tentatively selected. Furthermore, when one of the nurtured-character icons 182 is tapped, as shown in FIG. 8C, the character-to-inherit selection screen 170 is displayed. At this time, for example, in the case where the first character-to-inherit selection area 171*a* is tapped, the nurtured-character list screen 180 is displayed, and one of the nurtured-character icons 182 is tapped in the nurtured-character list screen 180, the image indicating the tentatively selected nurtured character is displayed in the first character-to-inherit selection area 171*a*. Furthermore, information concerning the characters to inherit that were used at the time of nurturing is stored in association with the nurtured character. In the first character-to-inherit selection area 171*a*, the information concerning the characters to inherit that were used when nurturing the nurtured character is displayed.

In this state, for example, when the second character-to-inherit selection area 171*b* is tapped, the nurtured-character list screen 180 is displayed, and one of the nurtured-character icons 182 is tapped in the nurtured-character list screen 180, as shown in FIG. 8D, the image indicating the tentatively selected nurtured character is displayed in the second character-to-inherit selection area 171*b*.

When two nurtured characters are tentatively selected, the next operating part 154 provided in the character-to-inherit selection screen 170 becomes enabled. When the next operating part 154 that has become enabled is tapped, the tentatively selected nurtured characters are incorporated in the deck and are registered as characters to inherit, and a support-card incorporation screen 190, which will be described later, is displayed.

Note that the player has to necessarily select two nurtured characters as characters to inherit in the character-to-inherit selection screen 170. In the case where two characters to inherit are not tentatively selected, as shown in FIGS. 8A and 8C, the next operating part 154 is grayed out, which prohibits player operations from being accepted. Furthermore, the return operating part 153 is provided in the character-to-inherit selection screen 170, and the main-character selection screen 150 is displayed when the return operating part 153 is tapped.

<Registration of Support Cards>

Figure 9A:
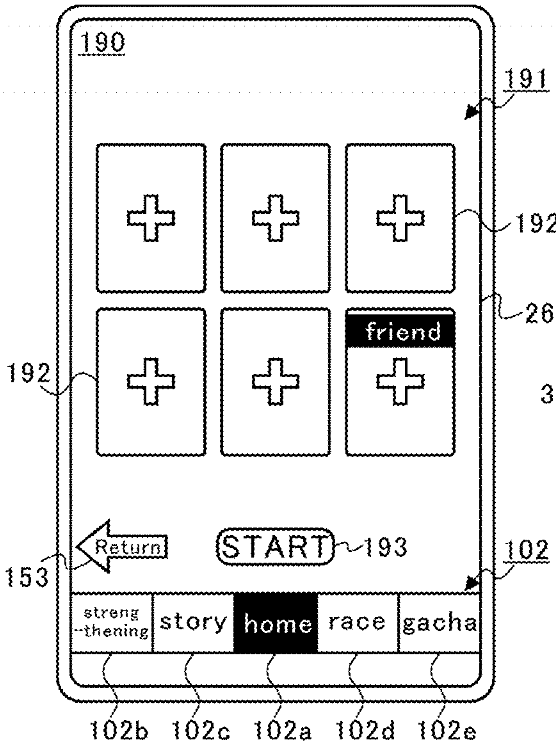
FIG. 9A is a first illustration for explaining a support-card incorporation screen.

FIG. 9A is a first illustration for explaining a support-card incorporation screen 190. When two characters-to-inherit have been registered in the character-to-inherit selection screen 170, the support-card incorporation screen 190 shown in FIG. 9A is displayed. A support-card display area 191 is provided in a central part of the support-card incorporation screen 190. The support-card display area 191 includes a plurality of support-card display frames 192. Furthermore, in a lower part of the support-card incorporation screen 190, a return operating part 153 labeled as "Return" and a start operating part 193 labeled as "START" are displayed.

In the support-card display area 191, a plurality of (six here) support-card display frames 192 are displayed. The same number of support-card display frames 192 as the number of support cards that can be set by the player are displayed. Note that the support-card display frames 192 are initially displayed as being blank when the support-card incorporation screen 190 is displayed.

In this embodiment, the player can set six kinds of support cards in the deck. Note that some (e.g., five kinds) among the six kinds that can be set by the player can be selected from the support cards possessed by the player. Furthermore, other some (e.g., one kind) among the six kinds that can be set by the player can be selected from the support cards set as rental cards by other players such as friends.

Figure 9B:
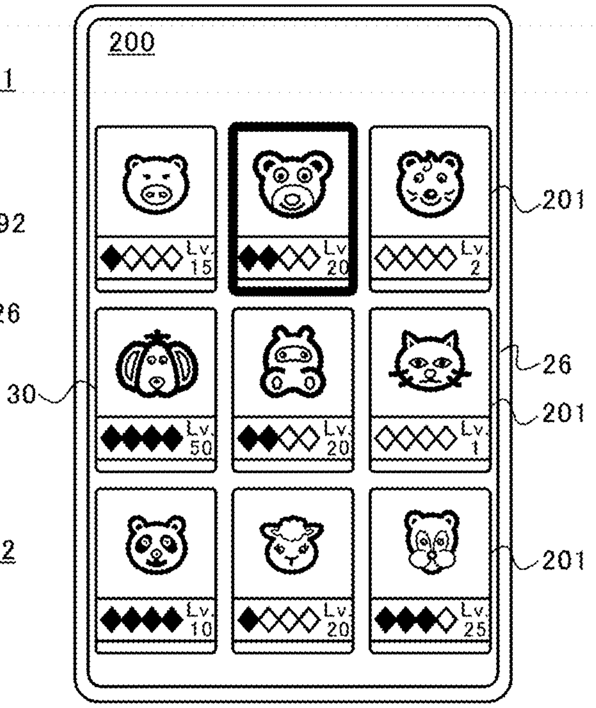
FIG. 9B is an illustration for explaining a support-card selection screen.

FIG. 9B is an illustration for explaining a support-card selection screen 200. When one of the support-card display frames 192 (except the support-card display frame 192 displayed at the lower right) is tapped in the support-card incorporation screen 190 in FIG. 9A, the support-card selection screen 200 shown in FIG. 9B is displayed on the display 26. In the support-card selection screen 200, a list of card icons 201 corresponding to the support cards possessed by the player is displayed. The player can select a support card by tapping one of the card icons 201 displayed in the support-card selection screen 200.

Note that although not shown, when the support-card display frame 192 displayed at the lower right in the support-card incorporation screen 190 is tapped, support cards set as rental cards by friends or by players extracted on the basis of a prescribed condition, such as a lottery, are displayed in the support-card selection screen 200. At this time, the player can select a support card of a friend by tapping one of the support cards displayed in the support-card selection screen 200. As described above, the player can use support cards possessed by other players in the nurturing game.

FIG. 10A is an illustration for explaining a support card table. As shown in FIG. 10A, in the support card table, the kinds of support characters (i.e., character IDs), rarities, levels, and favorite kinds of training are stored for individual types of support cards (i.e., support card IDs) possessed by the player. The support characters correspond to the types of support cards one by one. That is, each support card ID necessarily has one character ID associated therewith. In other words, each support card necessarily corresponds to one support character.

In this embodiment, rarities are set for individual support cards. Three levels, namely, R (rare), SR (super rare), and SSR (super special rare), are provided as the rarities. R indicates that the lowest rarity is set, and SSR indicates that the highest rarity is set. In this embodiment, support cards having higher rarities tend to exhibit greater support effects, which will be described later. Furthermore, in this embodiment, the numbers of possessed skills and the numbers of support events, which will be described later, tend to be greater with support cards having higher rarities.

As the levels of support cards, 50 levels, namely, level 1 to level 50, are provided. The player can advance the levels of support cards, and the levels advanced by the player are stored for individual support cards. Note that it is possible to advance the levels of support cards by using an in-game currency, items, or the like. Note that an upper limit is set for the level of each support card depending on the rarity.

For example, level 20 is defined as an upper limit for support cards with the rarity R, level 25 is defined as an upper limit for support cards with the rarity SR, and level 30 is defined as an upper limit for support cards with the rarity SSR.

Note that the level upper limits can be progressively raised in the case where prescribed conditions are satisfied. For example, the arrangement may be such that the upper limit for support cards with the rarity R can be raised up to level 40 at most. Furthermore, the arrangement may be such that the upper limit for support cards with the rarity SR can be raised up to level 45 at most. Furthermore, the arrangement may be such that the upper limit for support cards with the rarity SSR can be raised up to level 50 at most.

FIG. 10B is a figure for explaining a support effect table. As shown in FIG. 10B, in the support effect table, support effects are stored for the individual kinds of support cards possessed by the player.

Support effects raise various kinds of statuses in the main nurturing game. Support cards have a plurality of kinds of support effects. Example kinds of support effects include physical energy, speed, stamina, power, spirit, and wisdom.

FIG. 10C is a figure for explaining a possessed skill table. As shown in FIG. 10C, in the possessed skill table, possessed skills are set for the individual support cards possessed by the player. In this embodiment, possessed skills are set for individual support cards such that the character set by the player as the main character possesses the possessed skills. It becomes possible for the main character selected by the player, or another character promoted to a team member, which will be described later, to acquire each of the possessed skills set for the individual support cards when a hint event occurs during the main nurturing game.

FIG. 10D is a figure for explaining a support event table. As shown in FIG. 10D, in the support event table, support events that may occur are stored for the individual support cards possessed by the player. Support events refer to events that may occur during the execution of the main nurturing game. In the case where a support event has occurred, there are cases where the value of one of the various kinds of statuses in the main nurturing game increases or decreases.

For example, a support event that occurs may be determined depending on the number of turns, or a support event that occurs may be determined through a prescribed lottery. Furthermore, a plurality of support events that occur may be selected for one turn. In either case, it suffices to determine a support event that occurs according to a prescribed determination method set in advance.

Figure 9C:
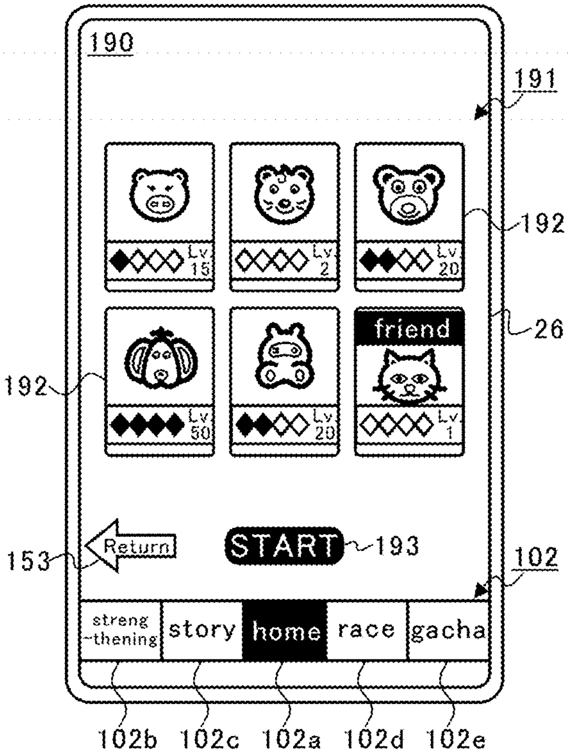
FIG. 9C is a second illustration for explaining the support-card incorporation screen.

FIG. 9C is a second illustration for explaining the support-card incorporation screen 190. In this embodiment, when all the six support cards have been selected, as shown in FIG. 9C, it becomes possible to operate the start operating part 193. Meanwhile, in the case where all the six support cards have not been selected, as shown in FIG. 9A, it is prohibited to operate the start operating part 193.

Note that when the return operating part 153 is operated in the support-card incorporation screen 190, the character-to-inherit selection screen 170 shown in FIG. 8D is displayed on the display 26. Furthermore, as shown in FIG. 9C, when the start operating part 193 is tapped in the support-card incorporation screen 190, the selected support cards are registered, and a final confirmation screen 195 (FIG. 11A), which will be described later, is displayed on the display 26.

<Registration of Presets>

Figure 11A:
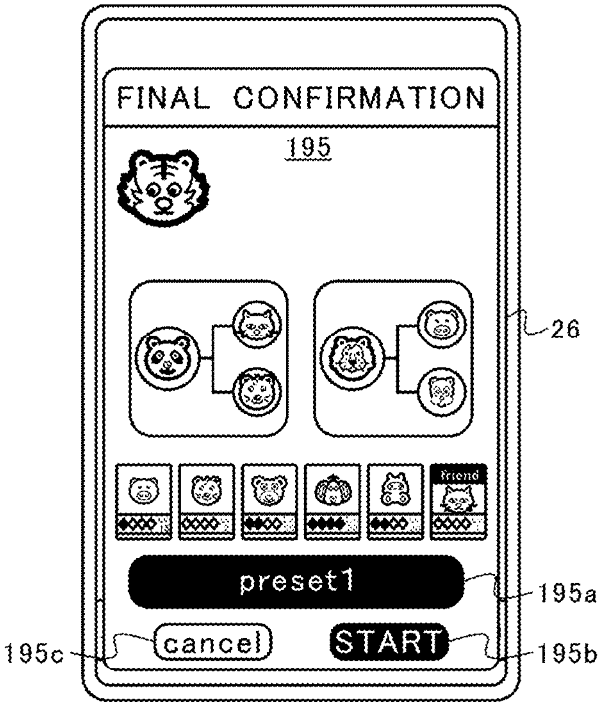
FIG. 11A is an illustration for explaining a final confirmation screen.

FIG. 11A is an illustration for explaining the final confirmation screen 195. In the final confirmation screen 195, the main character and the deck (characters to inherit and support cards) registered as described above are displayed. Furthermore, in the final confirmation screen 195, a preset-selection-screen operating part 195*a* is displayed. Furthermore, in a lower part of the final confirmation screen 195, a start operating part 195*b* labeled as "START" and a cancel operating part 195*c* labeled as "cancel" are displayed.

Figure 11B:
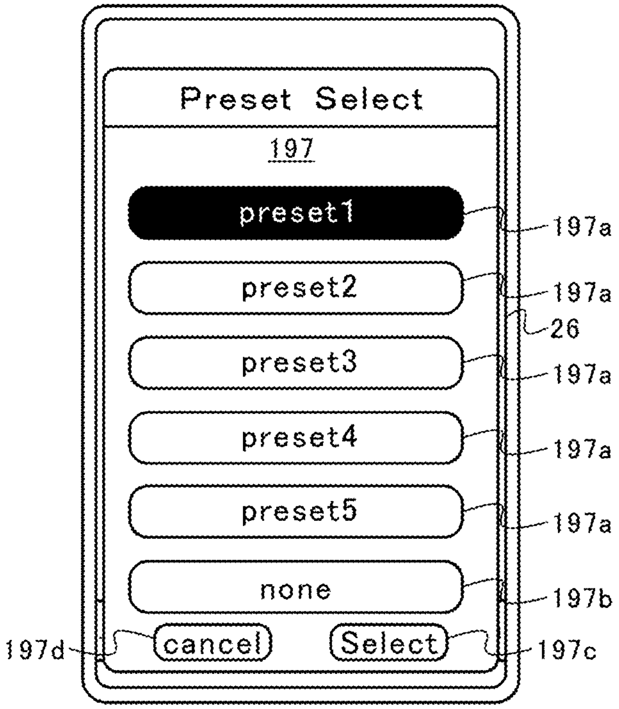
FIG. 11B is an illustration for explaining a preset selection screen.

FIG. 11B is an illustration for explaining a preset selection screen 197. When the preset-selection-screen operating part 195*a* is tapped in the final confirmation screen 195, the preset selection screen 197 shown in FIG. 11B is displayed on the display 26. In the preset selection screen 197, preset selection operating parts 197*a* corresponding to the individual presets set in advance by the player, as well as a preset unselection operating part 197*b* for unselecting the presets, are displayed in the form of a list. Furthermore, in a lower part of the preset selection screen 197, a select operating part 197*c* labeled as "Select" and a cancel operating part 197*d* labeled as "cancel" are displayed.

When one of the preset selecting parts 197*a* and the preset unselecting part 197*b* displayed in the form of a list is tapped in the preset selection screen 197, the tapped item is displayed in a highlighted manner. Furthermore, when the select operating part 197*c* is tapped in the state where one of the items is displayed in a highlighted manner, the item displayed in a highlighted manner is selected, and the final confirmation screen 195 shown in FIG. 11A is displayed on the display 26.

Note that the arrangement may be such that when each preset selecting part 197*a* is held, a popup screen displaying a list of content (reservation selection information) set for the held preset selecting part 197*a* is displayed.

As shown in FIG. 11A, in the final confirmation screen 195, an image (text) corresponding to the selected preset selecting part 197*a* or preset unselecting part 197*b* is displayed. Note that the arrangement may be such that, initially when the final confirmation screen 195 is displayed, one of the preset selecting parts 197*a* is displayed (selected) or the preset unselecting part 197*b* is displayed (selected). Note that although preset selecting parts 197*a* labeled as "preset1" to "preset5" are displayed in FIG. 11A, the player may be allowed to freely change the names of the individual presets. In this case, the arrangement may be such that preset selecting parts 197*a* labeled with preset names set by the player are displayed.

Furthermore, when the cancel operating part 197*d* is tapped in the preset selection screen 197, the final confirmation screen 195 is displayed on the display 26.

Furthermore, when the start operating part 195*b* is tapped in the final confirmation screen 195, the selected preset selecting part 197*a* or preset unselecting part 197*b* is registered, and a game screen 210 (FIG. 15A) is displayed on the display 26. In the case where one of the preset selecting parts 197*a* is registered, a reservation for a race is performed on the basis of the content (reservation selection information) set for the preset selecting part 197*a*.

As will be described later in detail, in this embodiment, preset-information storage units 752 and 1152 in which reservation selection information for the individual presets set by the player is saved are provided in the player terminal 1 and the server 1000. Furthermore, reserved-information storage units 753 and 1153 in which reservation selection information set for the nurturing game being executed is saved are provided in the player terminal 1 and the server 1000.

Furthermore, when the cancel operating part 195*c* is tapped in the final confirmation screen 195, the support-card incorporation screen 190 is displayed on the display 26.

<Registration of Specific Characters>

When a main character, characters to inherit, support cards, and presets have been registered, as described above, specific characters are registered. In this embodiment, four kinds of characters are set in advance as specific characters.

FIG. 12 is a first figure for explaining a character identification information table. FIG. 13 is a second figure for explaining the character identification information table. FIG. 12 shows the case where "character C" is registered as the main character and "character E", "character I", "character L", "character M", "character Q", and "character T" are registered as the support characters. Furthermore, FIG. 13 shows the case where "character F" is registered as the main character and "character E", "character J", "character L", "character M", "character Q", and "character T" are registered as the support characters.

Note that in this embodiment, there is a restriction that there is no overlapping between the kind of character set as the main character and the kinds of characters set as support characters when support cards are registered.

In this embodiment, as shown in FIG. 12, "character F", "character J", "character N", and "character R" are set as specific characters. Furthermore, when the player has selected a main character from among a plurality of characters, the selected character is registered as the main character in the character identification information table.

Furthermore, when support cards have been selected by player's operations, the character identification information table is updated to register the characters corresponding to the selected support cards as support characters.

Furthermore, when information relating to the main character and the support cards has been registered in the character identification information table, information concerning specific characters is registered. At this time, as shown in FIGS. 12 and 13, "character F", "character J", "character N", and "character R" are registered as the specific characters irrespective of the kinds of the registered main character and support characters.

<Setting of Initial Character Identification Information>

When a main character, characters to inherit, support characters, presets, and specific characters have been registered, as described above, team members and sub-members are registered. As will be described later in detail, in the nurturing game, it is necessary to play battle games by using characters registered as team members. Furthermore, when a character registered as a sub-member satisfies a certain condition, the character is registered as a team member.

In this embodiment, the characters registered as the main character, the support characters, and the specific characters in the character identification information table are registered as team members. That is, in the case of FIG. 12, "character C", "character E", "character F", "character I", "character J", "character L", "character M", "character N", "character Q", "character R", and "character T" are registered as team members. Furthermore, in the case of FIG. 13, "character E", "character F", "character J", "character L", "character M", "character N", "character Q", "character R", and "character T" are registered as team members.

Furthermore, in the character identification information table, among the characters or support cards (support characters) possessed by the player, characters not registered as team members are registered as sub-members. Note that among predefined characters, all the remaining characters not registered as team members, or some characters selected through a lottery, may be registered as sub-members.

Note that although it is assumed here that the support characters and the specific characters are registered as team members from the beginning of the main nurturing game, there is no limitation to this arrangement. For example, the support characters and the specific characters may be registered as sub-members at the beginning of the main nurturing game and may then be registered as team members at a prescribed timing.

When information concerning team members and sub-members (initial character identification information) has been stored in the character identification information table, as described above, the preparation stage process is finished.

<Nurturing Stage Process>

When the preparation stage process is finished, a nurturing stage process is started. In the nurturing stage process, it becomes possible to nurture the characters registered as the main character and the team members. Note that in the following, in order to facilitate understanding, descriptions will first be directed to the main flow of the main nurturing game.

FIG. 14 is a figure for explaining a selection item table. Note that a selection item table is provided for each type of main character here. Alternatively, however, a shared selection item table may be provided irrespective of the type of main character. As shown in FIG. 14, the nurturing game consists of the 1st turn to the 60th turn, and is designed such that various kinds of parameters are updated in accordance with the results of player selections in the individual turns. Furthermore, with the selection item table, items that can be selected by the player are set in advance for each turn.

Figure 15A:
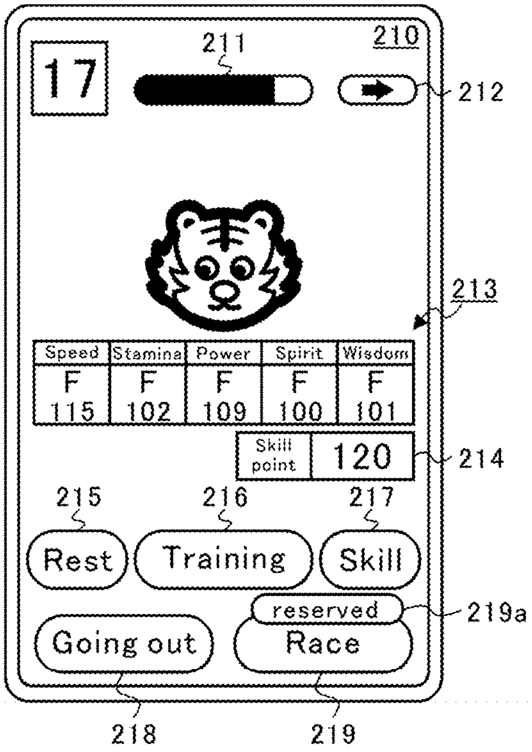
FIG. 15A is a first illustration for explaining a game screen.
Figure 15B:
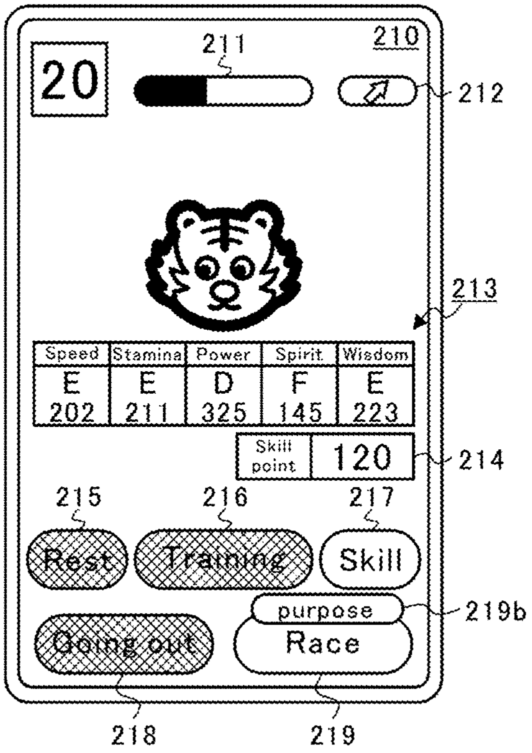
FIG. 15B is a second illustration for explaining the game screen.

FIG. 15A is a first illustration for explaining a game screen 210. FIG. 15B is a second illustration for explaining the game screen 210. Upon a transition to the nurturing stage process, the game screen 210 shown in FIGS. 15A and 15B is displayed on the display 26. In an upper part of the game screen 210, a physical-energy displaying part 211 and a character-condition displaying part 212 are displayed. The main character has a "physical energy" parameter set thereto. The "physical energy" parameter is mainly used to calculate a failure rate, which is the probability of failure in training, which will be described later. The physical-energy displaying part 211 is displayed so that the current remaining amount of "physical energy" of the main character can be recognized visually in relation to an upper limit value of "physical energy".

Furthermore, the main character has a "character condition" parameter set thereto. The character-condition displaying part 212 is displayed so that the current "character condition" of the main character can be recognized visually in terms of one of a plurality of levels (five levels consisting of terrible, poor, average, good, and great). As the "character condition" parameter becomes greater, the main character can proceed with a race advantageously, and the value by which an ability parameter is increased through training becomes greater.

Furthermore, as shown in FIGS. 15A and 15B, in a central part of the game screen 210, an image of the main character, a status displaying part 213, and a skill-point displaying part 214 are displayed. In the status displaying part 213, the current statuses of the main character are displayed in terms of numerical values and ranks among a plurality of levels (sixteen levels consisting of $G^+$, E, $F^+$, E, $E^+$, D, $D^+$, C, $C^+$, B, $B^+$, A, $A^+$, S, SS, and $SS^+$). Specifically, in this embodiment, numerical values and ranks of the following individual ability parameters are displayed: "speed", "stamina", "power", "spirit", and "wisdom". Furthermore, in the skill-point displaying part 214, the remaining amount of skill points possessed by the main character in the nurturing game is indicated in terms of a numerical value.

Furthermore, as shown in FIGS. 15A and 15B, in a lower part of the game screen 210, the following operating parts are displayed: a rest operating part 215 labeled as "Rest"; a training operating part 216 labeled as "Training"; a skill operating part 217 labeled as "Skill"; a going-out operating part 218 labeled as "Going Out"; and an individual-race operating part 219 labeled as "Race". Furthermore, the current number of turns is displayed in an upper part of the game screen 210.

Furthermore, the player can select one of "Rest" (the rest operating part 215), "Training" (the training operating part 216), "Going Out" (the going-out operating part 218), and "Race" (the individual-race operating part 219) in each turn. At this time, as shown in FIG. 14, items that can be selected in each turn are set in advance.

Furthermore, in the case where presets have been registered in the preparation stage process, as described earlier, and in the case where there is a race reserved on the basis of a preset (reservation selection information) in the current turn, a reservation icon 219*a* labeled as "reserved" is displayed in a manner superimposed on the individual-race operating part 219. That is, a race reserved in the nurturing game being executed is displayed in a distinguishable manner in the nurturing game. In other words, registered reservation selection information is obtained, which makes it possible to identify specific options included in the reservation selection information during a prescribed game on the basis of the reservation selection information obtained.

Note that, as will be described later in detail, in this embodiment, both in the case where presets have been registered and in the case where presets have not been registered in the preparation stage process, it is possible to make reservations for individual races after the nurturing game is started. In other words, it is possible to register (update) reservation selection information during the execution of a prescribed game. Thus, the reservation icon 219*a* is also displayed even in the case where an individual race reserved after the nurturing game is started exists in the current turn.

Furthermore, in this embodiment, a purpose race is set for each main character in the nurturing game. Specifically, settings are made such that in turns in which purpose races are set, it becomes prohibited to select each of the rest operating part 215, the training operating part 216, and the going-out operating part 218, like the 20th turn, the 30th turn, the 35th turn, the 57th turn, the 59th turn, the 74th turn, the 76th turn, and the 78th turn shown in FIG. 14. Thus, in such turns in which purpose races are set, as shown in FIG. 15B, the rest operating part 215, the training operating part 216, and the going-out operating part 218 are displayed in a grayed-out manner, and thus operations thereof by the player are not accepted. Therefore, in such turns, the player has to select the individual-race operating part 219.

Note that in the case where, for a turn in which a purpose race is set, the content (race) set in a registered preset differs from the purpose race, the content (race) set in the registered preset is not reserved for that turn. The arrangement may be such that, in this case, a popup for reporting that the content (race) set in the registered preset has not been reserved is displayed. Note that the timing of displaying the popup may be the timing of starting the nurturing game or the timing of starting a turn in which a purpose race is set. Alternatively, the timing of displaying the popup may be the timing of fetching prescribed content (reservation selection information) of a preset and overwriting therewith information (reservation selection information) for an individual race reserved in the nurturing game, which will be described later.

Note that, in this embodiment, as shown in FIG. 14, the period from the 1st turn to the 24th turn is set as a junior class (junior). Furthermore, the period from the 25th turn to the 48th turn is set as a classic class (classic). Furthermore, the period from the 49th turn to the 72nd turn is set as a senior class (senior). Furthermore, the period from the 73rd turn to the 78th turn is set as final (final).

Furthermore, in the case where a purpose race is set in the current turn, a purpose icon 219*b* labeled as "purpose" is displayed in a manner superimposed on the individual-race operating part 219. In other words, in the case where the reservation icon 219*a* is displayed, the player can select one of the rest operating part 215, the training operating part 216, the going-out operating part 218, and the individual-race operating part 219. Meanwhile, in the case where the purpose icon 219*b* is displayed, the player has to select the individual-race operating part 219.

Note that the skill operating part 217 is set so that the skill operating part 217 can constantly be selected in every turn. Note that, as will be described later in detail, even when a skill is acquired in one turn, that turn is not finished. Note that in this embodiment, team racing is forcibly executed after the end of a prescribed turn.

Figure 16A:
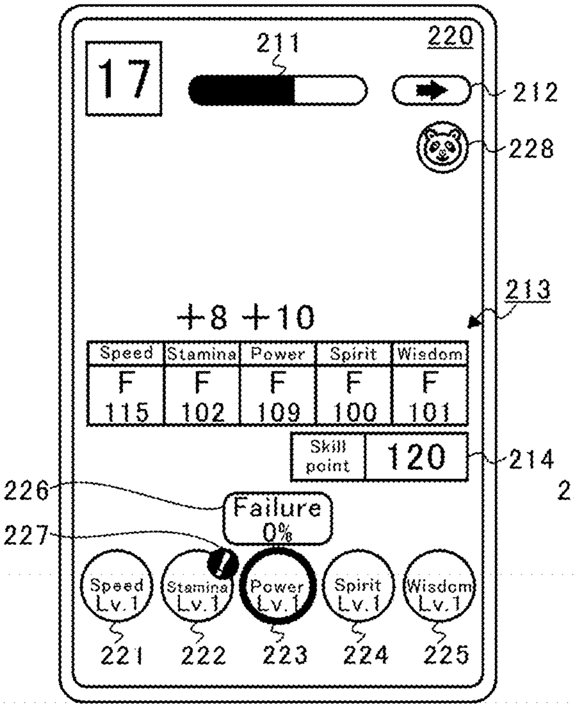
FIG. 16A is a first illustration for explaining a training screen.
Figure 16B:
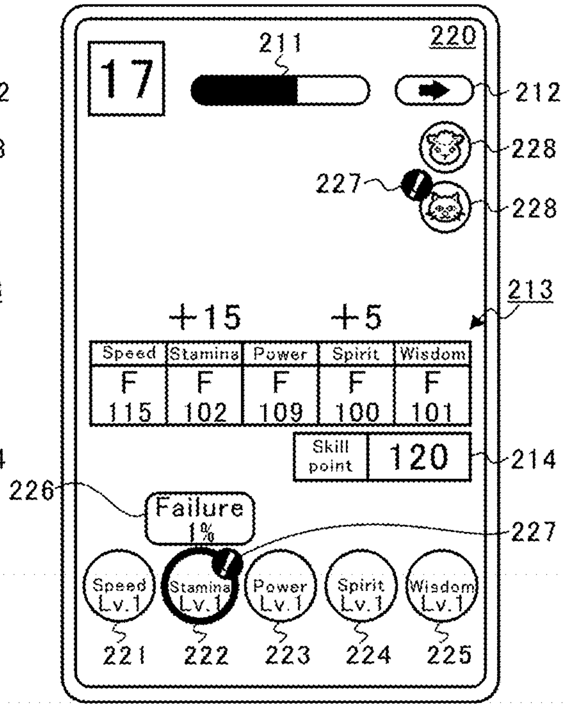
FIG. 16B is a second illustration for explaining the training screen.

FIG. 16A is a first illustration for explaining a training screen 220. FIG. 16B is a second illustration for explaining the training screen 220. When the training operating part 216 in the game screen 210 is operated, the training screen 220 is displayed on the display 26.

As shown in FIG. 16A, training items are displayed in a lower part of the training screen 220. Here, a speed operating part 221 labeled as "Speed" is displayed. Furthermore, a stamina operating part 222 labeled as "Stamina" is displayed. Furthermore, a power operating part 223 labeled as "Power" is displayed. Furthermore, a spirit operating part 224 labeled as "Spirit" is displayed. Furthermore, a wisdom operating part 225 labeled as "Wisdom" is displayed.

When the player taps one of the individual operating parts 221 to 225 once, the training item corresponding to the tapped one of the operating parts 221 to 225 is tentatively selected, and the one of the operating parts 221 to 225 corresponding to the tentatively selected training item is displayed in a highlighted manner. FIG. 16A shows the state where the power operating part 223 is tentatively selected. Meanwhile, FIG. 16B shows the state where the stamina operating part 222 is tentatively selected.

Furthermore, in the individual operating parts 221 to 225, training levels for the individual training items are displayed. A training level is a parameter that is raised on the basis of the team ranking, and as the training level becomes higher, the value by which an ability parameter is increased when training is executed becomes greater. Each training level is initially set to 1, and is raised up to level 5 at most.

Furthermore, in tentatively selected one of the operating parts 221 to 225, a failure-rate displaying part 226 labeled as "Failure" is displayed. The failure rate displayed in terms of a numerical value in the failure-rate displaying part 226 is set so as to increase in inverse proportion to the remaining physical energy displayed in the physical-energy displaying part 211.

Furthermore, in the status displaying part 213, the values by which an ability parameter is increased when training corresponding to the tentatively selected one of the operating parts 221 to 225 is executed and is successful are displayed. For example, in the example shown in FIG. 16A, the power operating part 223 is tentatively selected, "+8" is displayed for "Stamina" and "+10" is displayed for "Power" in the status displaying part 213. Meanwhile, in the example shown in FIG. 16B, the stamina operating part 222 is tentatively selected, "+15" is displayed for "Stamina" and "+5" is displayed for "Spirit" in the status displaying part 213.

Furthermore, an event-report indication 227 is displayed in each one of the operating parts 221 to 225 corresponding to a training item with which a prescribed event occurs in the case where a training is executed and is successful. Note that the mode of displaying the event-report indication 227 may be varied depending on the kind of event.

Furthermore, as shown in FIG. 16B, in an upper right part of the training screen 220, for each of the tentatively selected operating parts 221 to 225, an assigned character icon 228 of a character assigned for training is displayed. Furthermore, in the case where a prescribed event occurs in association with a character displayed in an assigned character icon 228 in the case where the training is successful, the event-report indication 227 is displayed in the corresponding assigned character icon 228. Note that in the following, training in which a character is assigned will be referred to as joint training.

Figure 16C:
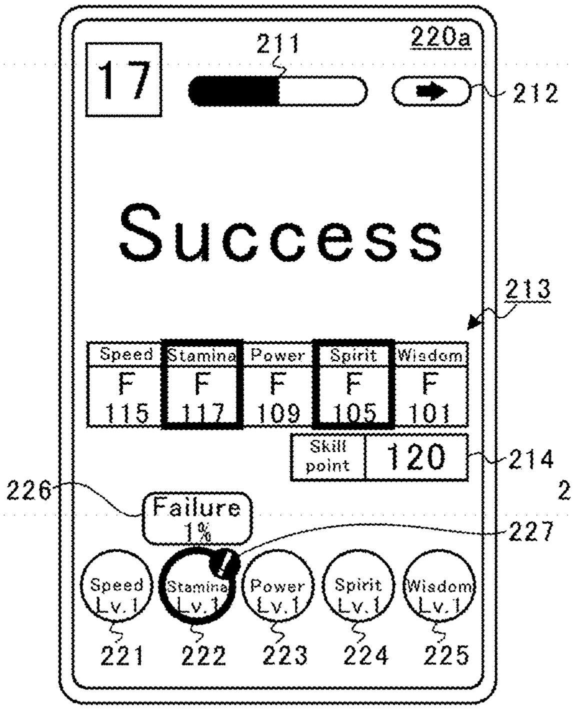
FIG. 16C is an illustration for explaining a training-result report screen.

FIG. 16C is an illustration for explaining a training-result report screen 220*a*. When one of the tentatively selected operating parts 221 to 225 is tapped again, training corresponding to the tapped one of the operating parts 221 to 225 is executed. After the training is executed, the training-result report screen 220*a* reporting a success or failure of the training is displayed on the display 26. Here, the text "Success" is displayed, reporting a success of the training to the player Furthermore, at this time, the ability parameters in the status displaying part 213 are updated and displayed on the basis of the success of training. That is, ability parameters (ability information) of the main character, corresponding to the training item (kind of nurturing) selected by the player, are updated.

Here, the values by which ability parameters are raised in the case of successful training, displayed in the status displaying part 213 in FIG. 16A or FIG. 16B, are added. Furthermore, what is displayed in the physical-energy displaying part 211 is updated in accordance with the training item executed. The physical energy decreases in the case where training for speed, stamina, power, or spirit has been performed and has been successful. Meanwhile, the physical energy is recovered when training for wisdom has been performed and has been successful.

Meanwhile, in the case of a failure in training, a prescribed penalty is assigned. Specifically, the content of the penalty includes a reduction in physical energy, a decrease in the numerical value of an ability parameter, worsening of the character conditions, or the like. Note that, for example, a penalty that is assigned in the case of a high failure rate may be more disadvantageous (e.g., a greater numerical value of reduction in physical energy, a greater numerical value of decrease in an ability parameter, or a greater level of worsening in the character conditions) than a penalty that is assigned in the case of a low failure rate.

Furthermore, the content of the penalty may be determined depending on the training item. For example, the content of the penalty may be such that the value of the speed ability parameter is decreased in the case of a failure in speed training, while the value of the power ability parameter is decreased in the case of a failure in power training. Furthermore, the content of the penalty may be such that no penalty is assigned for some training items (e.g., wisdom) even in the case of a failure in training.

Figure 16D:
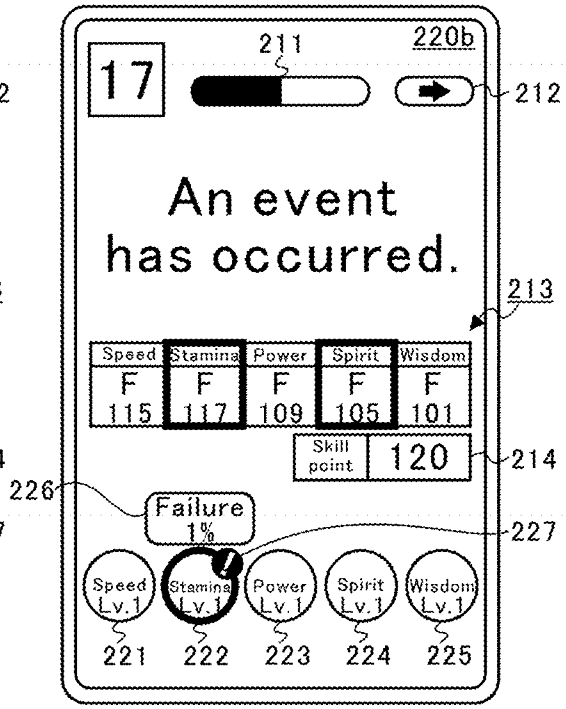
FIG. 16D is an illustration for explaining an event screen.

FIG. 16D is an illustration for explaining an event screen 220*b*. When the displaying of the training-result report screen 220*a* is quit, there are cases where the event screen 220*b* is displayed on the display 26. Various events are executed in the event screen 220*b*. Note that there are cases where a plurality of events occur during a single turn.

For example, in the case where a hint event has occurred, it is possible to obtain a hint for a skill. After obtaining a hint for a skill, the player can acquire the skill by consuming skill points. A plurality of kinds of skills are provided, and a prescribed ability may be invoked for each skill. Each skill has an invocation condition and an effect defined therefor, and the predefined effect is invoked in the case where the invocation condition for each skill is satisfied. There are cases where a skill is invoked during the execution of individual racing or team racing, which will be described later.

Events include events in which skills are acquired, events in which physical energy is recovered, events in which physical energy is decreased, events in which ability parameters are raised, events in which ability parameters are lowered, events in which the character conditions become better, events in which the character conditions become worse, etc. As will be described later, events include events predefined for each turn and events that occur in the case where a prescribed lottery is won. Furthermore, when all events that have occurred are finished, the game screen 210 for the next turn is displayed.

Figure 17A:
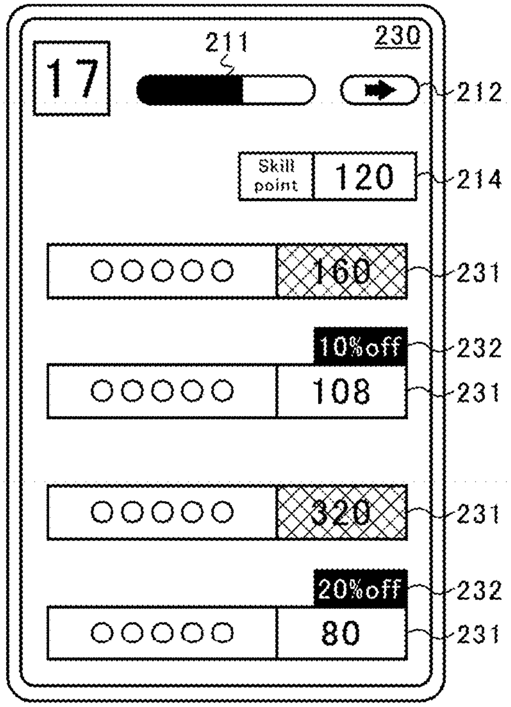
FIG. 17A is a first illustration for explaining a skill screen.
Figure 17B:
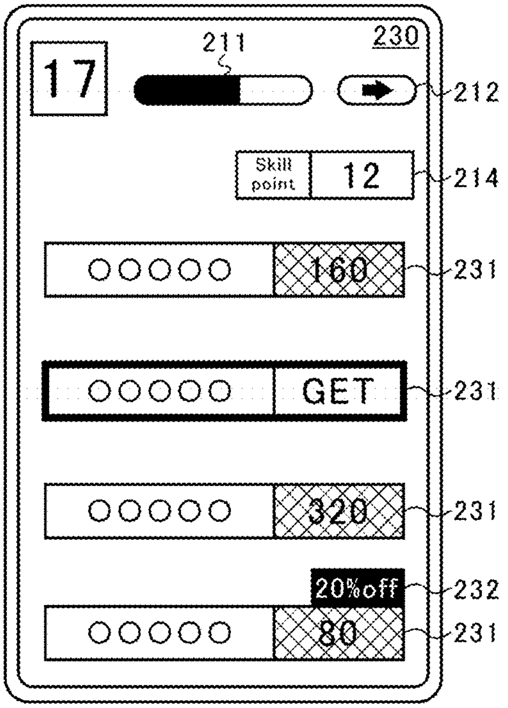
FIG. 17B is a second illustration for explaining the skill screen.

FIG. 17A is a first illustration for explaining a skill screen 230. FIG. 17B is a second illustration for explaining the skill screen 230. When the skill operating part 217 in the game screen 210 is operated, the skill screen 230 shown in FIG. 17A is displayed on the display 26.

In the skill screen 230, a skill display field 231 is displayed. In the skill display field 231, acquired skills, possessed skills set in advance to the main character, possessed skills possessed as the results of the occurrence of various kinds of evets, etc. are displayed. Furthermore, in the case where a hint event has occurred in relation to a possessed skill, skill points to be consumed in order to acquire that possessed skill are discounted. Here, with each possessed skill for which a hint has been acquired, discounted skill points that are needed for the acquisition thereof are displayed. At this time, a discount-rate displaying icon 232 indicating the discount rate is displayed together with the skill display field 231.

Furthermore, with each skill displayed in the skill screen 230, the invocation condition and the effect of invocation of that skill are displayed.

Furthermore, in an upper part of the skill screen 230, the physical-energy displaying part 211, the character-condition displaying part 212, and the skill-point displaying part 214 are displayed. Furthermore, in an upper part of the skill screen 230, the current number of turns is displayed.

When a possessed skill has been acquired by consuming skill points on the basis of a player's operation, as shown in FIG. 17B, "GET" is displayed with the acquired skill, reporting the acquisition of the possessed skill. Furthermore, the consumed skill points are subtracted from the skill points displayed in the skill-point displaying part 214, and what is displayed is updated.

Figure 18A:
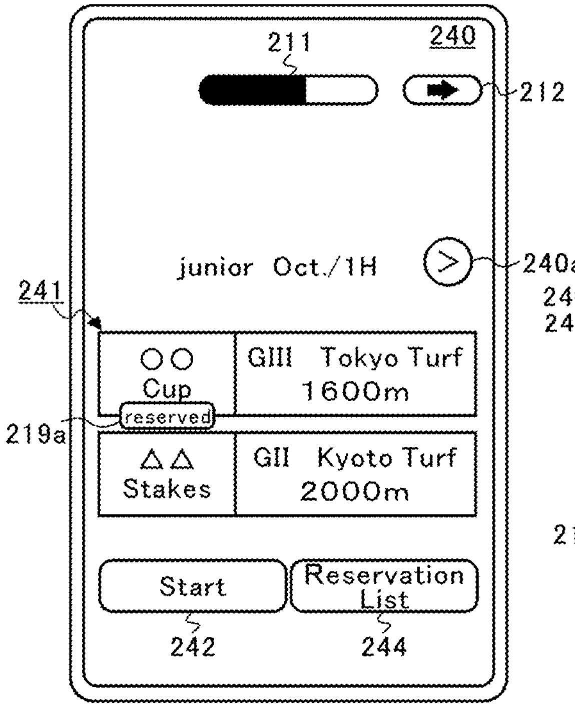
FIG. 18A is a first illustration for explaining an individual-race selection screen.
Figure 18B:
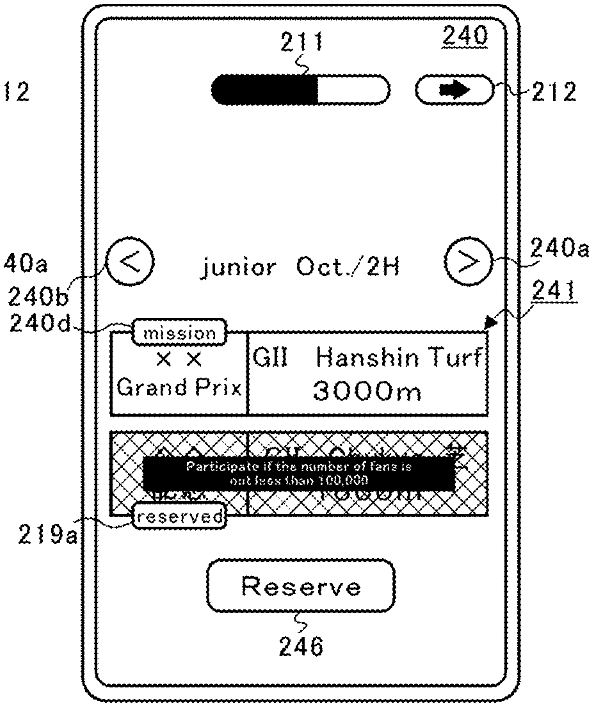
FIG. 18B is a second illustration for explaining the individual-race selection screen.

FIG. 18A is a first illustration for explaining an individual-race selection screen 240. Furthermore, FIG. 18B is a second illustration for explaining the individual-race selection screen 240. When the individual-race operating part 219 in the game screen 210 is operated, the individual-race selection screen 240 shown in FIG. 18A and corresponding to the current number of turns is displayed. Note that, as described earlier, in this embodiment, the period from the 1st turn to the 24th turn is set as a junior class, the period from the 25th turn to the 48th turn is set as a classic class, and the period from the 49th turn to the 72nd turn is set as a senior class. The individual turns correspond to periods defined by dividing one year into 24 parts, like the first half of January, the second half of January, the first half of February, . . . , the first half of December, and the second half of December. Here, as shown in FIG. 18A, the individual-race selection screen 240 corresponding to the junior class and the first half of October is displayed correspondingly to the current number of turns. An individual race is designed such that the main character participates in a race against what are called non-player characters (hereinafter referred to as NPCs).

In an upper part of the individual-race selection screen 240, the physical-energy displaying part 211 and the character-condition displaying part 212 are displayed. Furthermore, in a central part of the individual-race selection screen 240, an individual-race selection operating part 241 for selecting the kind of individual race in which the main character is to participate is displayed. Furthermore, in a lower part of the individual-race selection screen 240, a start operating part 242 labeled as "Start" is displayed. Note that the races that can be selected via the individual-race selection operating part 241 in the individual-race selection screen 240 are set in advance for each turn. Alternatively, a condition for participating in each race may be set in advance, and participation in that race may be allowed in the case where the condition is satisfied. Furthermore, the content of the next purpose or the period before the next purpose (e.g., the number of turns before the next purpose race) in the scenario of the nurturing game being executed may be displayed.

Furthermore, as shown in FIG. 18A, a next-turn operating part 240*a* is displayed in the individual-race selection screen 240. When the next-turn operating part 240*a* in the individual-race selection screen 240 is tapped, as shown in FIG. 18B, the individual-race selection screen 240 corresponding to the next turn is displayed on the display 26.

Furthermore, in the case where the individual-race selection screen 240 corresponding to a turn that is later than the current turn is displayed, as shown in FIG. 18B, a next-turn operating part 240*a* and a previous-turn operating part 240*b* are displayed. When the previous-turn operating part 240*b* in the individual-race selection screen 240 is tapped, the individual-race selection screen 240 corresponding to the turn immediately preceding the turn that has been displayed is displayed on the display 26. For example, in the case where the previous-turn operating part 240*b* is tapped when the individual-race selection screen 240 shown in FIG. 18B, corresponding to the junior class and the second half of October, is tapped, the individual-race selection screen 240 shown in FIG. 18A, corresponding to the junior class and the first half of October (the current turn), is displayed on the display 26.

Note that, as shown in FIG. 18A, in the individual-race selection screen 240, in the case where a preset is registered in the preparation stage process and there is a race reserved on the basis of the preset (reservation selection information) in the corresponding turn, a reservation icon 219*a* labeled as "reserved" is displayed in a manner superimposed on the individual-race selection operating part 241. That is, individual races that can be reserved during the execution of the nurturing game are limited to individual races set in turns that are later than the current turn. In other words, during the execution of the nurturing game, it is not possible to reserve individual races set in the current turn and turns that are earlier than the current turn.

Note that also in the case where there is an individual race reserved for the corresponding turn after the nurturing game is started, a reservation icon 219*a* is displayed similarly.

Furthermore, in the case where there is an individual race set as a period-specific mission, as shown in FIG. 18B, a period-specific-mission icon 240*d* labeled as "mission" is displayed in a manner superimposed on the individual-race selection operating part 241. Furthermore, in the case where there is an individual race set as a purpose race, a purpose icon 219*b* (similar to the one in FIG. 15B) labeled as "purpose" is displayed in a manner superimposed on the individual-race selection operating part 241.

Note that, in this embodiment, it is not possible to reserve an individual race in a turn in which a purpose race has been set. Thus, when a list of individual races in a prescribed turn is displayed, the purpose icon 219*b* and the reservation icon 219*a* are not displayed simultaneously. Note that the arrangement may be such that the period-specific-mission icon 240*d* may be displayed simultaneously with the purpose icon 219*b* or the reservation icon 219*a*.

Furthermore, in this embodiment, a prescribed condition that makes it possible to select each individual race is set in advance. For example, the prescribed condition may be set on the basis of various kinds of parameters in the nurturing game. For example, in the case where the number of fans, which increases or decreases on the basis of the results of individual races, is set as a parameter in the nurturing game, a value of the number of fans not less than a prescribed value may be set as the prescribed condition. At this time, as shown in FIG. 18B, the individual-race selection operating part 241 corresponding to an individual race that does not satisfy the prescribed condition is grayed out, and thus player operations are not accepted.

Note that in the case where there is a reserved individual race in the current turn and the prescribed condition set for the reserved individual race is not satisfied, player operations of the individual-race selection operating part 241 corresponding to the individual race that does not satisfy the prescribed condition are not accepted. In this case, the reservation is deleted, and the reservation selection information is updated. At this time, a popup reporting that the prescribed condition is not satisfied and the reservation has been deleted may be displayed.

Meanwhile, in the case where the individual-race selection screen 240 corresponding to a turn that is later than the current turn is displayed, as shown in FIG. 18B, a reservation operating part 246 labeled as "Reserve" is displayed. Furthermore, in the case where the individual-race selection screen 240 corresponding to a turn that is later than the current turn is displayed, the player can select (tap) one of the individual-race selection operating parts 241 that are displayed and can reserve the race corresponding to the selected individual-race selection operating part 241 by further tapping the reservation operating part 246.

Figure 18C:
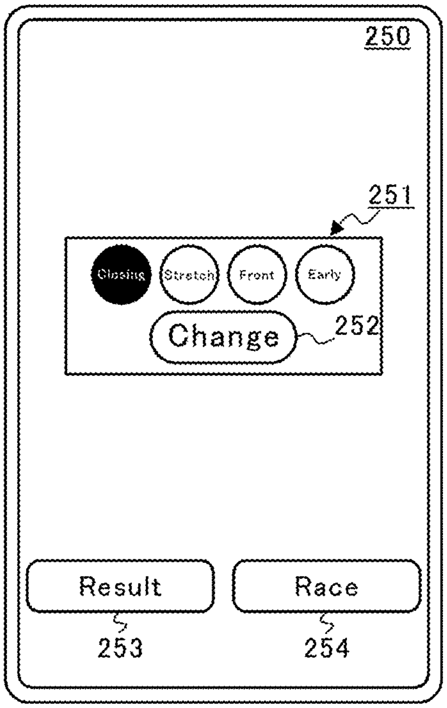
FIG. 18C is an illustration for explaining an individual-race start screen.

FIG. 18C is an illustration for explaining an individual-race start screen 250. When the start operating part 242 is operated in the state where the kind of individual race to participate in has been selected via the individual-race selection operating part 241, the individual-race start screen 250 shown in FIG. 18C is displayed. In a central part of the individual-race start screen 250, a strategy displaying part 251 is displayed. Furthermore, in the strategy displaying part 251, the currently selected strategy (closing, stretch running, front running, or early speed) is displayed in a highlighted manner, and a change operating part 252 labeled as "Change" is displayed. When the change operating part 252 is operated, a strategy changing screen, which is not shown, is displayed on the display 26. The player can change the strategy in the individual race to an arbitrary strategy by performing an operation in the strategy changing screen.

Furthermore, in a lower part of the individual-race start screen 250, a result operating part 253 labeled as "Result" and a race operating part 254 labeled as "Race" are displayed.

In the case where the race operating part 254 has been operated, a race screen, which is not shown, is displayed on the display 26. On the display 26, a video showing the proceeding of the race (hereinafter referred to as a race video) is displayed.

Figure 18D:
FIG. 18D is an illustration for explaining an individual-race result screen.

FIG. 18D is an illustration for explaining an individual-race result screen 255. The individual-race result screen 255 is displayed on the display 26 in the case where the playing of the race video mentioned above has been finished and in the case where the result operating part 253 has been operated. In the individual-race result screen 255, the place in the individual race is displayed.

Furthermore, as shown in FIG. 18A, a reservation-list-screen operating part 244 labeled as "Reservation List" is displayed in the individual-race selection screen 240. When the reservation-list-screen operating part 244 is tapped, a reservation list screen 256 is displayed.

Figure 19A:
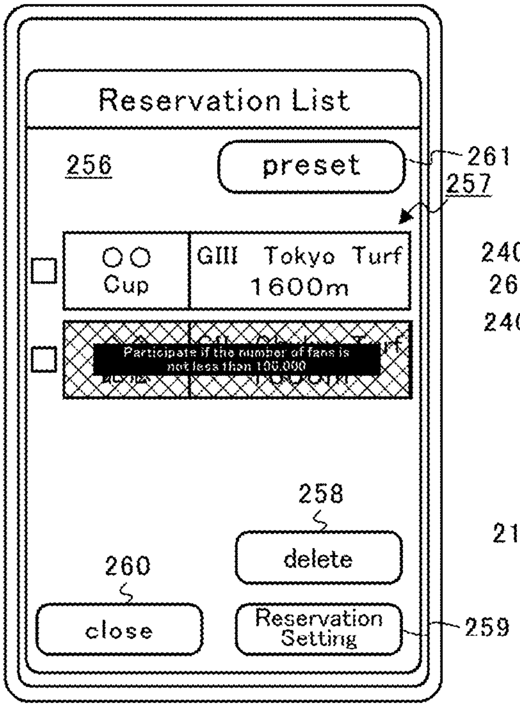
FIG. 19A is an illustration for explaining a reservation list screen.

FIG. 19A is an illustration for explaining the reservation list screen 256. As shown in FIG. 19A, in the reservation list screen 256, reserved-individual-race selection operating parts 257 showing a list of reserved individual races are displayed. In each of the individual reserved-individual-race selection operating parts 257, the name of the corresponding race, the period of the race (the turn in which the race is set), and conditions (the distance, the track, etc.) of the race, etc. may be displayed.

Furthermore, the individual reserved-individual-race selection operating parts 257 are individually provided with checkboxes. The player can select a plurality of reserved-individual-race selection operating parts 257 by selecting (tapping) the individual checkboxes. Furthermore, in the reservation list screen 256, a delete-reservation operating part 258 labeled as "delete" is displayed. Furthermore, the player can delete a reservation for an individual race and can update reservation selection information by tapping the delete-reservation operating part 258 in the state where at least one of the checkboxes is selected. At this time, a popup screen reporting that the reservation for the individual race is deleted may be displayed. Alternatively, the arrangement may be such that it is possible to determine whether or not to cancel a reservation for a race by tapping the corresponding reserved-individual-race selection operating part 257 displayed, without any operation of the delete-reservation operating part 258.

Furthermore, as shown in FIG. 19A, a reservation-editing-screen operating part 259 labeled as "Reservation Setting" is displayed in the individual-race selection screen 240. When the reservation-editing-screen operating part 259 is tapped in the state where one of the checkboxes is selected, a reservation editing screen 262 (FIG. 19B) corresponding to the selected reserved-individual-race selection operating part 257, which will be described later, is displayed on the display 26. Note that the arrangement may be such that the reservation editing screen 262 (FIG. 19B) is displayed even when the reservation-editing-screen operating part 259 is tapped in the state where none of the checkboxes is selected. In this case, the arrangement may be such that the reservation editing screen 262 (FIG. 19B) corresponding to the current turn is displayed.

Furthermore, as shown in FIG. 19A, a close operating part 260 labeled as "close" is displayed in the reservation list screen 256. When the close operating part 260 is tapped, the individual-race selection screen 240 shown in FIG. 18A is displayed on the display 26.

Furthermore, as shown in FIG. 19A, a preset-screen operating part 261 labeled as "preset" is displayed in the reservation list screen 256. When the preset-screen operating part 261 is tapped, a preset screen 270 (FIG. 20A), which will be described later, is displayed on the display 26.

Figure 19B:
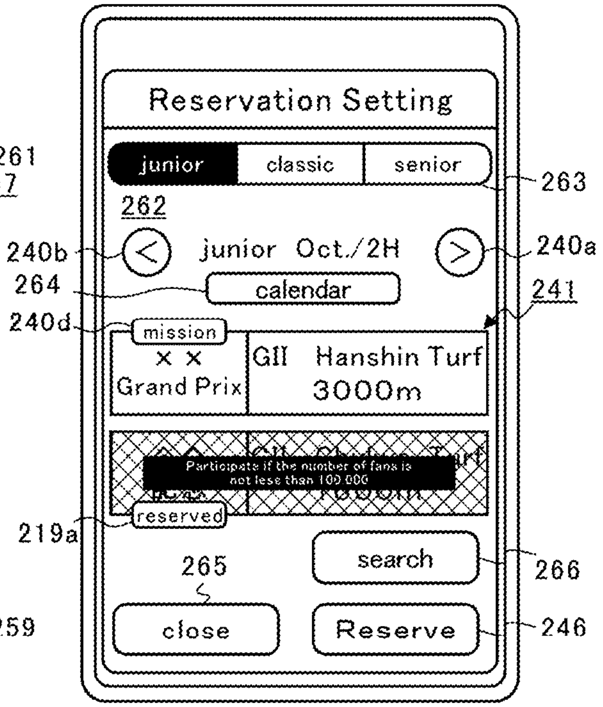
FIG. 19B is an illustration for explaining a reservation editing screen.

FIG. 19B is an illustration for explaining the reservation editing screen 262. As shown in FIG. 19B, in the reservation editing screen 262, similarly to the individual-race selection screen 240 described above, a next-turn operating part 240*a*, a previous-turn operating part 240*b*, a reservation icon 219*a*, a period-specific-mission icon 240*d*, and a reservation operating part 246 are displayed.

Furthermore, a plurality of switching operating parts 263 labeled as "junior", "classic", and "senior" are displayed in the reservation editing screen 262, and when one of the switching operating parts 263 is tapped, the reservation editing screen 262 for the corresponding period is displayed on the display 26. Specifically, when the switching operating part 263 labeled as "junior" is tapped, the reservation editing screen 262 for the junior class period is displayed on the display 26. Meanwhile, when the switching operating part 263 labeled as "classic" is tapped, the reservation editing screen 262 for the classic class period is displayed on the display 26. When the switching operating part 263 labeled as "senior" is tapped, the reservation editing screen 262 for the senior class period is displayed on the display 26.

Furthermore, a calendar-screen operating part 264 is displayed in the reservation editing screen 262. When the calendar-screen operating part 264 is tapped, a calendar screen 267, which will be described later, is displayed on the display 26.

Furthermore, a close operating part 265 labeled as "close" is displayed in the reservation editing screen 262. When the close operating part 265 is tapped, the reservation list screen 256 shown in FIG. 19A is displayed on the display 26.

Furthermore, a search-screen operating part 266 labeled as "search" is displayed in the reservation editing screen 262. When the search-screen operating part 266 is tapped, a search screen, which is not shown, is displayed on the display 26. In the search screen, it is possible to search for individual races. For example, in the search screen, it is possible to narrow down and display individual races depending on the type of individual race, the period that is set, etc. Furthermore, the arrangement may be such that it is possible to narrow down subject individual races that are set as period-specific missions.

Figure 19C:
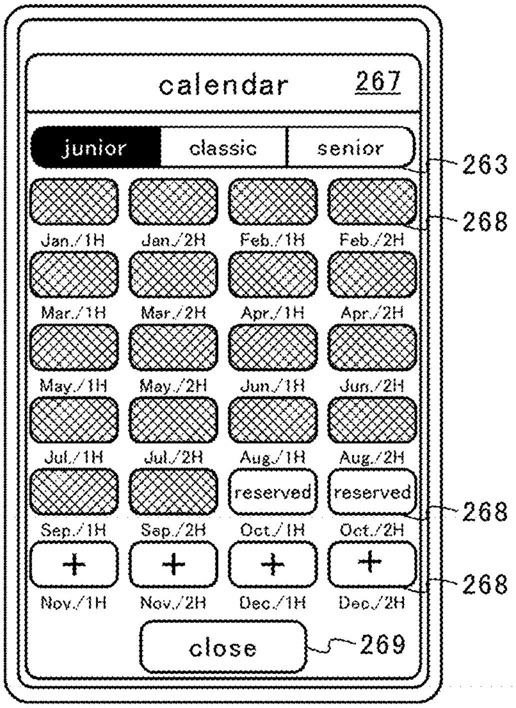
FIG. 19C is an illustration for explaining a calendar screen.

FIG. 19C is an illustration for explaining the calendar screen 267. As shown in FIG. 19C, in the calendar screen 267, similarly to the reservation editing screen 262 shown in FIG. 19B, switching operating parts 263 are displayed. When the switching operating part 263 labeled as "junior" is tapped, the calendar screen 267 for the junior class period is displayed on the display 26. Meanwhile, when the switching operating part 263 labeled as "classic" is tapped, the calendar screen 267 for the classic class period is displayed on the display 26. When the switching operating part 263 labeled as "senior" is tapped, the calendar screen 267 for the senior class period is displayed on the display 26.

Furthermore, in the calendar screen 267, reservation operating parts 268 indicating the status of reservation (the content of reservation selection information) of the individual races in the individual turns in the selected period are displayed. Note that, as shown in FIG. 19C, reservation operating parts 268 corresponding to turns preceding the current turn are grayed out, and player operations are not accepted.

Furthermore, reservation operating parts 268 corresponding to turns in which reservations for individual races are set are labeled as "reserved", which reports that reservations for individual races have been set. Note that the arrangement may be such that an icon that makes it possible for the player to identify the name and type of the corresponding race is displayed in each reservation operating part 268 corresponding to a turn in which a reservation for an individual race has been set or a turn in which a purpose race has been set, which reports the reserved (set) individual race and the purpose race to the player.

Furthermore, each reservation operating part 268 corresponding to a turn in which no reservation for an individual race is set is labeled as "+", which reports that it is possible to reserve an individual race. Note that the arrangement may be such that it is reported that a purpose race has been set in each reservation operating part 268 corresponding to a turn in which a purpose race has been set.

Furthermore, when one of the reservation operating parts 268 corresponding to turns in which reservations for individual races have been set and turns in which purpose races have been set, as well as reservation operating parts 268 labeled as "+", i.e., one of the operable reservation operating parts 268, is tapped, the reservation editing screen 262 for the turn corresponding to the tapped reservation operating part 268 is displayed on the display 26.

Furthermore, a close operating part 269 labeled as "close" is displayed in the calendar screen 267. When the close operating part 269 is tapped, the reservation editing screen 262 shown in FIG. 19B is displayed on the display 26.

Figure 20A:
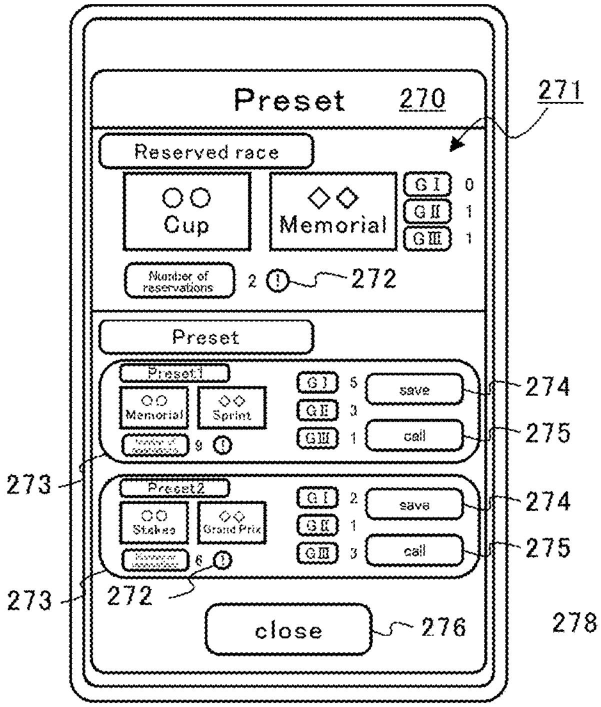
FIG. 20A is an illustration for explaining a preset screen.

FIG. 20A is an illustration for explaining the preset screen 270. As described earlier, when the preset-screen operating part 261 in the reservation list screen 256 in FIG. 19A is tapped, the preset screen 270 is displayed on the display 26. As shown in FIG. 20A, in the preset screen 270, under a heading labeled as "Reserved race", a reserved-individual-race display area 271 is provided, where the content of reserved individual races in the nurturing game is displayed.

In the reserved-individual-race display area 271, the number of individual races reserved in the nurturing game (the number of reservations) is displayed on the basis of the individual races reserved in the nurturing game (reservation selection information). Furthermore, in the reserved-individual-race display area 271, the number of reservations for each type (one of the grades GI, GII, and GIII) of individual races reserved in the nurturing game is displayed on the basis of the individual races reserved in the nurturing game (reservation selection information). Furthermore, in the reserved-individual-race display area 271, preview images (two at most) indicating at least some of the individual races reserved in the nurturing game are displayed on the basis of the individual races reserved in the nurturing game (reservation selection information). Note that the preview images may be set at random from among the individual races reserved in the nurturing game or may be determined on the basis of a predefined order of priority. For example, individual races with higher grades (GI, GII, and GIII) may be preferentially set, and individual races with earlier holding periods (turns that are set) may be preferentially set among those of the same grade.

Furthermore, a list-screen operating part 272 is displayed in the reserved-individual-race display area 271. When the list-screen operating part 272 is tapped, a list screen showing a list of the individual races reserved in the nurturing game (reservation selection information), which is not shown, is displayed on the display 26.

Furthermore, as shown in FIG. 20A, in the preset screen 270, under a heading labeled as "Preset", preset display areas 273 are provided for individual presets that have been set.

In each of the preset display areas 273, on the basis of the individual races (reservation selection information) set in each preset, the number of individual races set in that preset (the number of reservations) is displayed. Furthermore, in each of the preset display areas 273, on the basis of the individual races (reservation selection information) set in each preset, the number of individual races for each type of individual race (one of the grades GI, GII, and GIII) set in each preset is displayed. Furthermore, in each of the preset display areas 273, on the basis of the individual races (reservation selection information) set in each preset, preview images (two at most) indicating at least some of the individual races set in that preset are displayed.

Furthermore, in each of the preset display areas 273, a list-screen operating part 272 is displayed. When the list-screen operating part 272 in each of the preset display areas 273 is tapped, a list screen showing a list of individual races set in the preset corresponding to the tapped preset display area 273, which is not shown, is displayed on the display 26.

Furthermore, in each of the preset display areas 273, an overwrite-save operating part 274 labeled as "save" and a call operating part 275 labeled as "call" are displayed. When the overwrite-save operating part 274 is tapped, a first confirmation screen 277, which will be described later, is displayed on the display 26. Meanwhile, when the call operating part 275 is tapped, a second confirmation screen 280, which will be described later, is displayed on the display 26.

Figure 20B:
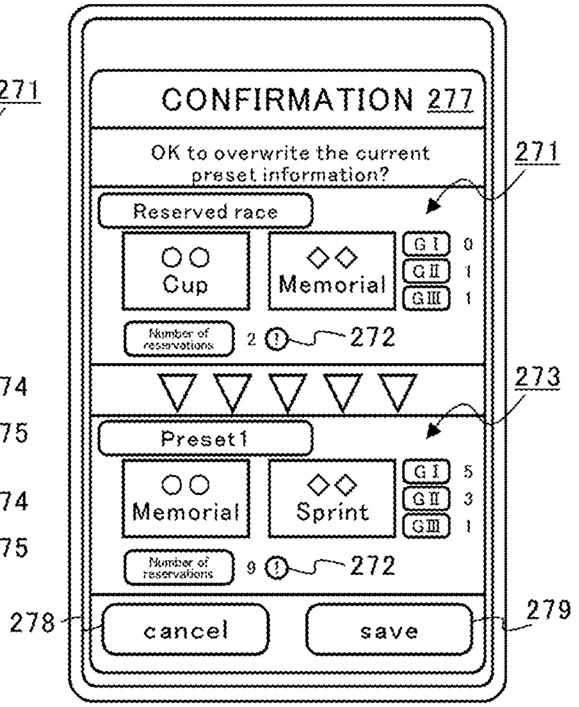
FIG. 20B is an illustration for explaining a first confirmation screen.

FIG. 20B is an illustration for explaining the first confirmation screen 277. As shown in FIG. 20B, in the first confirmation screen 277, an alert is displayed to indicate that the content of a prescribed preset (reservation selection information) will be overwritten and that information concerning the individual races reserved in the nurturing game (reservation selection information) will be saved.

Furthermore, in an upper part of the first confirmation screen 277, similarly to the preset screen 270 in FIG. 20A described above, a reserved-individual-race display area 271 is displayed. Furthermore, a preset display area 273 is displayed under the reserved-individual-race display area 271. Furthermore, images of downward-pointing triangles are displayed between the reserved-individual-race display area 271 and the preset display area 273, which visually reports that the content of a prescribed preset (reservation selection information) will be overwritten and information concerning the individual races reserved in the nurturing game (reservation selection information) will be saved.

Furthermore, a cancel operating part 278 labeled as "cancel" is displayed in the first confirmation screen 277. When the cancel operating part 278 is tapped, the preset screen 270 is displayed on the display 26.

Furthermore, an overwrite-save operating part 279 labeled as "save" is displayed in the first confirmation screen 277. When the overwrite-save operating part 279 is tapped, the content of a prescribed preset (reservation selection information) is overwritten and information concerning the individual races reserved in the nurturing game (reservation selection information) is saved, whereby the content of the prescribed preset (reservation selection information) is updated.

Figure 20C:
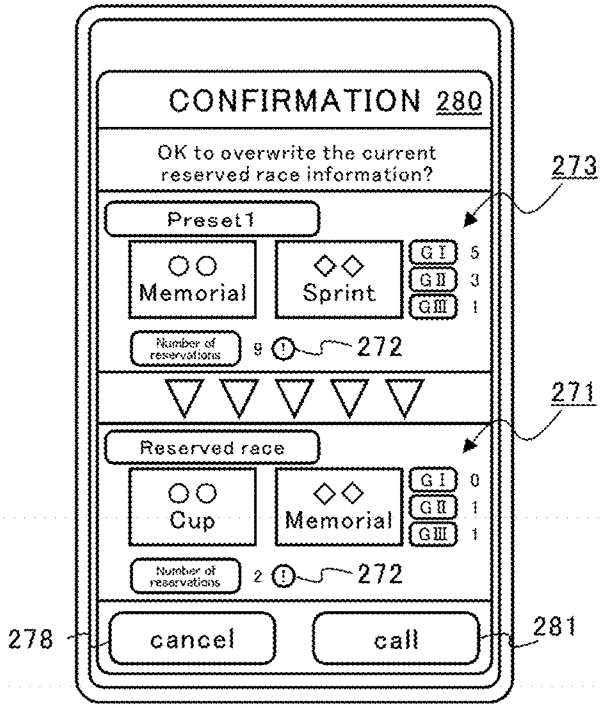
FIG. 20C is an illustration for explaining a second confirmation screen.

FIG. 20C is an illustration for explaining the second confirmation screen 280. As shown in FIG. 20C, in the second confirmation screen 280, the content of a prescribed preset (reservation selection information) is called, and an alert is displayed to indicate that information concerning the individual races reserved in the nurturing game (reservation selection information) will be overwritten and the content of the prescribed preset will be saved.

Furthermore, in an upper part of the second confirmation screen 280, a preset display area 273 is displayed. Furthermore, under the preset display area 273, a reserved-individual-race display area 271 is displayed. Furthermore, images of downward-pointing triangles are displayed between the preset display area 273 and the reserved-individual-race display area 271, which visually reports that the content of a prescribed preset (reservation selection information) is called and that information concerning the individual races reserved in the nurturing game (reservation selection information) will be overwritten and the content of the prescribed preset will be saved.

Furthermore, a cancel operating part 278 labeled as "cancel" is displayed in the second confirmation screen 280. When the cancel operating part 278 is tapped, the preset screen 270 is displayed on the display 26.

Furthermore, a call operating part 281 labeled as "call" is displayed in the second confirmation screen 280. When the call operating part 281 is tapped, the content of a prescribed preset (reservation selection information) is called, and information concerning the individual races reserved in the nurturing game (reservation selection information) is overwritten, and the content of the prescribed preset is saved. Thus, information concerning the individual races reserved in the nurturing game (reservation selection information) is updated. Note that, in this embodiment, during the execution of the nurturing game, it is not possible to reserve individual races set in turns preceding the current turn. Thus, the arrangement may be such that in the case where the content of a prescribed preset (reservation selection information) includes an individual race set in a turn preceding the current turn, a popup is displayed to report that the content (race) set in the called preset has not been reserved. Alternatively, the arrangement may be such that individual races set in turns preceding the current turn are reserved during the execution of the nurturing game. In this case, the arrangement may be such that it is not possible to actually execute the individual races set in turns preceding the current turn in the nurturing game.

As described above, in this embodiment, it is possible to register, as presets, a plurality of items of reservation selection information indicating specific options (individual races) selected by the player from among specific options (individual races) included in a plurality of options (rest, training, skill, going out, and individual race) presented in the nurturing game. Furthermore, it is possible to obtain a registered preset (reservation selection information) in the nurturing game and to identify specific options (individual race) included in the preset (reservation selection information) during a prescribed game on the basis of the preset obtained (reservation selection information). This makes it possible to improve convenience for the player.

Figure 21A:
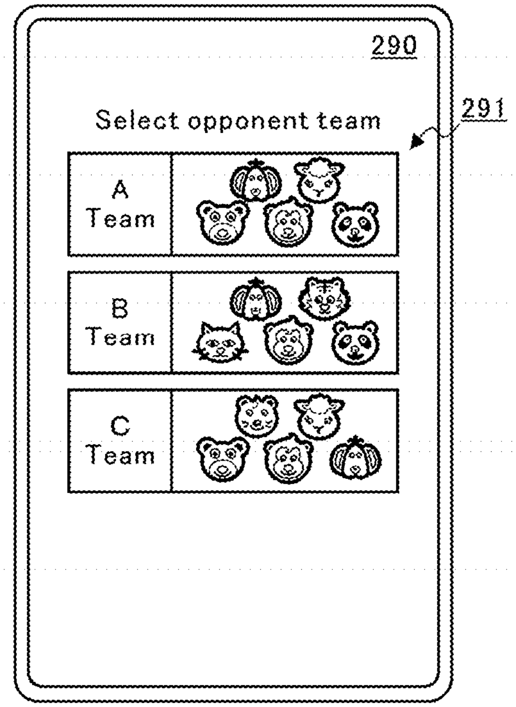
FIG. 21A is an illustration for explaining a team-racing selection screen.

FIG. 21A is an illustration for explaining a team-racing selection screen 290. As mentioned earlier, in this embodiment, when a prescribed turn is finished, team racing is forcibly started. Upon the start of the team racing, the team-racing selection screen 290 shown in FIG. 21A is displayed. In a central part of the team-racing selection screen 290, an opponent-team selection operating part 291 for selecting an opponent of the team racing to participate in is displayed. Note that the opponent may be NPCs. Alternatively, the opponent may be a team of another player, without limitation to NPCs. In this case, a battle is played against the team of the other player while carrying out communication.

Note that it suffices that the characters to participate in team racing can be selected from the team members, and the main character need not necessarily be included. Furthermore, one team member may be allowed to participate in a plurality of races in the team racing.

Figure 21B:
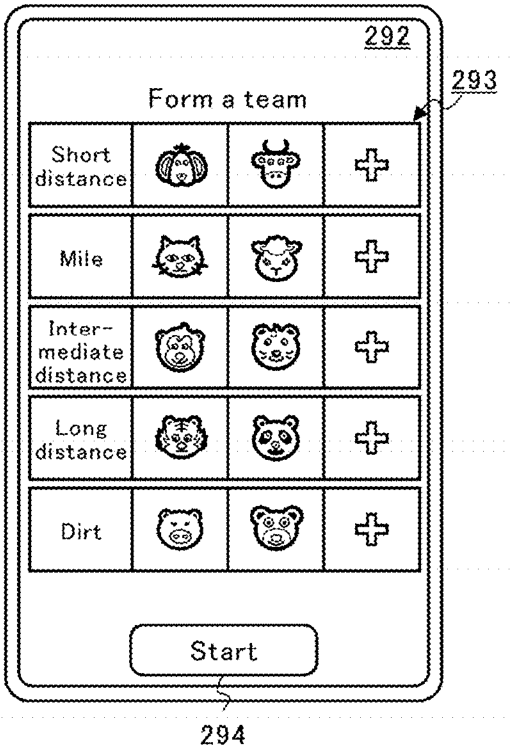
FIG. 21B is an illustration for explaining a team-racing formation screen.

FIG. 21B is an illustration for explaining a team-racing formation screen 292. When the opponent-team selection operating part 291 is operated, the team formation screen 292 is displayed on the display 26. In the team formation screen 292, the team-formation operating part 293 is displayed. By operating the team-formation operating part 293, the player can pick up characters for the team racing by using the characters registered as the team members. In this embodiment, in the team racing, five kinds of races, namely, "short distance", "mile", "intermediate distance", "long distance", and "dirt", are executed. The game is designed such that the total outcome of the team racing is determined on the basis of the outcomes of the individual races.

Specifically, the total outcome of the team racing is determined as a player's victory in the case where the number of races won by the player's team is greater than the number of races won by the opponent's team among the five races. Meanwhile, the total outcome of the team racing is determined as a defeat in the case where the number of races won by the player's team is less than the number of races won by the opponent's team among the five races. Furthermore, the outcome is determined as a draw in the case where the number of races won by the player's team and the number of races won by the opponent's team are the same.

Note that the player can pick up three kinds of characters at most for each race from among the team members. Furthermore, here, it is not permitted to pick up the same kind of character for a plurality of races. Furthermore, in a lower part of the team formation screen 292, a start operating part 294 labeled as "Start" is displayed.

Figure 21C:
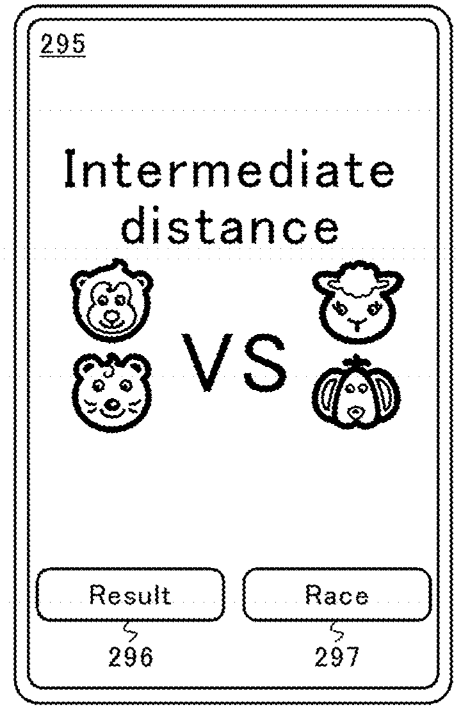
FIG. 21C is an illustration for explaining a team-racing start screen.

FIG. 21C is an illustration for explaining a team-racing start screen 295. When the start operating part 294 in the team formation screen 292 is operated, the team-racing start screen 295 shown in FIG. 21C is displayed. In this embodiment, five races are executed in the team racing, and the order of execution thereof may be a predefined order or may be determined at random.

As shown in FIG. 21C, in a central part of the team-racing start screen 295, the characters in the team formed by the player and the characters in the opponent's team, relating to the race to be executed, are displayed. Shown here is the case where the player has picked up two characters and two opponent's characters have been picked up for the "intermediate distance" race.

Furthermore, as shown in FIG. 21C, in a lower part of the team-racing start screen 295, a result operating part 296 labeled as "Result" and a race operating part 297 labeled as "Race" are displayed. In the case where the race operating part 297 is operated, a race video, which is not shown, is displayed.

Figure 21D:
FIG. 21D is an illustration for explaining a team-racing interim result screen.

FIG. 21D is an illustration for explaining a team-racing interim result screen 300. The team-racing interim result screen 300 is displayed on the display 26 in the case where the playing of the race video mentioned earlier has been finished and in the case where the result operating part 296 in the team-racing start screen 295 has been operated. In the team-racing interim result screen 300, the outcome in the relevant race (the "intermediate distance" race here) is displayed. Note that there is no particular limitation to the method of determining the outcome of each of the five races in the team racing. For example, the outcome may be determined as a victory for the team to which the character that has won the 1st place belongs. Alternatively, points may be awarded for individual places, and the outcome may be determined as a victory for the team that has acquired greatest points.

Furthermore, when the displaying of the team-racing interim result screen 300 in FIG. 21D is quit, the team-racing start screen 295 for the next race (e.g., the "short distance" race) is displayed. Then, similarly to the above, the team-racing start screen 295 and the team-racing interim result screen 300 are displayed sequentially until all the five kinds of races are finished.

FIG. 22 is a first illustration for explaining a team-racing detailed result screen 310. When the team-racing start screen 295 and the team-racing interim result screen 300 for all the five kinds of races have been displayed, as described above, the team-racing detailed result screen 310 is displayed on the display 26. In a central part of the team-racing detailed result screen 310, an outcome displaying part 311 is displayed. In the outcome displaying part 311, the outcomes of the individual races are reported to the player. As shown in FIG. 22A, shown here is the case of three victories and two defeats among the individual races.

Figure 22A:
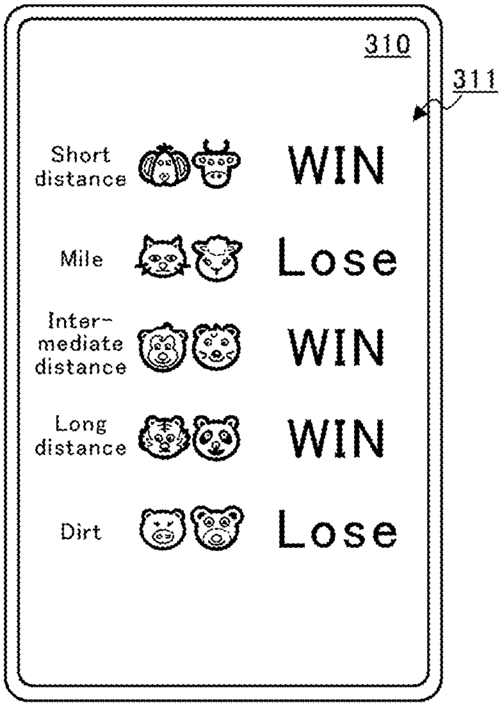
FIG. 22A is a first illustration for explaining a team-racing detailed result screen.
Figure 22B:
FIG. 22B is a first illustration for explaining a team-racing total result screen.

FIG. 22B is a first illustration for explaining a team-racing total result screen 320. When the displaying of the outcome displaying part 311 is quit, the team-racing total result screen 320 is displayed on the display 26. In the team-racing total result screen 320, the total outcome of the team racing is reported to the player. In the case of three victories and two defeats among the individual races, as shown in FIG. 22A, a victory in the team racing is reported in the team-racing total result screen 320.

Furthermore, a team ranking is displayed in the team-racing total result screen 320. In this embodiment, the team ranking changes on the basis of the outcome of the team racing. For example, the team ranking rises in the case of a victory in the team racing.

Furthermore, in the team-racing total result screen 320 reporting a victory in the team racing, a next operating part 321 labeled as "NEXT" is displayed. In the case where the next operating part 321 in the team-racing total result screen 320 has been operated, the game screen 210 for the next turn is displayed.

Figure 22C:
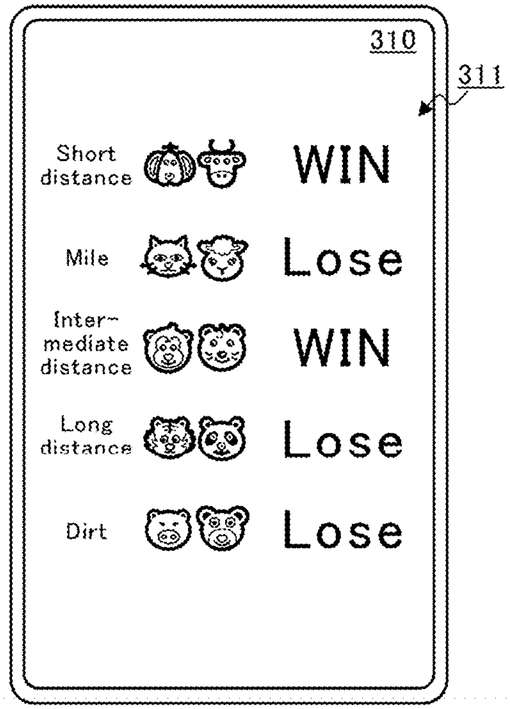
FIG. 22C is a second illustration for explaining the team-racing detailed result screen.
Figure 22D:
FIG. 22D is a second illustration for explaining the team-racing total result screen.

FIG. 22C is a second illustration for explaining the team-racing detailed result screen 310. As shown in FIG. 22C, shown here is the case of two victories and three defeats among the individual races. FIG. 22D is a second illustration for explaining the team-racing total result screen 320. In the case of two victories and three defeats among the individual races, as shown in FIG. 22C, a defeat in the team racing is reported in the team-racing total result screen 320.

Note that the team ranking drops in the case of a defeat in the team racing. Note, however, that the main nurturing game is continued irrespective of the outcome of the team racing, the next turn is started when the next operating part 321 is tapped.

As described above, in the main nurturing game, the team racing is executed every prescribed turns. With a victory in the team racing, a privilege is awarded, such as an increase in an ability parameter of the main character. Furthermore, in the main nurturing game, sub-members are promoted to team members in prescribed turns. Here, a prescribed number of sub-members are promoted to team members in the next turn after the execution of the team racing. As described above, the nurturing game is designed such that the player aims at winning team battles while gradually increasing team members.

Figure 23:
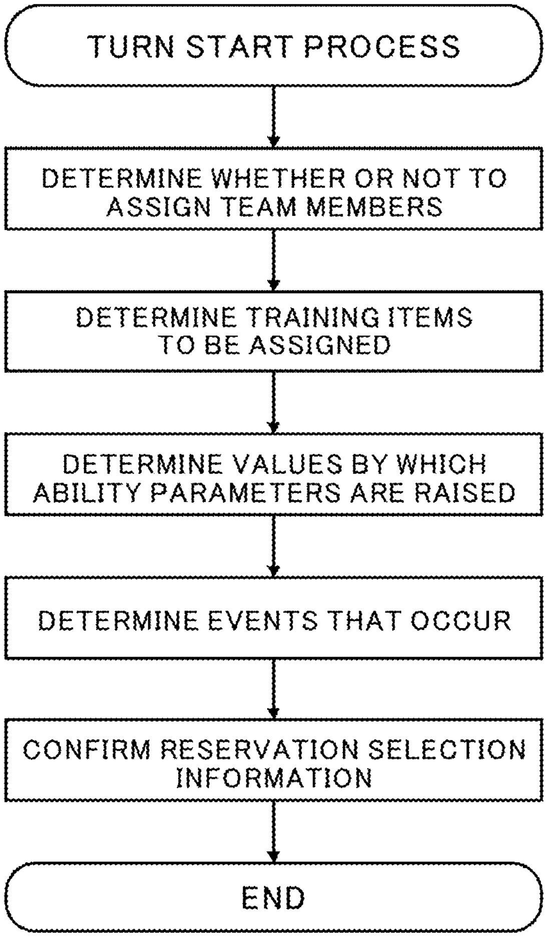
FIG. 23 is a figure for explaining a rough flow of a turn start process.

FIG. 23 is a figure for explaining a rough flow of a turn start process. The nurturing stage process includes the turn start process, which is executed when each turn in the nurturing game is started. While the turn start process will be described later in detail, here, the rough flow of the turn start process will be described.

In the turn start process, as shown in FIG. 23, "processing for determining whether or not to assign team members", "processing for determining training items to which team members are assigned", "processing for determining values by which ability parameters are raised", "processing for determining events that occur", and "processing for confirming reservation selection information" are executed. These kinds of processing will be described below in order.

<Processing for Determining Whether or not to Assign Team Members>

FIG. 24 is a figure for explaining an assign/do-not-assign table. As shown in FIG. 24, in the assign/do-not-assign table, a selection ratio for whether or not to assign a team member ("assign" or "do not assign") is set for each kind of character identification information of a character. In this embodiment, on the basis of the assign/do-not-assign table shown in FIG. 24, for every team member, whether or not to assign that team member is determined with reference to the character identification information table described earlier and shown in FIG. 12 or FIG. 13.

Specifically, as shown in FIG. 24, in this embodiment, for each team member registered as both "support character" and "specific character" as character identification information, "assign" is selected by a probability of 80%. Meanwhile, for each team member registered as "specific character" but not registered as "support character" as character identification information, "assign" is selected by a probability of 60%.

Furthermore, for each team member registered as "support character" but not registered as "specific character" as character identification information, "assign" is selected by a probability of 40%. Meanwhile, for each team member registered neither as "support character" nor as "specific character" as character identification information, "assign" is selected by a probability of 10%.

As described above, team members registered as support characters are more likely to be assigned in training than team members not registered as support characters. Furthermore, team members registered as specific characters are more likely to be assigned in training than team members not registered as specific characters.

<Processing for Determining Training Items to which Team Members are Assigned>

Then, for each of the team members determined to be assigned as described above, it is determined which training item the team member is to be assigned to among "Speed", "Stamina", "Power", "Spirit", and "Wisdom".

There is no particular limitation to the method of determining the training item to which each team member is assigned. For example, a lottery may be performed so that each team member will be assigned to individual training items with equal probabilities. Alternatively, instead of performing a lottery, individual characters may be assigned to training items preset therefor. Alternatively, for example, a lottery may be performed so that each character tends to be assigned to a favorite training of that character (see FIG. 10A). In the case where a lottery is performed, a lottery table defining selection ratios in the lottery may be stored in advance, or a lottery table may be created on each occasion of a lottery.

<Processing for Determining Values by which Ability Parameters are Raised>

FIG. 25A is an illustration for explaining a training level table. As shown in FIG. 25A, training levels are set so as to be raised as the team ranking becomes advanced. Specifically, the individual training levels for "Speed", "Stamina", "Power", "Spirit", and "Wisdom" are set to "level 1" in the case where the team ranking is 100th or lower. Furthermore, the individual training levels are set to "level 2" in the case where the team ranking is 99th or higher and 60th or lower. Furthermore, the individual training levels are set to "level 3" in the case where the team ranking is 59th or higher and 30th or lower. Furthermore, the individual training levels are set to "level 4" in the case where the team ranking is 29th or higher and 10th or lower. Furthermore, the individual training levels are set to "level 5" in the case where the team ranking is 9th or higher.

Note that although this embodiment has been described in the context of the case where training levels are set so as to be raised as the team ranking becomes advanced, there is no limitation thereto. For example, favorite items of training of team members are counted for individual training items, and the training levels may be raised in accordance with the counted values (count values). Note that although it is assumed here the training levels of all the training items are the same in relation to the team ranking, the training levels may differ among the individual training items for the same team ranking.

In this embodiment, in the case where training selected by the player has been executed and has been successful, the values of prescribed ability parameters are raised depending on the training item executed.

Specifically, in this embodiment, in the case where training for "Speed" has been executed and has been successful, the values of "Speed" and "Power" ability parameters are raised.

Meanwhile, in the case where training for "Stamina" has been executed and has been successful, the values of "Stamina" and "Spirit" ability parameters are raised.

Meanwhile, in the case where training for "Power" has been executed and has been successful, the values of "Stamina" and "Power" ability parameters are raised.

Meanwhile, in the case where training for "Spirit" has been executed and has been successful, the values of "Speed", "Power", and "Spirit" ability parameters are raised.

Meanwhile, in the case where training for "Wisdom" has been executed and has been successful, the values of "Speed" and "Wisdom" ability parameters are raised.

In this embodiment, the value of an ability parameter that is raised in the case of successful training is calculated by adding a value obtained by multiplying a fixed raising value by a bonus addition rate to the fixed raising value, where the fixed raising value is determined correspondingly to the executed training item and the training level, and the bonus addition rate will be described later.

FIG. 25B is a figure for explaining a fixed raising value (speed) table. Furthermore, FIG. 25C is a figure for explaining a fixed raising value (power) table. That is, FIG. 25B shows fixed raising values in the case where the training item is "Speed". Furthermore, FIG. 25C shows fixed raising values in the case where the training item is "Power".

As shown in FIGS. 25B and 25C, in the fixed raising-value tables, fixed raising values that are determined correspondingly to the executed training item and the training level are stored. Furthermore, in this embodiment, as shown in FIGS. 25B and 25C, settings are made such that ability parameters are raised by greater values as the training level becomes higher.

Note that although not described here, fixed raising-value tables for the cases where "Stamina", "Spirit", and "Wisdom" are selected as the training item are also provided individually.

Furthermore, in addition to the fixed raising values described above, a bonus addition rate is determined on the basis of the characters assigned to each training item as well as the character identification information table described earlier and shown in FIG. 12 or FIG. 13.

FIG. 25D is a figure for explaining a bonus addition rate table. In this embodiment, a bonus addition rate is determined on the basis of the character identification information of the characters determined to be assigned to each item of training.

Specifically, as shown in FIG. 25D, in the bonus addition rate table, whether or not there is a bonus addition rate, as well as a selection ratio of the addition rate (10% up or 20% up), are set for each kind of character identification information of a character.

In the case where "support character" and "specific character" are registered as character identification information, "none" is selected by a probability of 50%, and "20% up" is selected by a probability of 50%.

Meanwhile, in the case where only "support character" is registered as character identification information, "none" is selected by a probability of 50%, and "10% up" is selected by a probability of 50%.

Meanwhile, in the case where only "specific character" is registered as character identification information, "none" is selected by a probability of 50%, and "10% up" is selected by a probability of 50%.

Meanwhile, in the case neither "support character" nor "specific character" is registered as character identification information, "none" is selected by a probability of 80%, and "10% up" is selected by a probability of 20%.

Furthermore, a value obtained by multiplying the fixed raising value determined on the basis of a fixed raising-value table by a bonus addition rate is derived as a bonus additional value. The value obtained by adding the bonus additional value to the fixed raising value is determined as the amount of raising the value of an ability parameter in the case of successful training. Note that for training to which a plurality of characters are assigned, the individual bonus additional values for the plurality of assigned characters are added to the fixed raising values. As described above, the amounts of raising the ability parameters of the main character in the case of successful training are determined for all the kinds of training.

<Processing for Determining Events that Occur>

FIG. 26 is a figure for explaining the kinds of events and event classes. During the main nurturing game, processing for determining whether or not an event is to occur is performed in each turn. Events are broadly classified into four kinds, namely, scenario events, the exclusive events 162*a* mentioned earlier, support events, and team member events, which are provided for individual main characters. Note that each scenario has predefined therefor a scenario event, an exclusive event 162*a*, a support event, and a team member event that may occur during the main nurturing game.

Scenario events are events set for individual scenarios of the main nurturing game. In this embodiment, a plurality of scenarios are provided, allowing the player to select one of the scenarios. A scenario event occurs for each scenario selected by the player. In other words, a scenario event that occurs in the main nurturing game is determined on the basis of a scenario selected by the player.

Note that scenario-specific events and scenario-common events may be provided among the scenario events. A scenario-specific event is an event associated with only one scenario. For example, a scenario-specific event associated with a first scenario occurs only in the case where the first scenario has been selected, while never occurring in the case where another scenario has been selected.

Meanwhile, a scenario-common event is an event that occurs commonly in a plurality of scenarios. Therefore, a scenario-common event occurs both in the case where the first scenario has been selected and in the case where a second scenario has been selected.

Here, it is assumed that scenario-specific events and scenario-common events are provided as scenario events. Alternatively, however, only either scenario-specific events or scenario-common events may be provided.

The exclusive events 162*a* are events set in advance for individual characters, as mentioned earlier. In the main nurturing game, the exclusive event 162*a* for the character registered by the player as the main character in the setting game, i.e., in the preparation stage process.

Support events are events set in advance for individual support cards, as mentioned earlier. In the main nurturing game, the support events associated with the support cards registered by the player in the setting game occur. Furthermore, apart from the support events associated with registered support cards, for example, support events associated with team members may occur. Note, however, that the probabilities of determining support events associated with support cards registered by the player in the setting game are set to be higher than the probabilities of determining other support events.

Team member events are events that occur in the case where training in which team members are assigned, i.e., joint training, has been executed. Furthermore, team member events may occur in the case where a prescribed condition is satisfied, irrespective of training.

As described above, with a scenario event, whether or not the scenario event occurs, etc. are determined on the basis of a scenario. Furthermore, with the exclusive events 162*a*, support events, and team member events, whether or not the events occur, etc. are determined on the basis of the main character, support cards, and team members. That is, the kinds of events are classified on the basis of information that is referred to when determining whether or not the events occur, etc.

Meanwhile, in this embodiment, each event is classified into one of five event classes depending on what results from the occurrence of that event. Here, each event is classified into one of the following event classes: hint events, ability events, aptitude events, story events, and special training events.

As mentioned earlier, a hint event is an event that makes it possible to possess or acquire a skill. An ability event is an event for raising or lowering an ability parameter of the main character. An aptitude event is an event for raising or lowering an aptitude parameter of the main character. A story event is an event for displaying a story relating to a character that appears in the nurturing game. Note that story events include events in which an ability parameter or an aptitude parameter is changed in addition to displaying a story. A special training event is an event for increasing an ability parameter of a team member.

Here, scenario events include hint events, ability events, aptitude events, and story events. Furthermore, the exclusive events 162*a* and support events include hint events and ability events. Furthermore, team member events include story events and special training events. Note that the relationship between the kinds of events and the event classes shown in FIG. 26 is merely an example. Therefore, for example, the exclusive events 162*a* may include story events or special training events.

FIG. 27 is a figure for explaining the relationship between the kind of event and the number of turns. FIG. 27 shows an example of the case where a prescribed character is registered as the main character in the case where the main nurturing game is executed. Whether or not each event occurs, etc. are determined on the basis of event determination tables provided for individual scenarios.

Here, the event determination tables include event-occurrence determination tables and event-content determination tables. In each event-occurrence determination table, information indicating whether each event is to occur as well as information indicating the probability or the like of the occurrence of the event are associated with each turn. Note that it is assumed here that information indicating whether or not an event is to occur as well as information indicating the probability or the like of the occurrence of the event is specified for every turn per kind of event.

Furthermore, in each event-content determination table, events that are to occur or events that may occur are set in advance for each turn and for each kind of event.

At the start of each turn, the event-occurrence determination table is referred to, and first, whether or not an event is to occur is determined for each kind of event. At this time, depending on the number of turns and the kind of event, there are cases where the "occurrence" of the event is necessarily determined. Furthermore, depending on the number of turns and the kind of event, there are also cases where it is specified that the event is to occur, for example, by a probability of 50%. In this case, a lottery is performed to determine the "occurrence" of the event by a probability of 50%.

Furthermore, for each kind of event with which "occurrence" is determined, the content of the event that is to occur is determined with reference to the event-content determination table. For example, according to the event-occurrence determination table, it is set that a scenario event is to necessarily occur in the 1st turn. Furthermore, each event has an event ID assigned thereto. Furthermore, in the event-content determination table, a scenario event with the event ID=0001 is associated with the 1st turn as an event that may occur. Therefore, in the case where the main nurturing game is played, the scenario event with the event ID=0001 necessarily occurs in the 1st turn.

Similarly, according to the event determination tables (the event-occurrence determination table and the event-content determination table), it is determined that scenario events with the event IDs=0002, 0003, 0004, 0005, and 0006 are to occur in the 4th turn, the 5th turn, the 6th turn, the 7th turn, and the 10th turn, respectively.

Here, the individual events are broadly classified into fixed events and random events. A fixed event is an event with which the turn in which the event occurs is fixed, in other words, an evet that may occur in a prescribed turn and that never occurs in turns other than the prescribed turn. Here, all the scenario events with the event IDs=0001, 0002, 0003, 0004, 0005, and 0006 are fixed events and are scenario-specific events.

Meanwhile, a random event is an event that occurs in the case where it has been determined that an event is to occur and that event has been determined as the event to occur. FIG. 27 shows that, in each turn labeled as "lottery", whether or not an event is to occur is determined through a lottery, and in the case where "occurrence" is determined, an event selected from random events by the lottery occurs.

Note that in the event-content determination table, for each turn in which an event selected through a lottery is to occur, event IDs that are subject to the lottery are set. For example, suppose that random events with the event IDs=0010, 0011, and 0012 are provided as scenario events. Furthermore, suppose that the scenario event with the event ID=0010 is associated with the 12th turn in the event-content determination table.

In this case, a lottery as to whether or not a scenario event is to occur is performed at the start of the 12th turn. Then, in the case where the lottery is won, the scenario event with the event ID=0010 occurs, whereas the scenario event does not occur when the lottery is not won.

Furthermore, suppose, for example, that scenario events with the event IDs=0010, 0011, and 0012 are associated with the 15th turn in the event-content determination table. Furthermore, in the case where a lottery for determining whether or not an event is to occur is won, a scenario event to occur is determined by a lottery from among the events with the event IDs=0010, 0011, and 0012, and the scenario event that has won the lottery occurs.

Note that the description has been given here in the context of the case where fixed events and random events are provided exclusively. However, fixed events may be set in addition to random events or instead of random events as subjects of a lottery in the case where a scenario event that is to occur is determined through the lottery.

Here, in this embodiment, the 4th turn to the 7th turn are set as branch turns. A branch turn refers to a turn in which the content of an event is changed in the case where a prescribed condition is satisfied. Here, as the prescribed condition, the condition that a prescribed number of specific characters are included in the team members, in other words, a prescribed number of specific characters are included among the main character or support characters, is set.

Specifically, in the 4th turn, it is determined whether or not, as a prescribed number, four specific characters are included in the team members. Then, in the case where four specific characters are included in the team members, the scenario event is replaced with a team member event. The team member event includes specific character events provided for individual specific characters. Here, in the case where a specific character is included in the team members, scenario events are replaced with specific character events in a branch turn.

Similarly, in the 5th turn, the 6th turn, and the 7th turn, it is determined whether or not, as a prescribed number, three specific characters, two specific characters, and one specific character, respectively, are included in the team members. Then, in the case where the respective prescribed number of specific characters are included in the team members, scenario events are replaced with specific character events.

Specifically, the scenario events with the event IDs=0002, 0003, 0004, and 0005 are story events. In these story events, stories are played in which the team members consider the team name but the stories are finished without any team name finally being proposed. Therefore, in the case where the specific characters are not included in the team members, no team name is proposed in four consecutive turns.

Meanwhile, in the case where the specific characters are included in the team members, a number of scenario events corresponding to the number of specific characters are replaced with specific character events. The specific character events are story events. In the specific character events, stories are played in which team names are proposed by the specific characters. Four specific characters are provided, and different team names are proposed by the individual specific characters. Therefore, in the case where specific characters are included in the team members, the same number of team names as the number of specific characters are proposed in the 4th turn to the 7th turn.

Furthermore, the scenario event with the event ID=0006, which occurs in the 10th turn, is a story event. In this story event, a story is played in which the player is prompted to select a team name. Here, a total of five kinds of team names are provided, including a preset default name in addition to the four team names individually proposed by the four specific characters.

In the case where no specific character is included in the team members and no team name is proposed in the 4th turn to the 7th turn, the team name that can be selected by the player in the 10th turn is only the default team name. In this case, the player has to select the default team name. As another example, in the case where two team name are proposed in the 4th turn to the 7th turn, the player can select one of a total of three kinds of team names, namely, the two proposed team names and the default team name.

The team name selected by the player in the 10th turn is registered as an official team name, and is subsequently used in various scenes until the main nurturing game comes to an end. Note that a privilege corresponding to the registered team name may be granted to the player at a prescribed timing before the main nurturing game comes to an end. Examples of the privilege that is granted to the player include the acquisition of a skill corresponding to the registered team name, raising an ability parameter or an aptitude parameter, and the acquisition of an in-game currency.

As described above, the scenario events with the event IDs=0002, 0003, 0004, 0005, and 0006 and the specific character events that are replaced in the 4th turn to the 7th turn are both scenario-specific events. Each scenario ID is managed in association with the ID of an event that may occur. Therefore, the scenario events and the specific character events that may occur in the 4th turn to the 7th turn and the 10th turn are associated with only one scenario ID.

Furthermore, according to the event determination tables, the exclusive events 162*a* with the event IDs=1001 and 1002 occur in the 2nd turn and the 8th turn, respectively. Furthermore, according to the event determination tables, whether or not one of the exclusive events 162*a* is to occur as well as the exclusive event 162*a* that is to occur in the 3rd turn to the 7th turn, the 9th turn, the 11th turn, and the 12th turn are determined through lotteries.

Here, the exclusive events 162*a* vary among individual characters. Furthermore, the relationship between the number of turns and the exclusive event 162*a* that is to occur is set for each character. Therefore, the turn in which each exclusive event 162*a* occurs and the exclusive event 162*a* that occurs in each turn vary depending on the character registered as the main character.

Furthermore, in the event determination tables, as shown in FIG. 27, it is set that whether or not a support event is to occur, as well as the content of the support event that is to occur, are determined through lotteries in prescribed turns. Note that also for support events, event IDs that may win lotteries may vary among individual turns or may be the same among all the turns.

The probability of "occurrence" being determined in the lottery for determining whether or not a support event is to occur is not influenced by the registered support card. In other words, the probability of determining that a support event is to occur in each turn is the same irrespective of which support card is registered. Meanwhile, in the case where the "occurrence" of a support event is determined, the content of the support event is determined; at this time, the probability of the content of the support event being determined varies depending on the registered support card.

Specifically, in the case where the "occurrence" of a support card is determined, the event IDs of support events that may occur in the relevant turn are extracted on the basis of the event-content determination table. Then, a lottery table is generated on the basis of the extracted event IDs, and one event ID is determined on the basis of the generated lottery table.

Note that the event IDs that are extracted may include the event IDs of the support events associated with the registered support cards as well as the event IDs of support events not associated with the registered support cards. In this case, in the lottery table, the winning probabilities of the event IDs of the support events associated with the registered support cards are set to be higher than the winning probabilities of the event IDs of the support events not associated with the registered support cards. Accordingly, the support events associated with the registered support cards are more likely to occur than the other support events.

As described above, in each turn, while the probability of occurrence of each support event is not influenced by the registered support card, the content of the support event that occurs is influenced by the registered support card.

Note, however, that the probability itself of the occurrence of each support event or the content (kind) itself of the support event that occurs may be varied depending on the registered support card. That is, the number of events that occur during the main nurturing game or the probabilities of occurrence of events may be varied among the registered support cards.

Furthermore, in each turn, whether or not a team member event is to occur, etc. are determined through a lottery. The team member event determined through a lottery is limited to a special training event.

<Processing for Confirming Reservation Selection Information>

Furthermore, during the nurturing game, at the start of each turn, processing for confirming the content of individual races reserved in the nurturing game (reservation selection information) is executed. Furthermore, on the basis of the content of individual races (reservation selection information) confirmed, the displaying of the reservation icon 219*a* such as the one shown in the game screen 210 in FIG. 15A, described earlier, is managed.

Figure 28A:
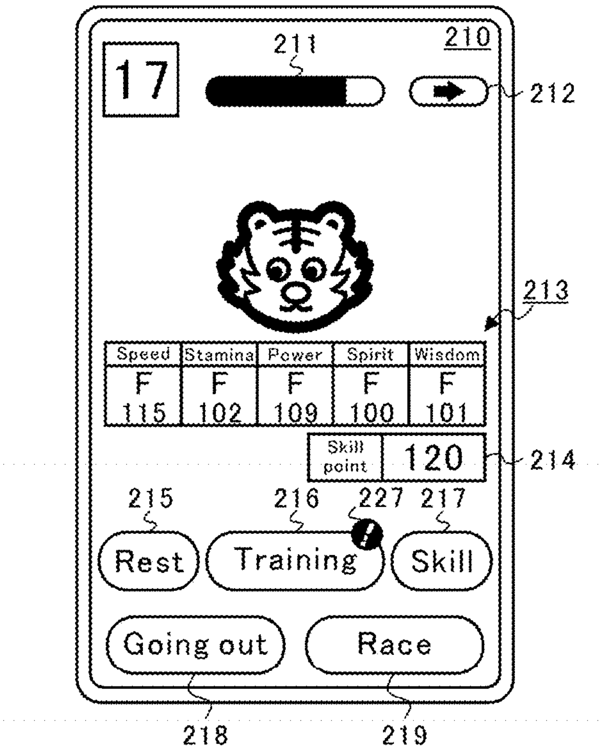
FIG. 28A is a third illustration for explaining the game screen.

FIG. 28A is a third illustration for explaining the game screen 210. FIG. 28A shows the case where a special training event occurs in the relevant turn. In this case, as shown in FIG. 28A, an event-report indication 227 is displayed in the training operating part 216 of the game screen 210.

Figure 28B:
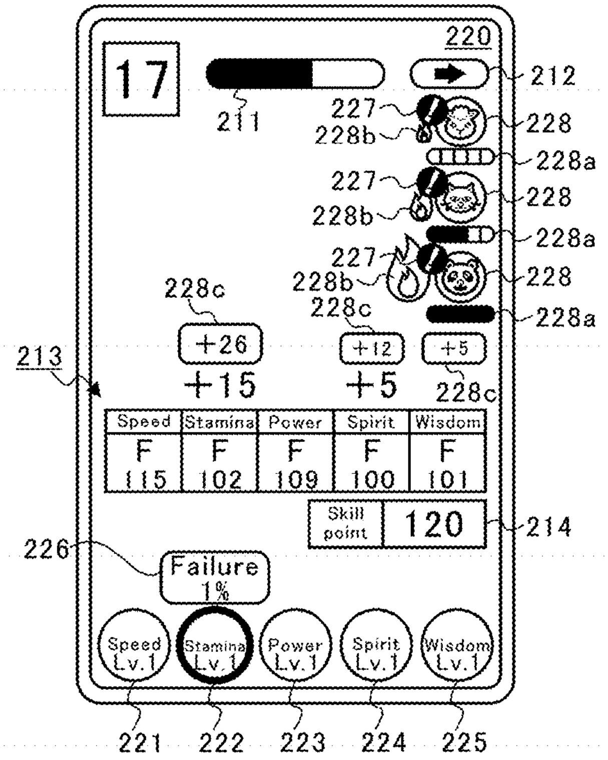
FIG. 28B is a third illustration for explaining the training screen.

FIG. 28B is a third illustration for explaining the training screen 220. When the training operating part 216 in the game screen 210 is operated, the training screen 220 is displayed on the display 26. In the case where a special training event occurs in relation to the character displayed in one of the assigned character icons 228 in the training screen 220, the event-report indication 227 is displayed in the assigned character icon 228 of the corresponding character.

Furthermore, as shown in FIG. 28B, for each of the assigned character icons 228 of characters assigned to training, a bond gauge 228*a* and a special icon 228*b* are displayed. The bond gauge 228*a* indicates a parameter (hereinafter referred to as a bond parameter) that is raised in accordance with the number of times of execution of joint training with the character of the corresponding team member. The bond parameter is initially set to 0, and is raised up to 100 at most. The bond gauge 228*a* visually indicates the value of the bond parameter.

Furthermore, the special icon 228*b* indicates the number of times of execution of the special training event relating to the character of the corresponding team member. As will be described later in detail, the special icon 228*b* is indicated in a display mode corresponding to the number of times of the special training event executed in relation to the character of the assigned character icon 228 for which the special icon 228*b* is displayed.

Figures 29A, 29B, 29C:
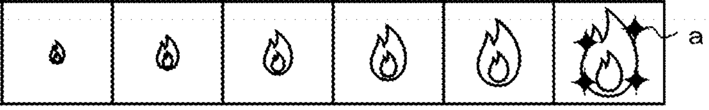
FIG. 29A is a figure for explaining a special-training-event execute/do-not-execute determination table.
FIG. 29B is a figure for explaining a special-icon determination table.
FIG. 29C is a figure for explaining a bonus-icon determination table.

FIG. 29A is a figure for explaining a special-training-event execute/do-not-execute determination table. In the case where it is determined that team members are to be assigned to each training item, on the basis of the special-training-event execute/do-not-execute determination table shown in FIG. 29A, whether or not to execute a special training event is determined through a lottery for each of the team members assigned to each training item. Hereinafter, a team member for whom it is determined that a special training event is to be executed will also be referred to as a team member subject to special training.

Specifically, as shown in FIG. 29A, the probabilities of selection as to whether or not a special training event is to be executed are set on the basis of the values of the bond parameters of the team members subject to special training. Here, the probabilities of selection are set such that the execution of a special training event is more likely to be selected as the value of the bond parameter becomes greater. Note that the same number of special training events as the number of team members who have won lotteries may occur. However, a limit may be set for the number of team members subject to special training that may occur simultaneously for each single training item.

FIG. 29B is a figure for explaining a special-icon determination table. A special training event includes an execution pattern for "success" and an execution pattern for "great success". In the case where a special training event is executed for the fifth time for each team member subject to special training, the special training event is necessarily executed according to the execution pattern for "great success". Meanwhile, in the case where a special training event is executed not for the fifth time for each team member subject to special training, the special training event is necessarily executed according to the execution pattern for "success". That is, for each single team member subject to special training, it is possible to execute a special training event according to the execution pattern for "great success" only once. Note that the event-report indication 227 may be displayed in different modes depending on the content of the special training event executed (the execution pattern for "success" or the execution pattern for "great success") or the number of team members for whom the execution of the special training event has been determined.

As shown in FIG. 29B, in the case where the number of times of execution of a special training event for each team member subject to special training is zero to four, the special icon 228*b* is displayed in a greater size as the number of times of execution of the special training event becomes greater. That is, in the case where the special training event has not yet been executed according to the execution pattern for "great success", the special icon 228*b* is displayed in a greater size as the number of times of execution of the special training event becomes greater.

Whether to execute a special training event according to the execution pattern for either "great success" or "success" may be determined through a lottery. In this case, the lottery probabilities may be set such that the execution pattern for "great success" is more likely to be selected as the number of times of execution of the special training event for a team member subject to special training becomes greater. In this case, since the execution pattern for "great success" is more likely to be selected as the size of the special icon 228*b* becomes larger, the special icon 228*b* indicates the likelihood of the execution pattern for "great success" being selected.

Furthermore, after a special training event is executed according to the execution pattern for "great success", i.e., in the case where the number of times of execution of the special training event for a team member subject to special training is greater than or equal to five, the special icon 228*b* is displayed in a size larger than in the case where the number of times of execution of the special training event for the team member subject to special training is zero to four. Furthermore, as shown in FIG. 29B, a suggestive indication a suggesting that the special training event has been executed according to the execution pattern for "great success" is displayed.

Furthermore, in the case where a special training event occurs and the execution pattern for the special training event is that for "success", the ability parameters of the team members subject to special training, as well as the ability parameters of the main character, are raised within prescribed ranges. Meanwhile, in the case where the execution pattern of the special training event is that for "great success", the ability parameters of the team members subject to special training, as well as the ability parameters of the main character, are raised beyond the abovementioned prescribed ranges.

Furthermore, as shown in FIG. 28B, in the case where it is determined that a special training event is to be executed, in the status displaying part 213 of the training screen 220, bonus icons 228*c* indicating the values by which the ability parameters of the main character are raised through the special training event are displayed.

FIG. 29C is a figure for explaining a bonus-icon determination table. The bonus icons 228*c* are displayed in different sizes depending on the values by which the ability parameters of the main character are raised through the special training event. Here, the bonus icons 228*c* are displayed in a larger size in the case where the values by which the ability parameters of the main character are raised through the special training event are 20 to 39 than in the case where the values are 0 to 19. Furthermore, the bonus icons 228*c* are displayed in a larger size in the case where the values by which the ability parameters of the main character are raised through the special training event are greater than or equal to 40 than in the case where the values are 20 to 39.

FIG. 30A is a figure for explaining a bonus fixed-value (main character) table. In the case where the special training event described above is executed, the values by which the ability parameters of the main character are raised through the special training event (bonus fixed values) are determined in accordance with the number of team members for whom it has been determined that the special training event is to be executed. Here, as shown in FIG. 30A, it is set that the values by which the ability parameters of the main character are raised through the special training event (bonus fixed values) become greater as the number of team members for whom it has been determined that the special training event is to be executed becomes greater.

FIG. 30B is a figure for explaining a bonus additional-value (main character) table. In the case where the special training event is executed according to the execution pattern for “great success”, in addition to the bonus fixed values described above, the values by which the ability parameters of the main character are raised through the special training event according to the execution pattern for “great success” (bonus additional values) are determined. Here, as shown in FIG. 30B, the values by which the ability parameters of the main character are raised (bonus additional values) are set depending on favorite training of the team members for whom the special training event is executed according to the execution pattern for “great success”. That is, the values by which the ability parameters of the main character are raised through the special training event are the sums of the bonus fixed values described above and the bonus additional values.

FIG. 31A is a figure for explaining a fixed raising-value (special training subjects) table. In the case where the special training event described above is executed, the values by which the ability parameters of the team members subject to special training are raised through the special training event (fixed raising values) are determined. Here, as shown in FIG. 31A, the ranges of the values by which the ability parameters of the team members subject to special training (fixed raising values) are set depending on the kind of training executed. Here, values within the ranges set in FIG. 31A (fixed raising values) are determined through lotteries.

FIG. 31B is a figure for explaining a bonus raising-value (special training subjects) table. In the case where the special training event is executed according to the execution pattern for “great success”, in addition to the fixed raising values described above, the values by which the ability parameters of the team members subject to special training are raised through the special training event (bonus raising values) are determined. Here, as shown in FIG. 31B, the values by which the ability parameters of the team members subject to special training are raised (bonus raising values) are set depending on favorite training of the team members subject to special training, for whom the special training event is executed according to the execution pattern for “great success”.

Note that in the case where the special training event is executed according to the execution pattern for “great success”, depending on the number (number of times) of special training events simultaneously executed according to the execution pattern for “great success”, raising events for further raising the ability parameters of the team members subject to special training or the ability parameters of the main character in addition may be executed. For example, the arrangement may be such that as the number (number of times) of special training events simultaneously executed according to the execution pattern for “great success” becomes greater, the values by which the ability parameters of the team members subject to special training or the ability parameters of the main character are further raised in addition become greater.

As described above, when a special training event occurs, the ability parameters of the main character and the team members subject to special training are raised. Note that in the case where the main character or one of the team members subject to special training is a specific character, the fixed raising values or the bonus raising values may be multiplied by a prescribed addition rate. That is, the ability parameters are raised by greater values in the case where the main character or one of the team members subject to special training is a specific character than in the case where the character is not a specific character.

As described above, in the main nurturing game, the player can increase team members as turns proceed. Furthermore, the player can raise the ability parameters of the main character and the team members as the turns proceed. The ability parameters are raised with successful training or the occurrence of various kinds of events. As described earlier, in training, a bonus additional value is added if a specific character is assigned to a training item.

Furthermore, although not described in detail, in the case where the main character or a support character is a specific character, a prescribed bonus additional value is added when an ability event occurs. Therefore, the player can advantageously proceed with the main nurturing game by registering a specific character as the main character or a support character.

Furthermore, in the case where a specific character is included in team members, a specific character event occurs in each branch turn. Therefore, the player can expand options in the game by registering a specific character as the main character or a support character, which makes it possible to improve the fun of the game.

When all the turns are finished in the main nurturing game described above, the nurturing game comes to an end. Meanwhile, in the case of a failure to accomplish a purpose set for each character in the middle of the main nurturing game, the nurturing game comes to an end at that timing.

Here, when the nurturing game comes to an end, the main character nurtured in the nurturing game is stored as a nurtured character. More strictly, information concerning the nurtured character nurtured in the nurturing game (hereinafter referred to as nurtured character information) is stored in association with the player ID. Note that the nurtured character information is stored at both the player terminal 1 and the server 1000. The nurtured character information stored in association with the player ID includes ability parameters, aptitude parameters, acquired skills, inheritance information, etc.

Furthermore, when the nurturing game comes to an end, an evaluation score for the nurtured character that has been nurtured is calculated. Here, the evaluation score is calculated on the basis of the ability parameters, the aptitude parameters, the acquired skills, the records of individual races, the records of team racing, etc. at the end of the nurturing game. Note that the method of calculating the evaluation score, in other words, a formula for calculating the evaluation score, is prepared in advance, and the evaluation score is calculated on the basis of a prescribed formula. Note that there is no particular limitation to the method and formula for calculating the evaluation score. For example, the evaluation score may be calculated on the basis of parameters that affect the race result when the nurtured character participates in a race in the team competition game or other games, such as the ability parameters, the aptitude parameters, and the acquired skills at the end of the nurturing game.

Furthermore, a nurturing rank is set for each nurtured character on the basis of the evaluation score thereof. The nurturing rank is an index indicating the strength of the nurtured character, and each nurturing rank has a range of evaluation scores associated therewith. For example, a nurturing rank "A+" is assigned to a nurtured character with an evaluation score in the range of 13000 to 14499, and a nurturing rank "S" is assigned to a nurtured character with an evaluation score in the range of 14500 to 15499. By assigning nurturing ranks on the basis of evaluation scores, it becomes easy to roughly recognize the strengths of nurtured characters. Note that nurtured character information also includes the evaluation score and the nurturing rank.

Figure 32A:
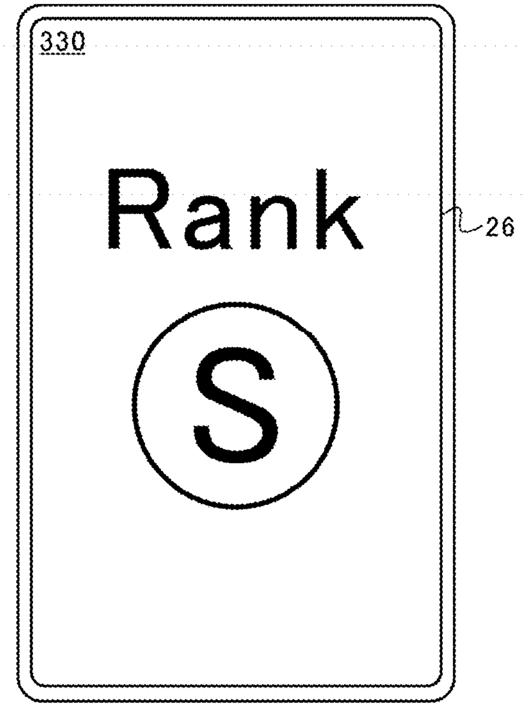
FIG. 32A is an illustration for explaining a nurturing completion screen.
Figure 32B:
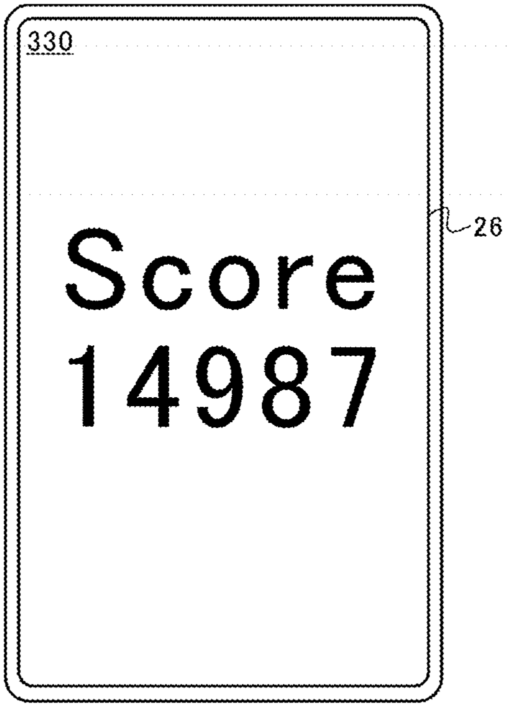
FIG. 32B is a second illustration for explaining the nurturing completion screen.
Figure 32C:
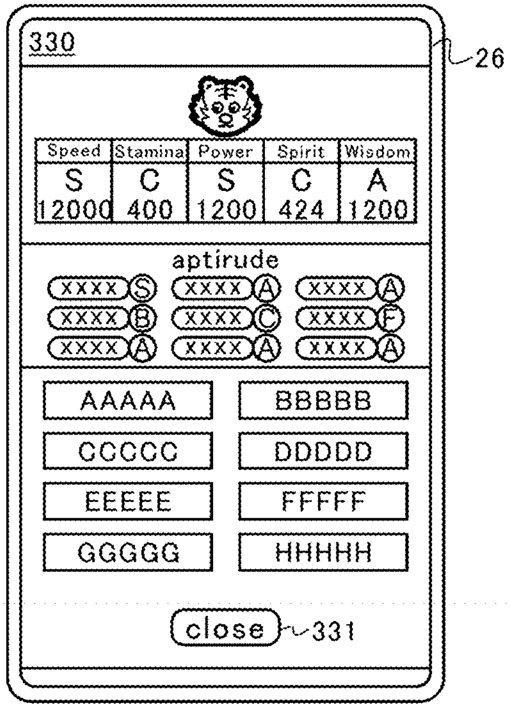
FIG. 32C is a third illustration for explaining the nurturing completion screen.

FIG. 32A is a first illustration for explaining a nurturing completion screen 330. FIG. 32B is a second illustration for explaining the nurturing completion screen 330. FIG. 32C is a third illustration for explaining the nurturing completion screen 330. When the nurturing game comes to an end, as shown in FIG. 32A, the nurturing completion screen 330 is displayed on the display 26. In the nurturing completion screen 330, first, the nurturing rank of the nurtured character that has been nurtured is displayed, and then, the evaluation score thereof is displayed, as shown in FIG. 32B. Furthermore, after the elapse of a prescribed time since the evaluation score is displayed, as shown in FIG. 32C, the ability parameters, the aptitude parameters, and the acquired skills of the nurtured character are displayed in the nurturing completion screen 330. At this time, a close operating part 331 is provided in the nurturing completion screen 330. When the close operating part 331 is tapped, the nurturing completion screen 330 becomes no longer displayed, and the home screen 100 is displayed on the display 26.

Next, the functional configurations of the player terminal 1 and the server 1000 for executing the nurturing game described above will be described, while omitting descriptions of the other configurations.

(Functional Configuration of Player Terminal 1)

Figure 33:
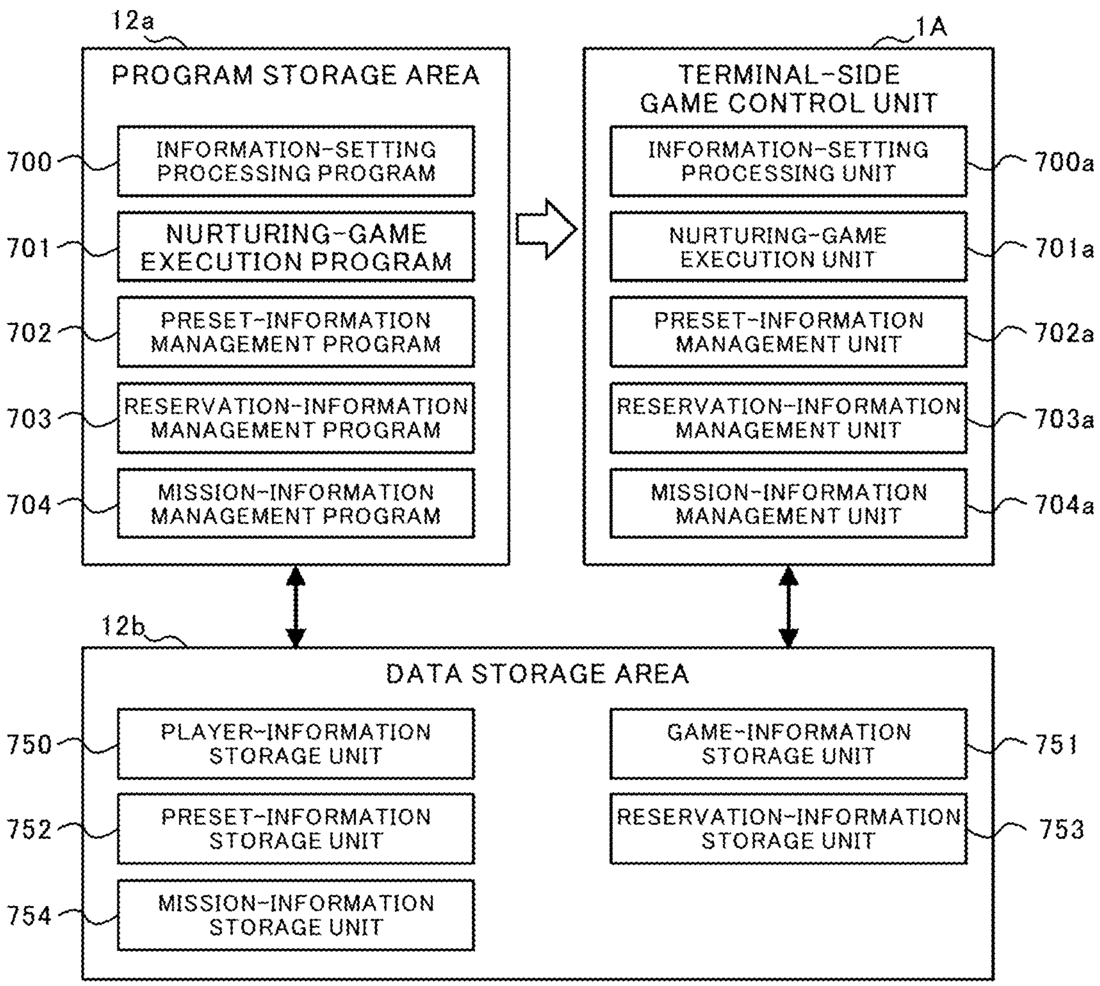
FIG. 33 is a diagram for explaining the configuration of a memory at the player terminal, as well as the functions thereof as a computer.

FIG. 33 is a diagram for explaining the configuration of the memory 12 at the player terminal 1, as well as the functions thereof as a computer. In the memory 12, a program storage area 12*a* and a data storage area 12*b* are provided. Upon the start of the game, the CPU 10 stores terminal-side game control programs (modules) in the program storage area 12*a*.

The terminal-side game control programs include an information-setting processing program 700, a nurturing-game execution program 701, a preset-information management program 702, a reservation-information management program 703, and a mission-information management program 704. Note that the programs listed in FIG. 33 are examples, and the terminal-side game control programs include a large number of other programs.

In the data storage area 12*b*, a player-information storage unit 750, a game-information storage unit 751, a preset-information storage unit 752, a reservation-information storage unit 753, and a mission-information storage unit 754 are provided as storage units for storing data. Note that a large number of other storage units are provided in the data storage area 12*b*. Here, information directly relating to games (hereinafter referred to as game information), such as the nurturing game, is stored in the game-information storage unit 751. Note that various kinds of information are also tentatively stored in the game-information storage unit 751 while each game such as the nurturing game is in progress. Meanwhile, all information other than game information, such as information concerning the player or other players, as well as setting information of the player terminal 1, is considered as player information. The player information is stored in the player-information storage unit 750. Note that the reservation selection information of each preset set by the player is stored in the preset-information storage unit 752. Furthermore, reservation selection information set for the nurturing game being executed is stored in the reservation-information storage unit 753. Furthermore, information concerning various kinds of missions (mission information), including period-specific missions, is stored in the mission-information storage unit 754.

The CPU 10 runs the individual programs stored in the program storage area 12*a* to update the data in the individual storage units in the data storage area 12*b*. Then, by running the individual programs stored in the program storage area 12*a*, the CPU 10 causes the player terminal 1 (computer) to function as a terminal-side game control unit 1A. The terminal-side game control unit 1A includes an information-setting processing unit 700*a*, a nurturing-game execution unit 701*a*, a preset-information management unit 702*a*, a reservation-information management unit 703*a*, and a mission-information management unit 704*a*.

Specifically, the CPU 10 runs the information-setting processing program 700, thereby causing the computer to function as the information-setting processing unit 700*a*. Similarly, the CPU 10 runs the nurturing-game execution program 701, the preset-information management program 702, the reservation-information management program 703, and the mission-information management program 704, thereby causing the computer to function as the nurturing-game execution unit 701*a*, the preset-information management unit 702*a*, the reservation-information management unit 703*a*, and the mission-information management unit 704*a*, respectively.

The information-setting processing unit 700*a* stores information concerning settings in the player-information storage unit 750 as player information in the case where various kinds of information have been set at the player terminal 1. Furthermore, in the case where the information in the player-information storage unit 750 has been updated, the information-setting processing unit 700*a* transmits update information to the server 1000.

The nurturing-game execution unit 701*a* executes all processing relating to the nurturing game.

The preset-information management unit 702*a* obtains the reservation selection information of each preset set by the player from the server 1000 and stores the reservation selection information in the preset-information storage unit 752. Furthermore, in the case where the reservation selection information of each preset has been changed at the player terminal 1, the preset-information management unit 702*a* stores the changed reservation selection information in the preset-information storage unit 752 and transmits the changed reservation selection information to the server 1000.

The reservation-information management unit 703*a* obtains reservation selection information set for the nurturing game being executed from the server 1000 and stores the reservation selection information in the reservation-information storage unit 753. Furthermore, in the case where the reservation selection information set for the nurturing game being executed at the player terminal 1 has been changed, the reservation-information management unit 703*a* transmits the changed reservation selection information to the server 1000. Note that the timing at which the reservation-information management unit 703*a* obtains reservation selection information from the server 1000 may include, for example, the timing at which the nurturing game is started at the player terminal 1. Furthermore, the timing at which the reservation-information management unit 703*a* obtains reservation selection information from the server 1000 may include the timing at which the execution of the nurturing game is resumed after the nurturing game being executed is temporarily suspended at the player terminal 1. Furthermore, the timing at which the reservation-information management unit 703*a* obtains reservation selection information from the server 1000 may include the timing at which the reservation selection information is saved (updated) at the player terminal 1.

The mission-information management unit 704*a* obtains mission information from the server 1000 and stores the mission information in the mission-information storage unit 754.

(Functional Configuration of Server 1000)

Figure 34:
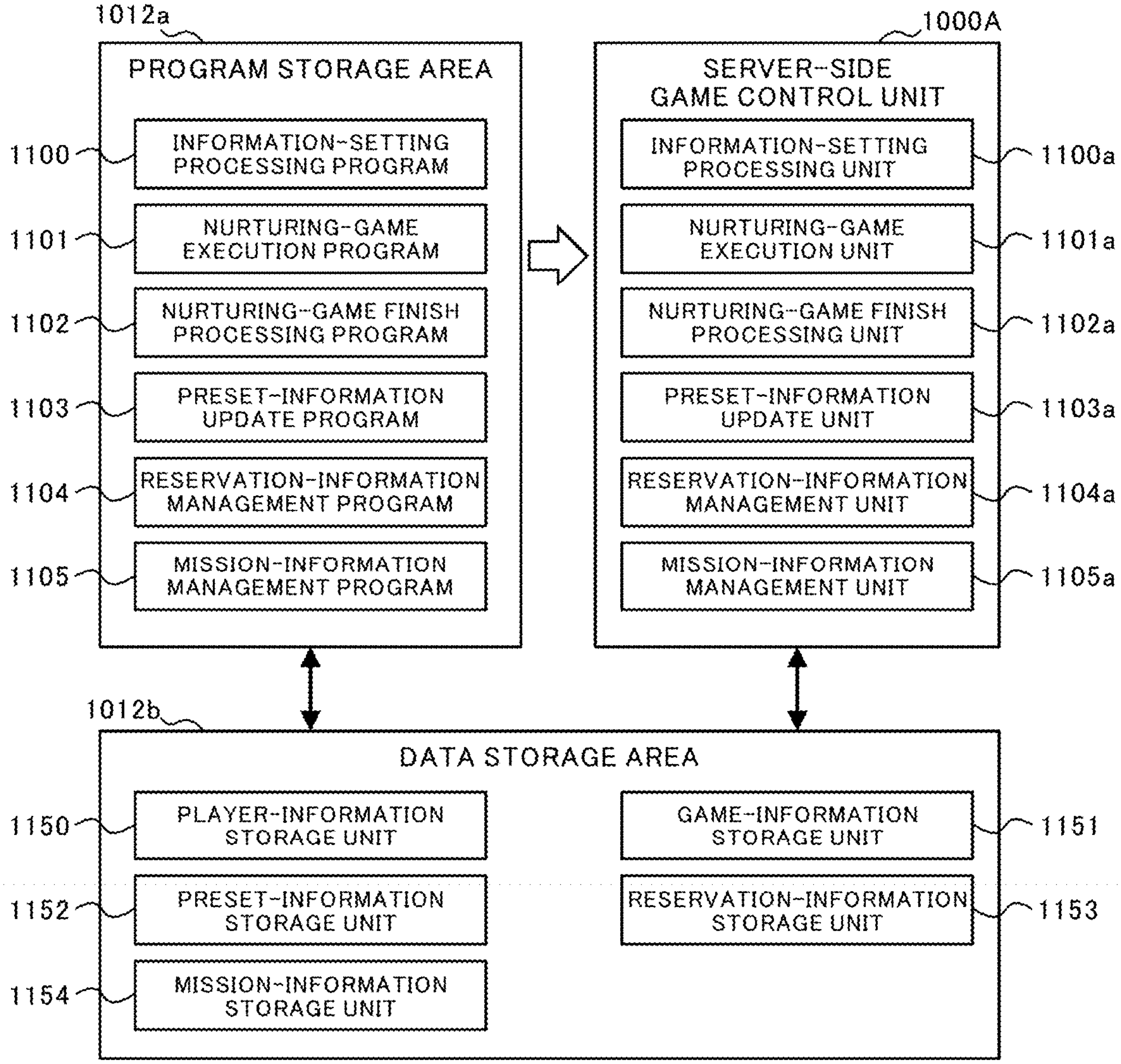
FIG. 34 is a diagram for explaining the configuration of a memory at the server, as well as the functions thereof as a computer.

FIG. 34 is a diagram for explaining the configuration of the memory 1012 at the server 1000, as well as the functions thereof as a computer. In the memory 1012, a program storage area 1012*a* and a data storage area 1012*b* are provided. Upon the start of the game, the CPU 1010 stores server-side game control programs (modules) in the program storage area 1012*a*.

The server-side game control programs include an information-setting processing program 1100, a nurturing-game execution program 1101, a nurturing-game finish processing program 1102, a preset-information management program 1103, a reservation-information management program 1104, and a mission-information management program 1105. Note that the programs listed in FIG. 34 are examples, and the server-side game control programs include a large number of other programs.

In the data storage area 1012*b*, a player-information storage unit 1150, a game-information storage unit 1151, a preset-information storage unit 1152, a reservation-information storage unit 1153, and a mission-information storage unit 1154 are provided as storage units for storing data. Note that a large number of other storage units are provided in the data storage area 1012*b*. Here, the game information of all the players is stored in the game-information storage unit 1151 in association with player IDs. Furthermore, the player information of all the players is stored in the player-information storage unit 1150 in association with player IDs. Note that the reservation selection information of each preset set by the player is stored in the preset-information storage unit 1152. Furthermore, reservation selection information set for the nurturing game being executed is stored in the reservation-information storage unit 1153. Furthermore, information concerning various kinds of missions (mission information), including period-specific missions, is stored in the mission-information storage unit 1154.

The CPU 1010 runs the individual programs stored in the program storage area 1012*a* to update the data in the individual storage units in the data storage area 1012*b*. Then, by running the individual programs stored in the program storage area 1012*a*, the CPU 1010 causes the server 1000 (computer) to function as a server-side game control unit 1000A. The server-side game control unit 1000A includes an information-setting processing unit 1100*a*, a nurturing-game execution unit 1101*a*, a nurturing-game finish processing unit 1102*a*, a preset-information management unit 1103*a*, a reservation-information management unit 1104*a*, and a mission-information management unit 1105*a*.

Specifically, the CPU 1010 runs the information-setting processing program 1100, thereby causing the computer to function as the information-setting processing unit 1100*a*. Similarly, the CPU 1010 runs the nurturing-game execution program 1101, the nurturing-game finish processing program 1102, the preset-information management program 1103, the reservation-information management program 1104, and the mission-information management program 1105, thereby causing the computer to function as the nurturing-game execution unit 1101*a*, the nurturing-game finish processing unit 1102*a*, the preset-information management unit 1103*a*, the reservation-information management unit 1104*a*, and the mission-information management unit 1105*a*, respectively.

In the case where various kinds of information have been set at the player terminal 1, the information-setting processing unit 1100*a* updates the player information in the player-information storage unit 1150 on the basis of update information received from the player terminal 1.

The nurturing-game execution unit 1101*a* executes all processing relating to the nurturing game.

When the nurturing game is finished, the nurturing-game finish processing unit 1102*a* derives an evaluation score, a nurturing rank, etc. for the nurtured character that has been nurtured. Furthermore, the nurturing-game finish processing unit 1102*a* stores nurtured-character information in the game-information storage unit 1151.

The preset-information management unit 1103*a* obtains the reservation selection information of each preset set by the player at the player terminal 1 from the player terminal 1 and stores the reservation selection information in the preset-information storage unit 1152.

The reservation-information management unit 1104*a* obtains reservation selection information set for the nurturing game being executed at the player terminal 1 from the player terminal 1 and stores the reservation selection information in the reservation-information storage unit 1153.

The mission-information management unit 1105*a* stores mission information in the mission-information storage unit 1154.

Note that the information-setting processing unit 700*a* in the player terminal 1 and the information-setting processing unit 1100*a* in the server 1000 are common in that both store player information, but the kinds of specific processing and the range of player information to store therein differ from each other. Furthermore, the nurturing-game execution unit 701*a* in the player terminal 1 and the nurturing-game execution unit 1101*a* in the server 1000 are common in that both execute processing relating to the nurturing game, but these units have different roles, i.e., these units are in charge of different ranges.

The processes that are carried out by the individual units in the player terminal 1 and the server 1000 described above will be described with reference to flowcharts.

(Processes at Player Terminal 1 and Server 1000)

<Processes Relating to Nurturing Game>

Figure 35:
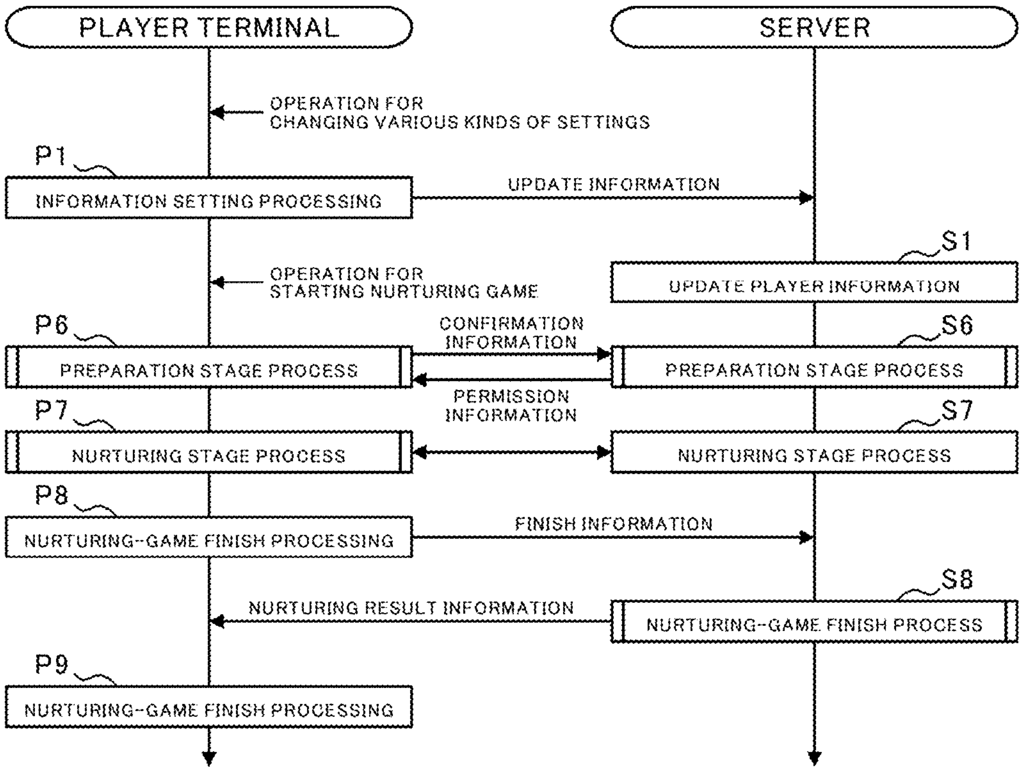
FIG. 35 is a sequence chart for explaining processes at the player terminal and the server, relating to the nurturing game.

FIG. 35 is a sequence chart for explaining processes at the player terminal 1 and the server 1000, relating to the nurturing game. Note that in the following description, processes at the player terminal 1 will be signified by Pn (n is an arbitrary integer). Furthermore, processes at the server 1000 will be signified by Sn (n is an arbitrary integer).

When the player has performed an operation to change various kinds of settings at the player terminal 1, the information-setting processing unit 700*a* of the player terminal 1 performs information setting processing (P1) for updating the player-information storage unit 750 on the basis of the operation input by the player. In the information setting processing, update information is transmitted to the server 1000. At the server 1000, upon receiving the update information, the information-setting processing unit 1100*a* updates the player information in the player-information storage unit 1150 (S1).

Note that the player information that is updated in P1 and S1 includes, for example profile information that can be set by the player. Furthermore, for example, when an operation for adding another player as a friend or unregistering another player who has been a friend is input as a setting changing operation, friend information, which is information concerning friends, is updated.

Furthermore, in the case where presets have been set (registered or edited) as a setting change operation in a preset screen, which is not shown, as described earlier, the preset-information management unit 702*a* stores the changed reservation selection information in the preset-information storage unit 752. Furthermore, the preset-information management unit 702*a* transmits the changed reservation selection information to the server 1000 as update information. At the server 1000, upon receiving the reservation selection information, the preset-information management unit 1103*a* stores the received reservation selection information of the individual presets in the preset-information storage unit 1152 (updates the reservation selection information).

When a nurturing-game start operation for starting the nurturing game is input at the player terminal 1, the nurturing-game execution unit 701*a* executes a preparation stage process (P6). Furthermore, during the preparation stage process, communication processing is carried out between the player terminal 1 and the server 1000. At the server 1000, the nurturing-game execution unit 1101*a* executes preparation stage processing (S6) on the basis of information received from the player terminal 1.

Figure 36:
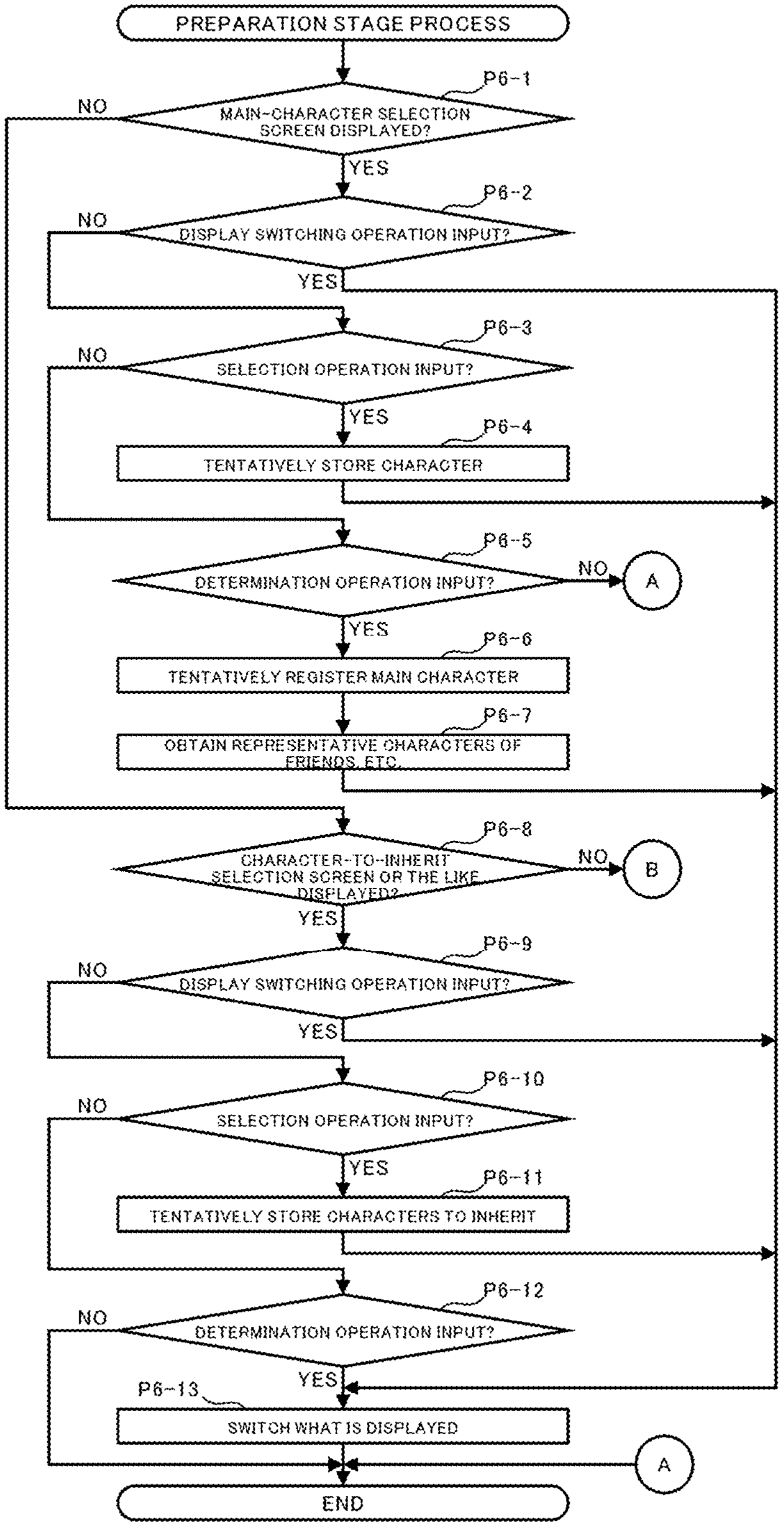
FIG. 36 is a first flowchart for explaining a preparation stage process at the player terminal.
Figure 37:
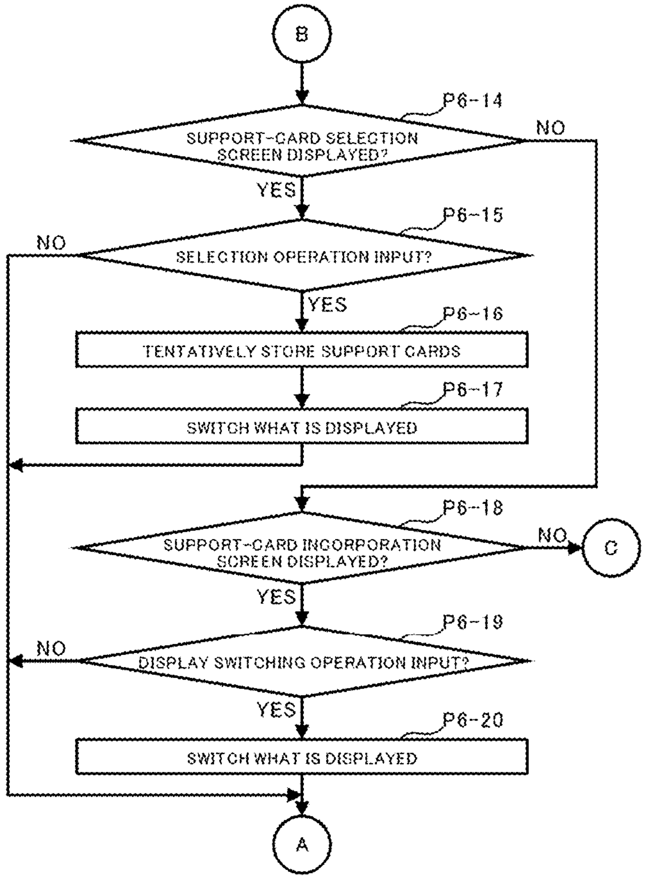
FIG. 37 is a second flowchart for explaining the preparation stage process at the player terminal.
Figure 38:
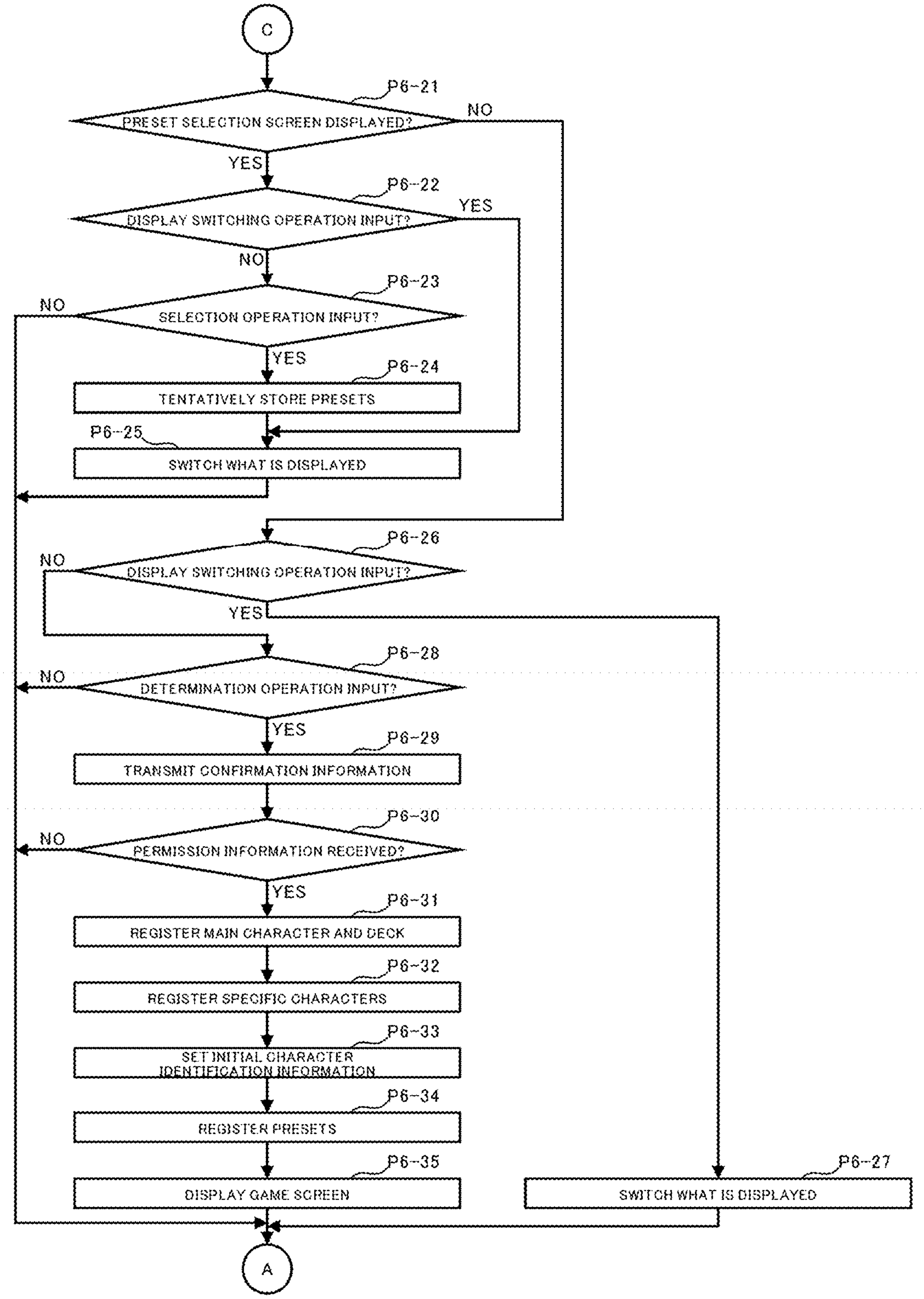
FIG. 38 is a third flowchart for explaining the preparation stage process at the player terminal.

FIG. 36 is a first flowchart for explaining the preparation stage process (P6) at the player terminal 1. FIG. 37 is a second flowchart for explaining the preparation stage process (P6) at the player terminal 1. FIG. 38 is a third flowchart for explaining the preparation stage process (P6) at the player terminal 1. The nurturing-game execution unit 701*a* of the player terminal 1 determines whether or not the main-character selection screen 150 is displayed on the display 26 (P6-1). In the case where the main-character selection screen 150 is displayed (YES in P6-1) and a display switching operation for switching what is displayed on the screen is input (YES in P6-2), the nurturing-game execution unit 701*a* switches the screen displayed on the display 26 (P6-13).

Meanwhile, when a selection operation (tapping of one of the character icons 151) is input in the main-character selection screen 150 (YES in P6-3), the nurturing-game execution unit 701*a* tentatively stores the character corresponding to the character icon 151 via which the selection operation is input (P6-4) and switches the displayed screen (P6-13).

Meanwhile, when a determination operation (tapping of the next operating part 154) is input in the main-character selection screen 150 (YES in P6-5), the nurturing-game execution unit 701*a* tentatively registers the character tentatively stored in P6-4 described above as the main character (P6-6). Furthermore, the nurturing-game execution unit 701*a* obtains information concerning representative characters extracted according to a prescribed extracting condition, such as the representative characters of friends, from the server 1000 (P6-7) and switches the displayed screen (P6-13).

Meanwhile, in the case where the character-to-inherit selection screen 170 or the nurtured-character list screen 180 is displayed (YES in P6-8) and a display switching operation for switching what is displayed on the screen is input (YES in P6-9), the nurturing-game execution unit 701*a* switches the screen displayed on the display 26 (P6-13). Meanwhile, when a selection operation (tapping of one of the nurtured-character icons 182) is input in the nurtured-character list screen 180 (YES in P6-10), the nurturing-game execution unit 701*a* tentatively stores, as a character to inherit, the character corresponding to the nurtured-character icon 182 via which the selection operation is input (P6-11) and switches the displayed screen (P6-13).

Meanwhile, when a determination operation (tapping of the next operating part 154) is input in the character-to-inherit selection screen 170 (YES in P6-12), the nurturing-game execution unit 701*a* displays the support-card incorporation screen 190 on the display 26 (P6-13).

Meanwhile, in the case where the support-card selection screen 200 is displayed (YES in P6-14 in FIG. 37) and a selection operation (tapping of one of the card icons 201 of support cards) is input in the support-card selection screen 200 (YES in P6-15), the nurturing-game execution unit 701*a* tentatively stores the support card corresponding to the card icon 201 via which the selection operation is input (P6-16) and switches the displayed screen (P6-17).

Meanwhile, in the case where the support-card incorporation screen 190 is displayed (YES in P6-18) and a display switching operation for switching what is displayed on the screen is input (YES in P6-19), the nurturing-game execution unit 701*a* switches the screen displayed on the display 26 (P6-20).

Meanwhile, in the case where the preset selection screen 197 is displayed (YES in P6-21 in FIG. 38) and a display switching operation for switching what is displayed on the screen is input (YES in P6-22), the nurturing-game execution unit 701*a* switches the screen displayed on the display 26 (P6-25).

Meanwhile, in the case where a selection operation (tapping of the select operating part 197*c*) is input in the preset selection screen 197 (YES in P6-23), the reservation selection information corresponding to the preset for which the selection operation is input is tentatively stored (P6-24), and the displayed screen is switched (P6-25).

Meanwhile, in the case where the final confirmation screen 195 is displayed (NO in P6-21) and a display switching operation for switching what is displayed on the screen is input (YES in P6-26), the nurturing-game execution unit 701*a* switches the screen displayed on the display 26 (P6-27).

Meanwhile, in the case where a determination operation (tapping of the start operating part 195*b*) is input in the final confirmation screen 195 (YES in P6-28), the nurturing-game execution unit 701*a* transmits confirmation information to the server 1000 (P6-29). The confirmation information includes information for identifying the tentatively registered main character, characters to inherit, and support cards. At the server 1000, upon receiving the confirmation information, in the preparation stage process (S6), it is determined whether or not to permit the execution of the main nurturing game using the tentatively registered main character, characters to inherit, and support cards.

At the player terminal 1, upon receiving permission information (YES in P6-30) after transmitting confirmation information (P6-29), the nurturing-game execution unit 701*a* registers the main character tentatively registered in P6-6 described above (P6-31). Furthermore, the nurturing-game execution unit 701*a* registers the nurtured characters tentatively stored as characters to inherit in P6-11 described above and the support cards tentatively registered in P6-16 described above in the deck.

Furthermore, the nurturing-game execution unit 701*a* registers the character IDs of the characters set as specific characters on the basis of specific character information (P6-32).

Furthermore, the nurturing-game execution unit 701*a* sets initial character identification information (P6-33).

Furthermore, the reservation-information management unit 703*a* stores the reservation selection information of presets, tentatively stored in P6-24 described above, in the reservation-information storage unit 753 (P6-34). Furthermore, the nurturing-game execution unit 701*a* displays the game screen 210 on the display 26 (P6-35).

Figure 39:
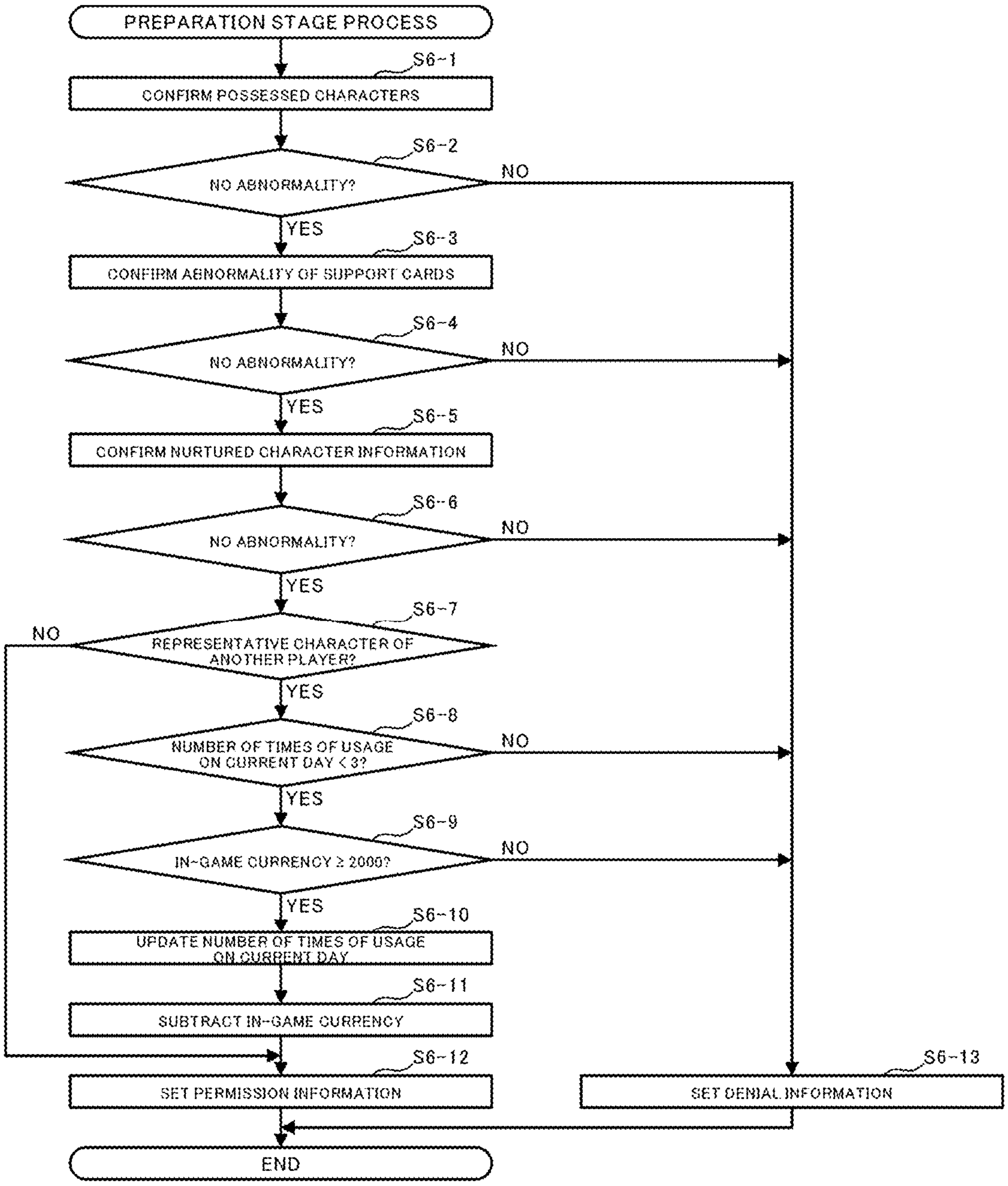
FIG. 39 is a flowchart for explaining a preparation stage process at the server.

FIG. 39 is a flowchart for explaining a preparation stage process (S6) at the server 1000. Upon receiving confirmation information, the nurturing-game execution unit 1101*a* confirms the characters possessed by the player, stored in the player-information storage unit 1150 (S6-1). The nurturing-game execution unit 1101*a* determines that there is no abnormality if the main character selected by the player is included in the possessed characters (S6-2).

If there is no abnormality concerning the main character selected by the player (YES in S6-2), the nurturing-game execution unit 1101*a* confirms whether or not there is no abnormality in the support cards selected by the player (S6-3). Note that in S6-3, it is determined that there is an abnormality in the case where a support card not possessed by the player is selected. Furthermore, in S6-3, it is determined that there is an abnormality in the case where a rental card selected by the player is not associated with the player ID of the player. Furthermore, in S6-3, it is determined that there is an abnormality in the case where, for example, a support character is the same as the main character.

If there is no abnormality in the support cards selected by the player (YES in S6-4), the nurturing-game execution unit 1101*a* confirms the nurtured character information stored in the game-information storage unit 1151 (S6-5). Furthermore, in the case where the nurtured characters selected by the player as characters to inherit are associated with the player ID of the player, the nurturing-game execution unit 1101*a* determines that there is no abnormality in the character to inherit (YES in S6-6). That is, it is determined that there is no abnormality in the characters to inherit in the case where nurtured characters nurtured by the player himself or herself are selected as characters to inherit (YES in S6-6).

In the case where it is determined that there is no abnormality in the characters to inherit, the nurturing-game execution unit 1101*a* determines whether or not the representative character of another player is included in the nurtured characters selected by the player as characters to inherit (S6-7). In the case where the representative character of another player is included (YES in S6-7), the nurturing-game execution unit 1101*a* determines whether or not the number of times of usage on the current day is less than three (S6-8).

In the case where the number of times of usage on the current day is less than three (YES in S6-8), the nurturing-game execution unit 1101*a* determines whether or not the amount of a prescribed in-game currency possessed by the player is greater than or equal to 2000 (S6-9). That is, in S6-8 and S6-9, whether or not incorporation conditions are satisfied are determined. In the case where the player possesses an amount of the in-game currency greater than or equal to 2000 (YES in S6-9), the nurturing-game execution unit 1101*a* adds "1" to the number of times of usage on the current day (S6-10). Furthermore, the nurturing-game execution unit 1101*a* subtracts 2000 from the possessed amount of the prescribed in-game currency, stored in the player-information storage unit 1150 (S6-11).

In the case where there is no abnormality in the main character, the characters to inherit, and the support cards and the incorporation conditions for using the representative character of another player are satisfied, the nurturing-game execution unit 1101*a* sets permission information (S6-12) and causes the player terminal 1 to receive the permission information. Meanwhile, in the case where there is an abnormality in the main character, the characters to inherit, or the support cards, the nurturing-game execution unit 1101*a* sets denial information (S6-13) and causes the player terminal 1 to receive the denial information. Alternatively, in the case where the incorporation conditions for using the representative character of another player are not satisfied, the nurturing-game execution unit 1101*a* sets denial information (S6-13) and causes the player terminal 1 to receive the denial information.

Referring back to FIG. 35, when the preparation stage process (P6) is finished, the nurturing-game execution unit 701*a* executes the nurturing stage process (P7). Furthermore, during the nurturing stage process, communication processing is carried out between the player terminal 1 and the server 1000. At the server 1000, the nurturing-game execution unit 1101*a* executes nurturing stage processing (S7) on the basis of information received from the player terminal 1. Note that actually, the player terminal 1 and the server 1000 share roles such that the main nurturing game proceeds through the nurturing stage process (P7) at the player terminal 1 and the nurturing stage processing (S7) at the server 1000. Note, however, that in order to facilitate understanding, the description will be given here while assuming that all the processing is carried out in the nurturing stage process (P7) at the player terminal 1. However, some or all of the individual processing steps in the nurturing stage process (P7), which will be described later, may be carried out in the nurturing stage processing (S7) at the server 1000.

Figure 40:
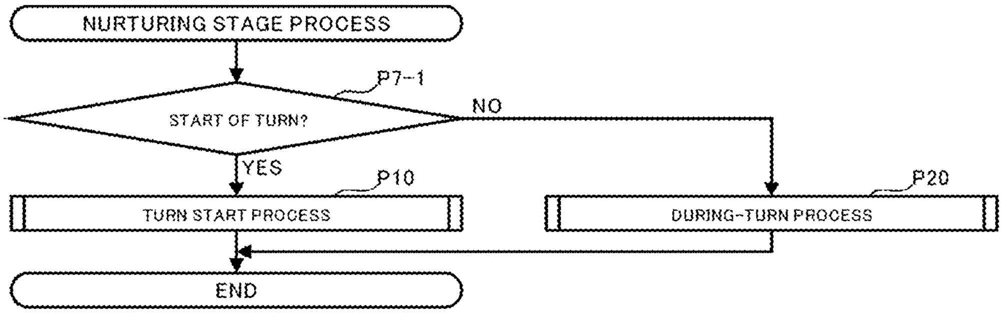
FIG. 40 is a flowchart for explaining a nurturing stage process at the player terminal.

FIG. 40 is a flowchart for explaining the nurturing stage process at the player terminal 1. The nurturing-game execution unit 701*a* of the player terminal 1 executes a turn start process (P10) when the current timing is the start of a turn (YES in P7-1), while executing a during-turn process (P20) when the current timing is not the start of a turn.

Figure 41:
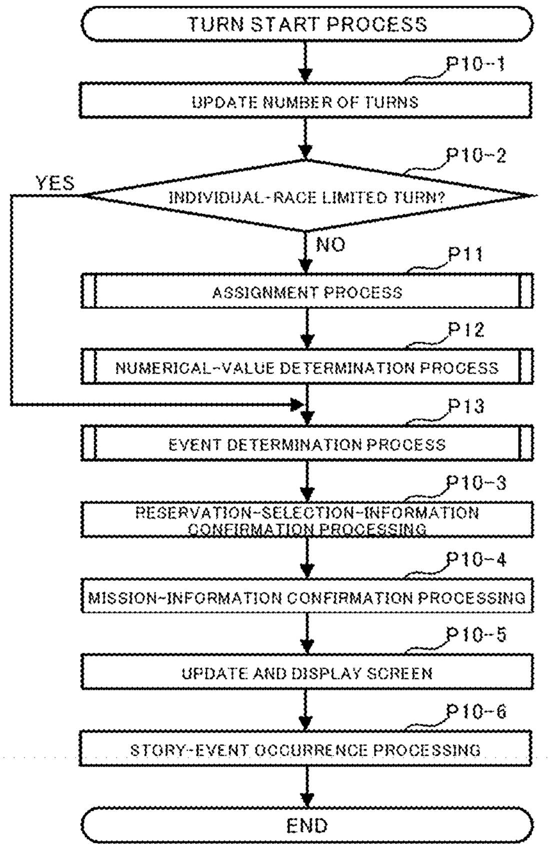
FIG. 41 is a flowchart for explaining a turn start process at the player terminal.

FIG. 41 is a flowchart for explaining the turn start process at the player terminal 1. The nurturing-game execution unit 701*a* updates the current number of turns stored in the game-information storage unit 751 (P10-1). Furthermore, the nurturing-game execution unit 701*a* refers to the selection item table (FIG. 14) stored in the data storage area 12*b* to determine whether or not the current turn is a turn in which only an individual race, i.e., only the individual-race operating part 219, can be selected (an individual-race limited turn) (P10-2). In the case where the current turn is not an individual-race limited turn (NO in P10-2), an assignment process (P11), a numerical-value determination process (P12), and an event determination process (P13) are performed in order. In the case where the current turn is an individual-race limited turn (YES in P10-2), the assignment process (P11) and the numerical-value determination process (P12) are not performed, and the event-determination process (P13) is performed.

Note that it is assumed here that the assignment process (P11), the numerical-value determination process (P12), and the event determination process (P13) are executed only at the player terminal 1. Alternatively, some or all of the assignment process (P11), the numerical-value determination process (P12), and the event determination process (P13) may be executed at the server 1000. Alternatively, parts of processing, which will be described later, in the assignment process (P11), the numerical-value determination process (P12), and the event determination process (P13) may be executed at the server 1000. In the case where the processing mentioned above is executed at the server 1000, at the player terminal 1, processing is carried out on the basis of information received from the server 1000.

Figure 42:
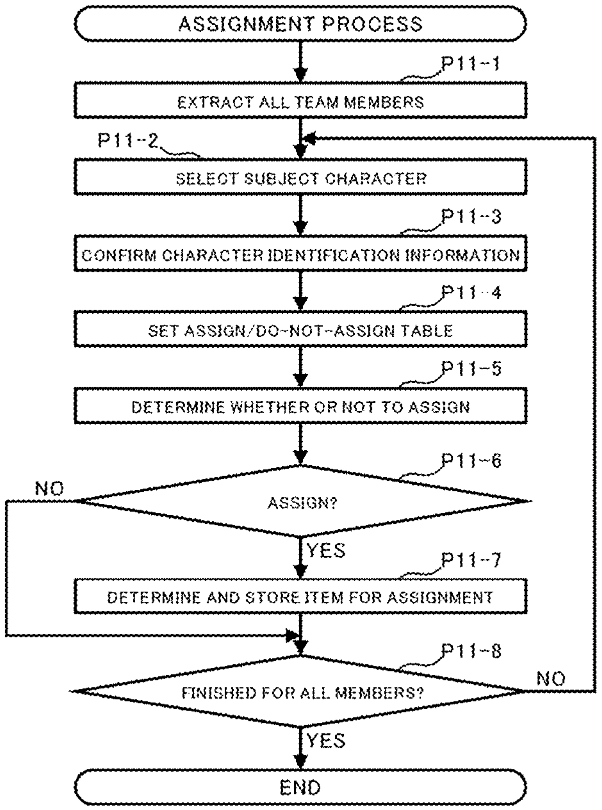
FIG. 42 is a flowchart for explaining an assignment process at the player terminal.

FIG. 42 is a flowchart for explaining an assignment process at the player terminal 1. The nurturing-game execution unit 701*a* refers to the character identification information table (FIGS. 12 and 13) to extract all the characters registered as team members (P11-1). Then, from among the team members extracted in P11-1, the nurturing-game execution unit 701*a* selects, as a subject character for carrying out processing, a character for which the processing in P11-3 to P11-7, which will be described below, has not been executed (P11-2).

Furthermore, the nurturing-game execution unit 701*a* refers to the character identification information table to confirm the character identification information of the subject character selected in P11-2 described above (P11-3). Furthermore, the nurturing-game execution unit 701*a* sets the assign/do-not-assign table (FIG. 24) on the basis of the character identification information confirmed in P11-3 described above (P11-4). Furthermore, the nurturing-game execution unit 701*a* determines "assign" or "do not assign" through a lottery on the basis of the assign/do-not-assign table set in P11-4 described above (P11-5).

Then, in the case where "assign" is determined (YES in P11-6), the nurturing-game execution unit 701*a* determines and stores training items to which the subject character is to be assigned (P11-7). In the case where the processing has not been finished for all the team members extracted in P11-1 described above (NO in P11-8), the nurturing-game execution unit 701*a* repeats the processing from P11-2 until the processing is finished for all the team members. Meanwhile, when the processing is finished for all the team members (YES in P11-8), the nurturing-game execution unit 701*a* quits the assignment process and executes the numerical-value determination process (P12).

Figure 43:
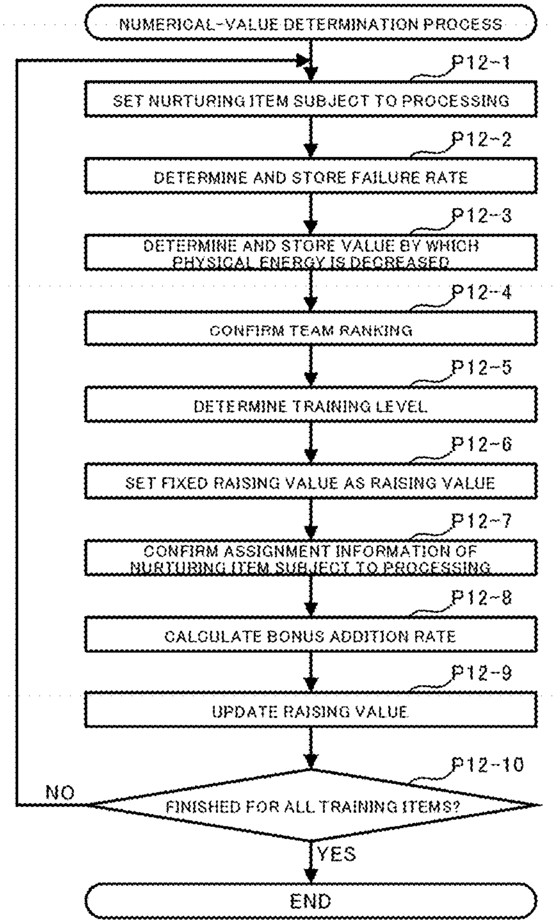
FIG. 43 is a flowchart for explaining a numerical-value determination process at the player terminal.

FIG. 43 is a flowchart for explaining the numerical-value determination process at the player terminal 1. The nurturing-game execution unit 701*a* sets a processing subject item for which the processing in P12-2 to P12-9, which will be described below, has not been executed from among the individual training items, namely, "Speed", "Stamina", "Power", "Spirit", and "Wisdom" (P12-1).

Furthermore, for the processing subject item set in P12-1, the nurturing-game execution unit 701*a* determines and stores a failure rate in the case where training is executed on the basis of the current physical energy of the main character (P12-2). Furthermore, for the processing subject item set in P12-1, the nurturing-game execution unit 701*a* determines and stores a value by which the physical energy is to be decreased in the case where training is executed (P12-3).

Furthermore, the nurturing-game execution unit 701*a* confirms the current team ranking (P12-4), and refers to the training level table (FIG. 25A) to determine a training level on the basis of the team ranking (P12-5).

Furthermore, the nurturing-game execution unit 701*a* refers to the fixed raising-value table (FIGS. 25B and 25C) corresponding to the processing subject item set in P12-1 to determine and set a fixed raising value on the basis of the training level determined in P12-5 (P12-6). Furthermore, the nurturing-game execution unit 701*a* confirms information concerning the characters determined to be assigned in P11 (assignment information) for the training of the processing subject item (P12-7).

Furthermore, on the basis of the assignment information confirmed in P12-7, the nurturing-game execution unit 701*a* refers to the bonus addition rate table (FIG. 25D) to calculate a bonus addition rate (P12-8). Furthermore, the nurturing-game execution unit 701*a* updates the raising value for the training of the processing subject item on the basis of the bonus addition rate calculated in P12-8 (P12-9).

Furthermore, in the case where the processing in P12-2 to P12-9 is not finished for all the training items (NO in P12-10), the nurturing-game execution unit 701*a* repeats the processing from P12-1. Meanwhile, when the processing is finished for all the training items (YES in P12-10), the nurturing-game execution unit 701*a* quits the numerical-value determination process and executes the event determination process (P13).

Figure 44:
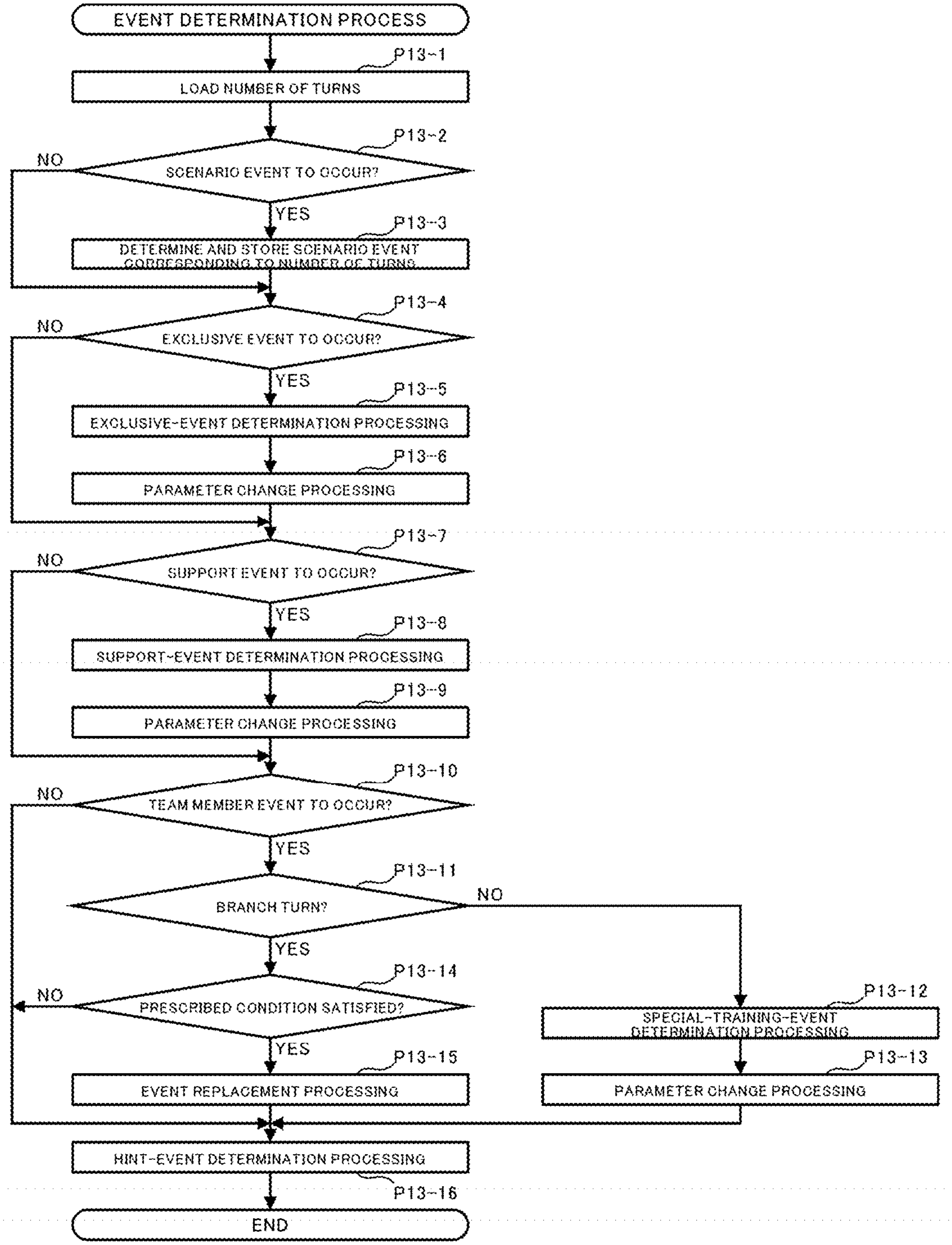
FIG. 44 is a flowchart for explaining an event determination process at the player terminal.

FIG. 44 is a flowchart for explaining the event determination process at the player terminal 1. The nurturing-game execution unit 701*a* loads the current number of turns (P13-1). Furthermore, the nurturing-game execution unit 701*a* refers to the event-occurrence determination table stored in the data storage area 12*b* to determine whether or not a scenario event is to occur (P13-2). Then, in the case where it is determined that a scenario event is to occur, i.e., in the case where the current turn is a scenario-event occurring turn (YES in P13-2), the nurturing-game execution unit 701*a* determines and stores the content (event ID) of the scenario event on the basis of the event-content determination table (P13-3).

Specifically, on the basis of the event-content determination table, the nurturing-game execution unit 701*a* generates a lottery table based on the event IDs of scenario events that can occur. Then, by using the lottery table generated, the nurturing-game execution unit 701*a* determines the content, i.e., the event ID, of the scenario event through a lottery. Note that in the case where the scenario event determined is an event with which a parameter is changed, such as an ability event, the value of change thereof is determined.

Furthermore, the nurturing-game execution unit 701*a* refers to the event-occurrence determination table to determine whether or not an exclusive event 162*a* is to occur (P13-4). Furthermore, in the case where it is determined that an exclusive event 162*a* is to occur, i.e., in the case where the current turn is an exclusive-event occurring turn (YES in P13-4), the nurturing-game execution unit 701*a* determines and stores the content (event ID) of the exclusive event 162*a* on the basis of the event-content determination table (P13-5).

Specifically, on the basis of the event-content determination table, the nurturing-game execution unit 701*a* generates a lottery table based on the event IDs of exclusive events 162*a* that can occur. Then, by using the lottery table generated, the nurturing-game execution unit 701*a* determines the content, i.e., the event ID, of the exclusive event 162*a* through a lottery. Note that in the case where the exclusive event 162$a$ determined is an event with which a parameter is changed, such as an ability event, the value of change thereof is determined.

Meanwhile, the nurturing-game execution unit 701$a$ executes parameter change processing (P13-6) in which the value by which the parameter is to be changed as a result of the exclusive event 162$a$ is changed in the case where the main character is a specific character. For example, in the parameter change processing, a prescribed fixed value is added to or subtracted from the value of change determined in P13-5, or the value of change is multiplied by a prescribed factor. Here, the value of change is changed advantageously for the player. Thus, the parameter changes more advantageously as a result of the exclusive event 162$a$ in the case where the main character is a specific character.

Furthermore, the nurturing-game execution unit 701$a$ refers to the event-occurrence determination table to determine whether a support event is to occur (P13-7). Then, in the case where it is determined that a support event is to occur, i.e., in the case where the current turn is a support-event occurring turn (YES in P13-7), the nurturing-game execution unit 701$a$ determines and stores the content (event ID) of the support event on the basis of the event-content determination table (P13-8).

Specifically, on the basis of the event-content determination table, the nurturing-game execution unit 701$a$ generates a lottery table based on the event ID of support events that can occur. At this time, the winning probabilities of support events associated with registered support cards are set to be higher than the winning probabilities of other support events. Furthermore, by using the lottery table generated, the nurturing-game execution unit 701$a$ determines the content, i.e., the event ID, of the support event through a lottery. Note that in the case where the support event determined is an event with which a parameter is changed, such as an ability event, the value of change thereof is determined.

Furthermore, the nurturing-game execution unit 701$a$ executes parameter change processing (P13-9) in which the value by which the parameter is to be changed as a result of the support event is changed in the case where the main character or the support character associated with the support event is a specific character.

Furthermore, the nurturing-game execution unit 701$a$ refers to the event-occurrence determination table to determine whether or not a team member event is to occur (P13-10). In the case where it is determined that the a team member event is to occur, i.e., in the case where the current turn is a team-member-event occurring turn (YES in P13-10), the nurturing-game execution unit 701$a$ determines whether or not the current turn is a branch turn (P13-11).

When the current turn is not a branch turn (NO in P13-11), on the basis of the event-content determination table, the nurturing-game execution unit 701$a$ determines and stores a special training event corresponding to the current number of turns as an event to occur (P13-12). Here, various kinds of raising values relating to the special training event are determined.

Furthermore, the nurturing-game execution unit 701$a$ executes parameter change processing (P13-13) in which the value by which the parameter is to be changed as a result of the special training event is changed in the case where the main character or the character subject to special training is a specific character.

Meanwhile, when the current turn is a branch turn (YES in P13-11), the nurturing-game execution unit 701$a$ determines whether or not a prescribed condition is satisfied (P13-14). As described earlier, it is determined whether or not the number of specific characters included in the team members is a prescribed number specified for each number of turns. Then, in the case where the prescribed condition is satisfied (YES in P13-14), the nurturing-game execution unit 701$a$ replaces the scenario event stored in P13-3 with a specific character event (P13-15). Note that here, the specific character event for replacement may be determined through a lottery, or a specific character event set in advance for each turn may be determined.

Furthermore, the nurturing-game execution unit 701$a$ performs hint-event determination processing relating to a hint event for each character assigned in training (P13-16). Here, whether or not a hint event is to occur is determined through a lottery for each character assigned in training. Furthermore, in the case where a hint event is to occur, which hint event is to occur is determined.

Referring back to FIG. 41, the nurturing-game execution unit 701$a$ confirms the reservation selection information stored in the reservation-information storage unit 753 (P10-3). Furthermore, the nurturing-game execution unit 701$a$ confirms the mission information stored in the mission-information storage unit 754 (P10-4).

The nurturing-game execution unit 701$a$ updates the screen displayed on the display 26 (P10-5). Note that in the case where an individual race is reserved in the current turn on the basis of reservation selection information stored in the reservation-information storage unit 753, confirmed in P10-3, a reservation icon 219$a$ (FIG. 15B) is displayed. Furthermore, in the case where a purpose race is set in the current turn, a purpose icon 219$b$ (FIG. 15B) is displayed.

Furthermore, in the case where a story event is to occur at the start of a turn, a story event is caused to occur among the events determined in P13 (P10-6).

Referring back to FIG. 40, in the case where the current timing is not the start of a turn (NO in P7-1), the nurturing-game execution unit 701$a$ executes the during-turn process (P20).

Figure 45:
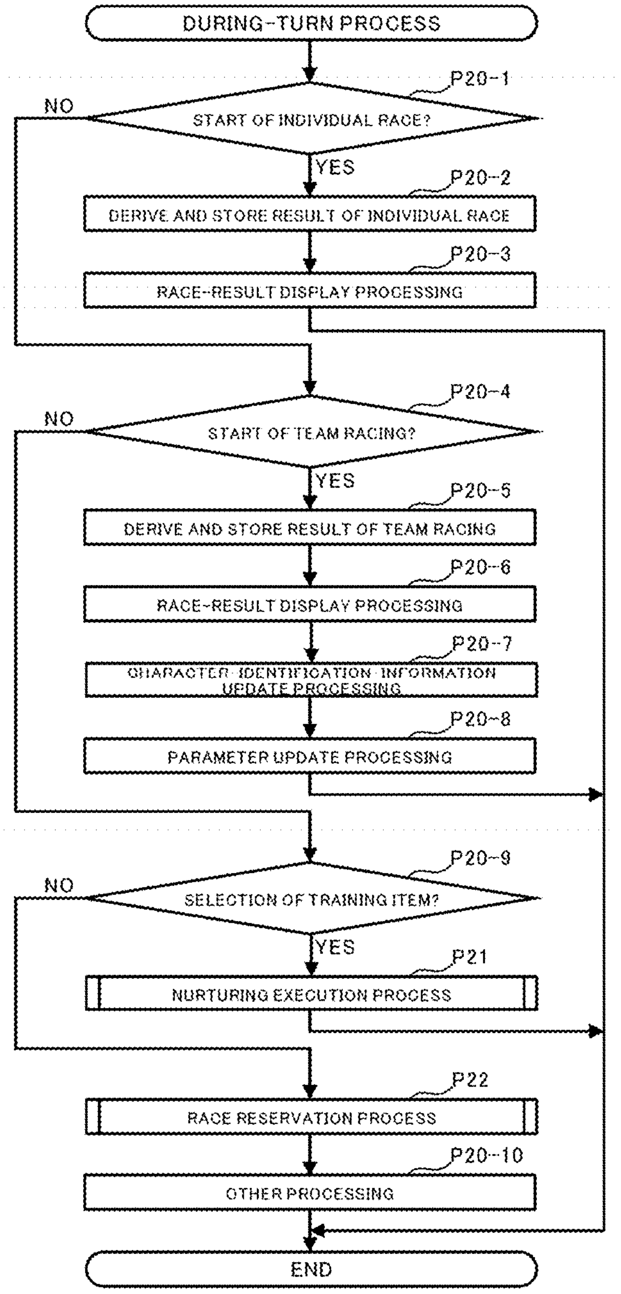
FIG. 45 is a flowchart for explaining a during-turn process at the player terminal.

FIG. 45 is a flowchart for explaining the during-turn process at the player terminal 1. The nurturing-game execution unit 701$a$ determines whether or not the result operating part 253 or the race operating part 254 in the individual-race start screen 250 has been operated to start an individual race (P20-1). In the case where an individual race has been started (YES in P20-1), the nurturing-game execution unit 701$a$ derives the result of the individual race and stores the result in the game-information storage unit 751 (P20-2).

Specifically, for example, a formula including weights for the individual ability parameters and acquired skills of NPCs and the main character is set in advance, and places in an individual race are determined on the basis of the results of computation according to the formula. Note that the formula may be set so as to vary among individual races. Alternatively, for example, a plurality of patterns of ability parameters of NPCs may be provided for each race, and which ability parameters to use may be determined through a lottery. That is, the race result is not necessarily the same even if the ability parameters and acquired skills of the main character as well as the race to participate in are exactly the same. Alternatively, a plurality of patterns of formulas, such as weights, may be provided for each race such that the result varies depending on the selected formula.

Note that it is assumed here that the result of an individual race is derived at the player terminal 1. Alternatively, the result of an individual race may be derived at the server 1000. In this case, information for requesting that the result of an individual race be derived, as well as information necessary for deriving the result of the individual race, are transmitted from the player terminal 1 to the server 1000. Then, the result of the individual race, derived at the server 1000, may be received by the player terminal 1.

Furthermore, the nurturing-game execution unit 701*a* executes race-result display processing in which the individual-race result screen 255 or a race video is displayed on the display 26 on the basis of the result of the individual race, derived in P20-2 (P20-3).

Furthermore, the nurturing-game execution unit 701*a* determines whether or not the result operating part 296 or the race operating part 297 in the team-race start screen 295 has been operated to start team racing (P20-4). The process proceeds to P20-5 in the case where team racing has been started, while proceeding to P20-9 in the case where team racing has not been started.

The nurturing-game execution unit 701*a* derives the result of team racing and stores the result in the game-information storage unit 751 (P20-5). Specifically, for example, a formula including weights for the individual ability parameters and acquired skills of NPCs, the main character, and the other team members is set in advance, and places in team racing are determined on the basis of the results of computation according to the formula. Note that the formula mentioned above may be set so as to vary among individual races. Alternatively, for example, a plurality of patterns of the ability parameters of NPCs may be provided for each race, and which ability parameters to use may be determined through a lottery. That is, the race result is not necessarily the same even if the ability parameters and acquired skills of the main character and the other team members, as well as the race to participate in, are exactly the same. Alternatively, a plurality of patterns of formulas, such as weights, may be provided for each race such that the result varies depending on the formula selected.

Note that it is assumed here that the result of team racing is derived at the player terminal 1. Alternatively, the result of team racing may be derived at the server 1000. In this case, information for requesting that the result of team racing be derived, as well as information necessary for deriving the result of team racing, are transmitted from the player terminal 1 to the server 1000. Then, the result of team racing, derived at the server 1000, may be received by the player terminal 1.

The nurturing-game execution unit 701*a* executes race-result display processing (P20-6) for displaying the team-racing interim result screen 300, the team-racing detailed result screen 310, and the team-racing total result screen 320 on the display 26 on the basis of the result of team racing, derived in P20-5 described above.

Furthermore, the nurturing-game execution unit 701*a* executes character-identification-information update processing (P20-7). Here, a prescribed number of characters are extracted according to a prescribed condition from among the characters currently registered as sub-members. Then, the character identification information of the extracted characters is updated to team members. That is, in this embodiment, the number of team members increases each time team racing is finished.

Furthermore, the nurturing-game execution unit 701*a* executes parameter update processing for updating information concerning the team ranking on the basis of the result of team racing, derived in P20-5 described above (P20-8).

Furthermore, in the case where one of the training items is selected (YES in P20-9), the nurturing-game execution unit 701*a* carries out a nurturing execution process (P21). Meanwhile, in the case where none of the training items is selected (NO in P20-9), the nurturing-game execution unit 701*a*, the preset-information management unit 702*a*, and the reservation-information management unit 703*a* carry out a race reservation process (P22). Then, the nurturing-game execution unit 701*a* executes other processing, such as acquiring a skill by consuming skill points (P20-10).

Figure 46:
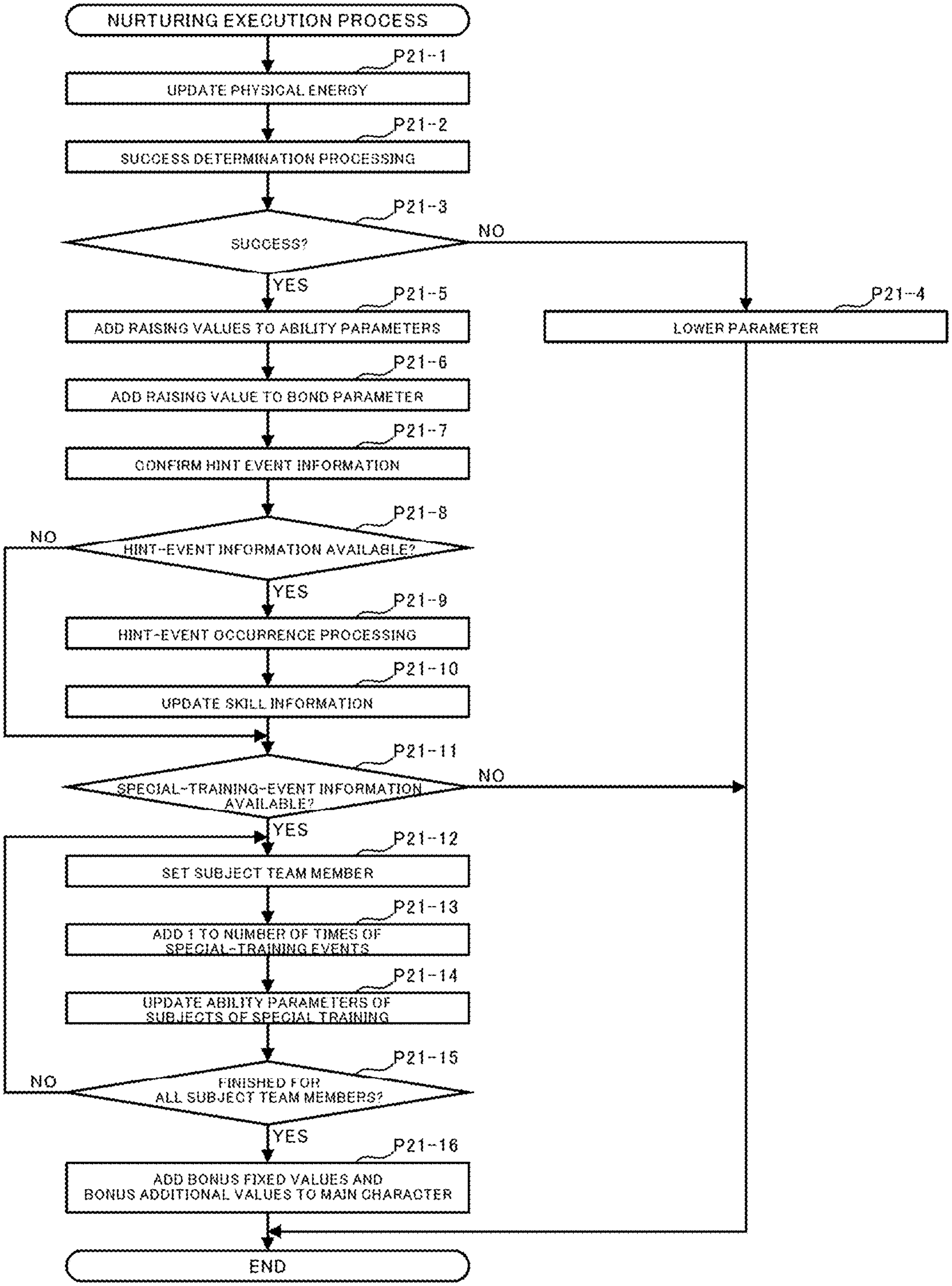
FIG. 46 is a flowchart for explaining a nurturing execution process at the player terminal.

FIG. 46 is a flowchart for explaining the nurturing execution process at the player terminal 1. For the selected training item, the nurturing-game execution unit 701*a* updates the physical energy of the main character on the basis of the value by which the physical energy is to be decreased, determined in P12-3 described earlier (P21-1).

Furthermore, for the selected training item, the nurturing-game execution unit 701*a* executes success determination processing for determining whether or not the training has been successful on the basis of the failure rate determined in P12-2 described earlier (P21-2). In the case where the training has failed (NO in P21-3), the nurturing-game execution unit 701*a* lowers an ability parameter, e.g., lowers character conditions, on the basis of the failure of the training (P21-4).

Meanwhile, in the case where the training has been successful (YES in P21-3), the nurturing-game execution unit 701*a* adds the raising values derived in P12-9 described earlier to the ability parameters of the main character (P21-5). Furthermore, the nurturing-game execution unit 701*a* adds the raising value to the value of the bond parameter, determined in P13-12 and P13-13 (P21-6). Furthermore, the nurturing-game execution unit 701*a* confirms the hint event information stored in the hint-event determination processing (P21-7).

In the case where hint event information is stored for the selected training item (YES in P21-8), the nurturing-game execution unit 701*a* causes a hint event to occur on the basis of the hint event information relating to the selected training item (P21-9). Note that in the case where a plurality of items of hint event information are stored for the selected training item, one of the hint events occurs. Furthermore, on the basis of the hint event information caused to occur in P21-9, the nurturing-game execution unit 701*a* updates the skill information relating to the main character, stored in the game-information storage unit 751 (P21-10).

Furthermore, in the case where special-training event information is stored for the selected training item (YES in P21-11), the nurturing-game execution unit 701*a* sets team members for which the special training event is to be executed on the basis of the special-training event information relating to the selected training item (P21-12).

Furthermore, the nurturing-game execution unit 701*a* adds "1" to the number of times of instruction events for the team members subject to the execution, set in P21-12 described above (P21-13). Furthermore, the nurturing-game execution unit 701*a* updates the ability parameters of the subjects of the special training (P21-14). When the processing from P21-13 to P21-14 is finished for all the team members for which the special training event is to be executed (YES in P21-15), the nurturing-game execution unit 701*a* adds bonus additional values to the ability parameters of the main character on the basis of the selected training item and the special-training event information (P21-16).

Figure 47:
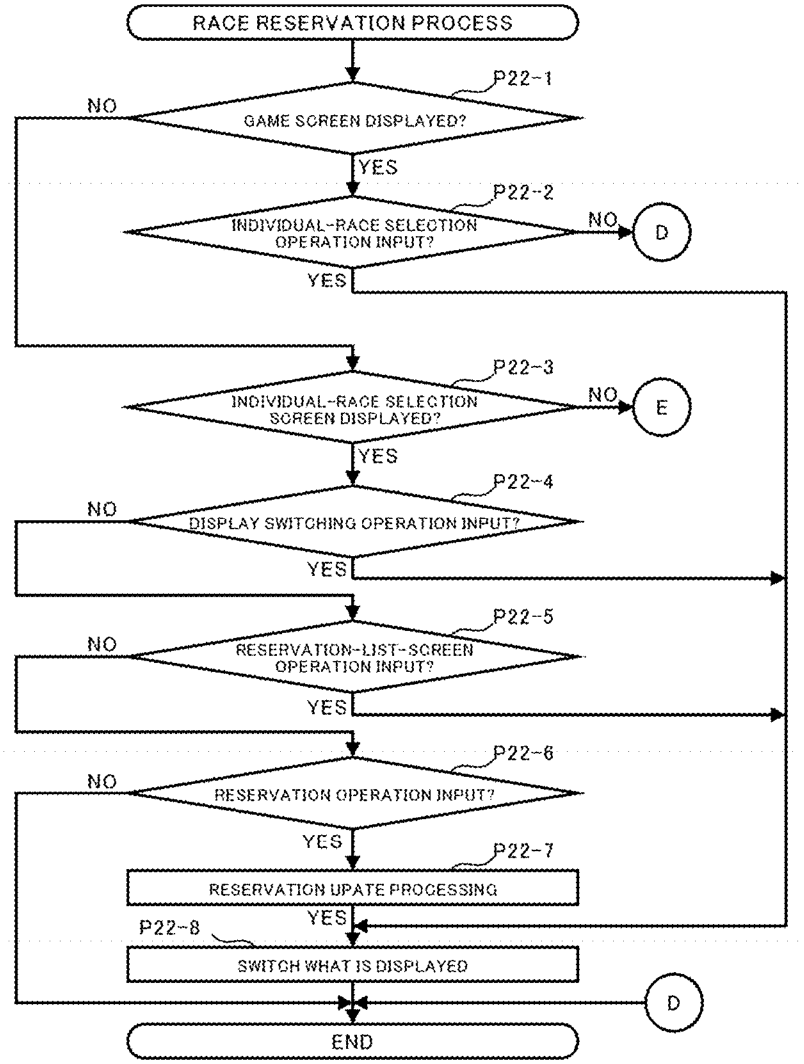
FIG. 47 is a first flowchart for explaining a race reservation process at the player terminal.
Figure 48:
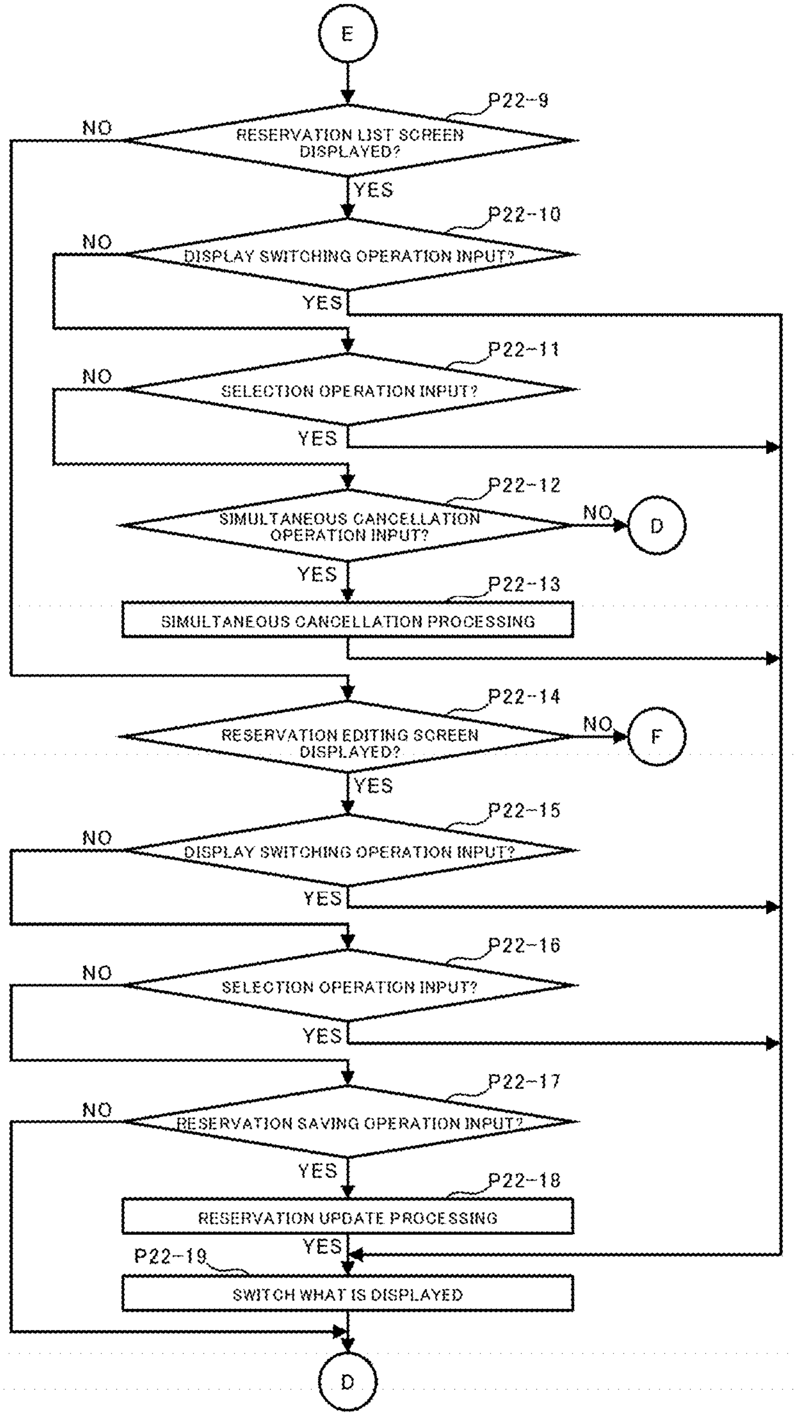
FIG. 48 is a second flowchart for explaining the race reservation process at the player terminal.
Figure 49:
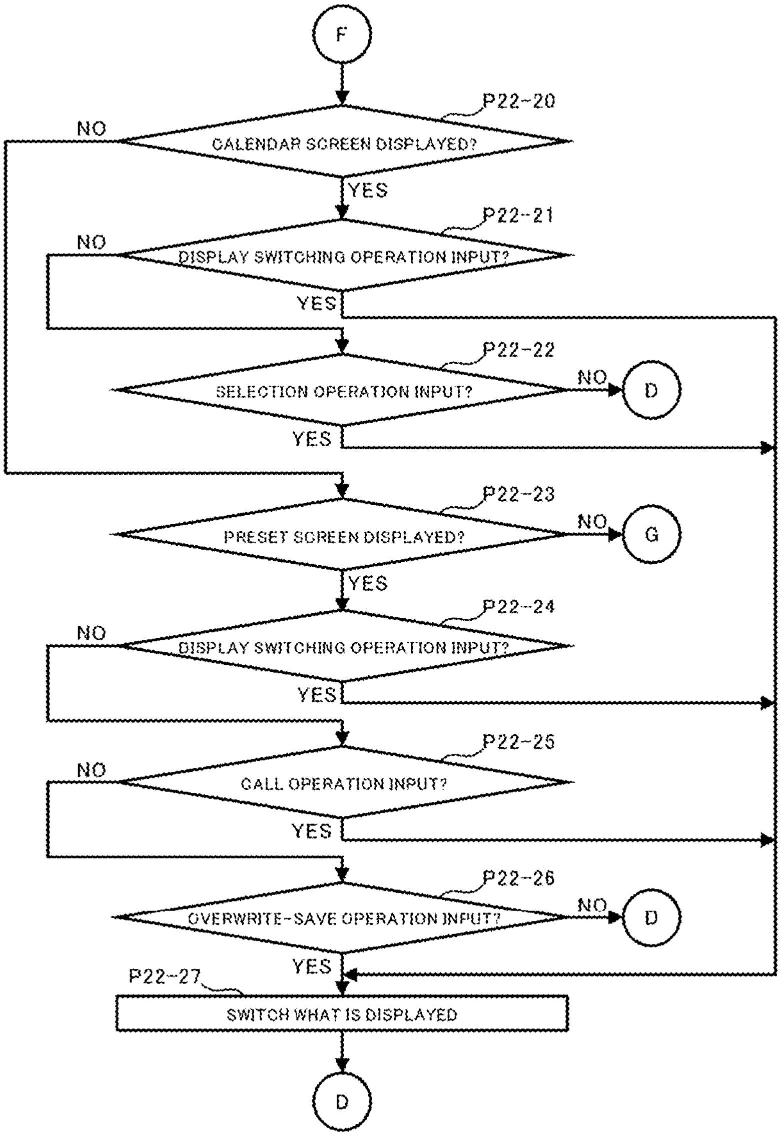
FIG. 49 is a third flowchart for explaining the race reservation process at the player terminal.
Figure 50:
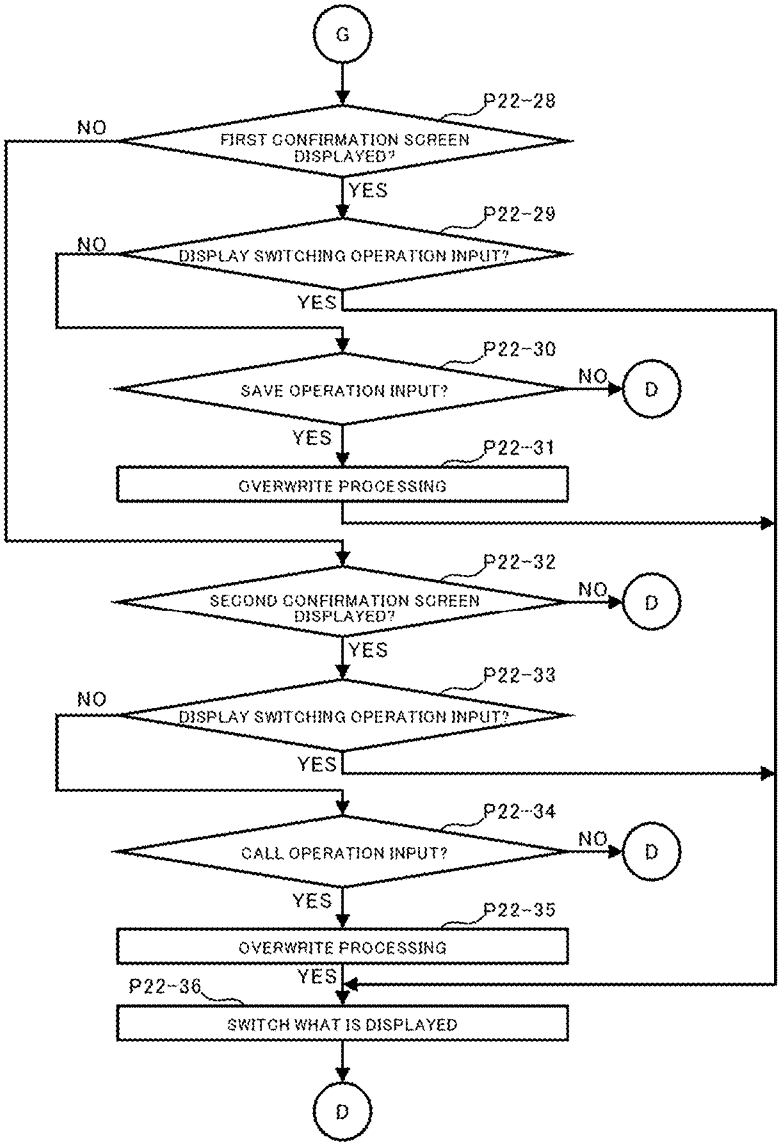
FIG. 50 is a fourth flowchart for explaining the race reservation process at the player terminal.

FIG. 47 is a first flowchart for explaining a race reservation process at the player terminal 1. FIG. 48 is a second flowchart for explaining the race reservation process at the player terminal 1. FIG. 49 is a third flowchart for explaining the race reservation process at the player terminal. FIG. 50 is a fourth flowchart for explaining the race reservation process at the player terminal. The nurturing-game execution unit 701*a* of the player terminal 1 determines whether or not the game screen 210 is displayed on the display 26 (P22-1 in FIG. 47).

When the game screen 210 is displayed as a result (YES in P22-1) and an individual-race selection operation (tapping of the individual-race operating part 219) is input in the game screen 210 (YES in P22-2), the nurturing-game execution unit 701*a* switches the screen displayed on the display 26 (P22-8). At this time, the reservation icon 219*a* (FIG. 18B) is displayed in the case where an individual race is reserved in the current turn on the basis of the reservation selection information stored in the reservation-information storage unit 753, confirmed in P10-3. Furthermore, the purpose icon 219*b* is displayed in the case where a purpose race is set in the current turn. Furthermore, the period-specific-mission icon 240*d* (FIG. 18B) is displayed in the case where there is an individual race set as a period-specific mission in the current turn on the basis of the mission information stored in the mission-information storage unit 754, confirmed in P10-4.

Meanwhile, in the case where the individual-race selection screen 240 is displayed (YES in P22-3) and a display switching operation for switching what is displayed on the screen is input (YES in P22-4), the nurturing-game execution unit 701*a* switches the screen displayed on the display 26 (P22-8).

Meanwhile, when a reservation-list-screen operation (tapping of the reservation-list-screen operating part 244) is input in the individual-race selection screen 240 (YES in P22-5), the nurturing-game execution unit 701*a* switches the screen displayed on the display 26 (P22-8).

Meanwhile, when a reservation operation (tapping of the reservation operating part 246) is input in the individual-race selection screen 240 (YES in P22-6), the reservation-information management unit 703*a* executes reservation update processing for updating the reservation selection information stored in the reservation-information storage unit 753 so as to reserve the individual race corresponding to the selected individual-race selection operating part 241 (P22-7). Then, the nurturing-game execution unit 701*a* switches the screen displayed on the display 26 (P22-8).

Meanwhile, in the case where the reservation list screen 256 is displayed (YES in P22-9 in FIG. 48) and a display switching operation for switching what is displayed on the screen is input (YES in P22-10), the nurturing-game execution unit 701*a* switches the screen displayed on the display 26 (P22-19).

Meanwhile, when a selection operation (tapping of the checkbox of one of the reserved-individual-race selection operating parts 257) is input in the reservation list screen 256 (YES in P22-11), the nurturing-game execution unit 701*a* switches the screen displayed on the display 26 so as to display a check mark in the checkbox of the reserved-individual-race selection operating part 257 via which the selection operation is input (P22-19).

Meanwhile, when a simultaneous cancelling operation (tapping of the delete-reservation operating part 258) is input in the reservation list screen 256 (YES in P22-12), the reservation-information management unit 703*a* executes simultaneous cancellation processing for deleting reservations for the individual races corresponding to the reserved-individual-race selection operating parts 257 in which check marks are displayed in the check boxes and updating the reservation selection information stored in the reservation-information storage unit 753 (P22-13). Furthermore, in the simultaneous cancellation processing, the reservation-information management unit 703*a* transmits the updated reservation selection information to the server 1000 as update information. Then, the nurturing-game execution unit 701*a* switches the screen displayed on the display 26 (P22-19).

Meanwhile, in the case where the reservation editing screen 262 is displayed (YES in P22-14) and a display switching operation for switching what is displayed on the screen is input (YES in P22-15), the nurturing-game execution unit 701*a* switches the screen displayed on the display 26 (P22-19).

Meanwhile, when a selection operation (tapping of one of the individual-race selection operating parts 241) is input in the reservation editing screen 262 (YES in P22-16), the nurturing-game execution unit 701*a* switches the screen displayed on the display 26 so as to highlight the individual-race selection operating part 241 via which the selection operation is input (P22-19).

Meanwhile, when a reservation saving operation (tapping of the reservation operating part 246) is input in the reservation editing screen 262 (YES in P22-17), the reservation-information management unit 703*a* executes reservation update processing for updating the reservation selection information stored in the reservation-information storage unit 753 so as to reserve the individual race corresponding to the individual-race selection operating part 241 tapped in P22-16 (P22-18). Furthermore, in the reservation update processing, the reservation-information management unit 703*a* transmits the updated reservation selection information to the server 1000 as update information. Then, the nurturing-game execution unit 701*a* switches the screen displayed on the display 26 (P22-19).

Meanwhile, in the case where the calendar screen 267 is displayed (YES in P22-20 in FIG. 49) and a display switching operation for switching what is displayed on the screen is input (YES in P22-21), the nurturing-game execution unit 701*a* switches the screen displayed on the display 26 (P22-27).

Meanwhile, when a selection operation (tapping of an operable one of the reservation operating parts 268) is input in the calendar screen 267 (YES in P22-22), the nurturing-game execution unit 701*a* switches the screen displayed on the display 26 (P22-27).

Meanwhile, in the case where the preset screen 270 is displayed (YES in P22-23) and a display switching operation for switching what is displayed on the screen is input (YES in P22-24), the nurturing-game execution unit 701*a* switches the screen displayed on the display 26 (P22-27).

Meanwhile, when a call operation (tapping of the call operating part 275) is input in the preset screen 270 (YES in P22-25), the nurturing-game execution unit 701*a* switches the screen displayed on the display 26 (P22-27).

Meanwhile, when an overwrite-save operation (tapping of the overwrite-save operating part 274) is input in the preset screen 270 (YES in P22-26), the nurturing-game execution unit 701*a* switches the screen displayed on the display 26 (P22-27).

Meanwhile, in the case where the first confirmation screen 277 is displayed (YES in P22-28 in FIG. 50) and a display switching operation for switching what is displayed on the screen is input (YES in P22-29), the nurturing-game execution unit 701*a* switches the screen displayed on the display 26 (P22-36).

Meanwhile, when an overwrite-save operation (tapping of the overwrite-save operating part 279) is input in the first confirmation screen 277 (YES in P22-30), the preset-information management unit 702*a* executes overwrite processing for updating the reservation selection information corresponding to the preset displayed in the first confirmation screen 277 by overwriting the reservation selection information and saving the reservation selection information stored in the reservation-information storage unit 753 (P22-31). Furthermore, in the overwrite processing, the preset-information management unit 702*a* transmits the updated reservation selection information to the server 1000 as update information. Then, the nurturing-game execution unit 701*a* switches the screen displayed on the display 26 (P22-36).

Meanwhile, when the second confirmation screen 280 is displayed (YES in P22-32) and a display switching operation for switching what is displayed on the screen is input (YES in P22-33), the nurturing-game execution unit 701*a* switches the screen displayed on the display 26 (P22-36).

Meanwhile, when a call operation (tapping of the call operating part 281) is input in the second confirmation screen 280 (YES in P22-34), the reservation-information management unit 703*a* executes overwrite processing for updating the reservation selection information stored in the reservation-information storage unit 753 by overwriting the reservation selection information and saving the reservation selection information corresponding to the preset displayed in the second confirmation screen 280 (P22-35). Furthermore, in the overwrite processing, the reservation-information management unit 703*a* transmits the updated reservation selection information to the server 1000 as update information. Then, the nurturing-game execution unit 701*a* switches the screen displayed on the display 26 (P22-36).

Referring back to FIG. 35, when the nurturing stage process described above is finished, at the player terminal 1, the nurturing-game execution unit 701*a* executes nurturing-game finish processing (P8). In the nurturing-game finish processing, the nurturing-game execution unit 701*a* stores information concerning the nurtured characters nurtured in the nurturing game in the game-information storage unit 751. Furthermore, the nurturing-game execution unit 701*a* transmits finish information to the server 1000. The finish information includes information concerning the nurtured characters, etc. At the server 1000, upon receiving the finish information, the nurturing-game finish processing unit 1102*a* executes a nurturing-game finish process (S8).

Figure 51:
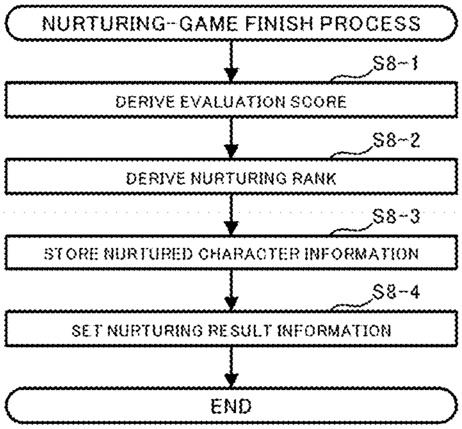
FIG. 51 is a flowchart for explaining a nurturing-game finish process at the server.

FIG. 51 is a flowchart for explaining the nurturing-game finish process at the server 1000. The nurturing-game finish processing unit 1102*a* derives an evaluation score on the basis of finish information received from the player terminal 1 (S8-1). Furthermore, the nurturing-game finish processing unit 1102*a* derives a nurturing rank on the basis of the derived evaluation score (S8-2). Furthermore, the nurturing-game finish processing unit 1102*a* stores nurtured character information in the game-information storage unit 1151 in association with the player ID of the player, the nurtured character information including the evaluation score, the nurturing rank, the ability parameters, the aptitude parameters, the acquired skills, the inheritance information, etc. (S8-3). Furthermore, the nurturing-game finish processing unit 1102*a* sets nurturing result information and causes the player terminal 1 to receive the nurturing result information (S8-4). Note that it suffices for the nurturing result information to include at least the evaluation score and the evaluation rank, and here, the nurturing result information is the same as the nurtured character information stored in S8-3 described above.

Referring back to FIG. 35, upon receiving the nurturing result information, the nurturing-game execution unit 701*a* executes a nurturing-game finish processing (P9). Here, the nurturing-game execution unit 701*a* stores the received nurturing result information in the game-information storage unit 751. Furthermore, the nurturing-game execution unit 701*a* displays the nurturing completion screen 330 (see FIGS. 32A, 32B, and 32C) on the display 26 on the basis of the nurturing result information.

The nurturing game described above is realized through the processes described above. Furthermore, nurtured character information concerning the nurtured characters nurtured (created) through the nurturing game is stored in association with the player ID. Note that the above-described processes at the player terminal 1 and the server 1000 are merely examples. Furthermore, each of the processes described above may be executed only by the player terminal 1 or may be executed only by the server 1000.

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope of the present invention.

Furthermore, although the above embodiment has been described in the context of the nurturing game, the technology according to the above-described embodiment is applicable to all game genres, without limitation to the nurturing game.

Note that in the case where reservation selection information is updated in the reservation update processing (P22-7 and P22-18) and the overwrite processing (P22-35) in the race reservation process described above, the reservation-information management unit 703*a* can determine, on the basis of the purpose races that have been set, the current number of turns, etc., whether or not it is possible to reserve (update) all the individual items of content (races) included in the reservation selection information.

Specifically, for example, at the timing of execution of updating reservation selection information in the reservation update processing (P22-7 and P22-18) and the overwrite processing (P22-35) in the race reservation process described above, for example, it is possible to compare information concerning purpose races with called reservation selection information of presets to extract races that could not be reserved and to execute updating of the reservation selection information on the basis of the results of extraction.

Furthermore, in the case where it is not possible to reserve (update) all the individual items of content (races) included in the reservation selection information, the nurturing-game execution unit 701*a* can display, on the display, a popup screen reporting that at least some of the items of content (race) could not have been reserved.

Note that information processing programs for executing the processes in the embodiment described above and the various kinds of modifications may be stored in a computer-readable, non-transitory storage medium and may be provided in the form of the storage medium. Furthermore, a game terminal device including the storage medium may be provided. Alternatively, the embodiment described above and the various kinds of modifications may be embodied in the form of an information processing method for realizing the individual functions and the steps shown in the flowcharts.

What is claimed is:

1. A non-transitory computer readable medium storing a program for causing a computer to perform a method comprising:

displaying, on a display device within a player terminal, a reservation editing screen for a computer game;

receiving, from an input unit within the player terminal, a first operation input from a player in response to displaying the reservation editing screen;

registering, in response to receiving the first operation input, a plurality of items of reservation selection information for a turn among a plurality of turns in the computer game, wherein a respective item among the plurality of items of reservation selection information comprise a specific option that is selected by the player from among a plurality of options presented in the computer game, and wherein each option among the plurality of options determines an action of a game medium during the computer game;

receiving, from the input unit, a second operation input from the player in response to displaying the reservation editing screen, wherein the second operation input selects a calendar screen using an operating part among a plurality of operating parts disposed in the reservation editing screen;

displaying, on the display device and in response to receiving the second operation input, the calendar screen that provides a user interface for selecting a time period that identifies the plurality of turns and registered reservation selection information associated with the plurality of turns within the computer game;

receiving, from the input unit, a third operation input from the player in response to displaying the calendar screen, wherein the third operation input determines a selection of the turn among the plurality of turns and presents the specific option that is selected by the player for the turn; and executing the turn of the computer game using the game medium and the specific option that is selected by the player for the turn, wherein executing the turn of the computer game comprises updating a parameter in the computer game based on the specific option selected by the player from among the plurality of options that are presented in the computer game.

2. The non-transitory computer readable medium according to claim 1, wherein registering the reservation selection information is performed during the execution of the computer game.

3. The non-transitory computer readable medium according to claim 1, wherein registering the reservation selection information is performed while the computer game is not being executed.

4. The non-transitory computer readable medium according to claim 1, wherein the specific option is character identification information displayed within a game screen of the computer game prior to executing the turn of the computer game, and wherein the character identification information indicates that the specific option is selectable by the player.

5. An information processing method comprising:

displaying, on a display device within a player terminal, a reservation editing screen for a computer game;

receiving, from an input unit within the player terminal, a first operation input from a player in response to displaying the reservation editing screen;

registering, in response to receiving the first operation input, a plurality of items of reservation selection information for a turn among a plurality of turns in the computer game, wherein a respective item among the plurality of items of reservation selection information comprise a specific option that is selected by the player from among a plurality of options presented in the computer game, and wherein each option among the plurality of options determines an action of a game medium during the computer game;

receiving, from the input unit, a second operation input from the player in response to displaying the reservation editing screen, wherein the second operation input selects a calendar screen using an operating part among a plurality of operating parts disposed in the reservation editing screen;

displaying, on the display device and in response to receiving the second operation input, the calendar screen that provides a user interface for selecting a time period that identifies the plurality of turns and registered reservation selection information associated with the plurality of turns within the computer game;

receiving, from the input unit, a third operation input from the player in response to displaying the calendar screen, wherein the third operation input determines a selection of the turn among the plurality of turns and presents the specific option that is selected by the player for the turn; and executing the turn of the computer game using the game medium and the specific option that is selected by the player for the turn, wherein executing the turn of the computer game comprises updating a parameter in the computer game based on the specific option selected by the player from among the plurality of options that are presented in the computer game.

6. An information processing system comprising:

a computer processor;

a display device;

an input unit; and a memory connected to the computer processor, wherein the memory comprises a program configured to perform a method, when executed by the computer processor, comprising:

displaying, on the display device, a reservation editing screen for a computer game;

receiving, from the input unit, a first operation input from a player in response to displaying the reservation editing screen;

registering, in response to receiving the first operation input, a plurality of items of reservation selection information for a turn among a plurality of turns in the computer game, wherein a respective item among the plurality of items of reservation selection information comprise a specific option that is selected by the player from among a plurality of options presented in the computer game, and wherein each option among the plurality of options determines an action of a game medium during the computer game;

receiving, from the input unit, a second operation input from the player in response to displaying the reservation editing screen, wherein the second operation input selects a calendar screen using an operating part among a plurality of operating parts disposed in the reservation editing screen;

displaying, on the display device and in response to receiving the second operation input, the calendar screen that provides a user interface for selecting a time period that identifies the plurality of turns and registered reservation selection information associated with the plurality of turns within the computer game;

receiving, from the input unit, a third operation input from the player in response to displaying the calendar screen, wherein the third operation input determines a selection of the turn among the plurality of turns and presents the specific option that is selected by the player for the turn; and executing the turn of the computer game using the game medium and the specific option that is selected by the player for the turn, wherein executing the turn of the computer game comprises updating a parameter in the computer game based on the specific option selected by the player from among the plurality of options that are presented in the computer game.

* * * * *